US011090804B2

(12) United States Patent
Sugaya

(10) Patent No.: US 11,090,804 B2
(45) Date of Patent: Aug. 17, 2021

(54) INFORMATION PROCESSING METHOD AND INFORMATION PROCESSING APPARATUS

(71) Applicant: CANON KABUSHIKI KAISHA, Tokyo (JP)

(72) Inventor: Satoshi Sugaya, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 494 days.

(21) Appl. No.: 15/983,826

(22) Filed: May 18, 2018

(65) Prior Publication Data
US 2018/0264646 A1    Sep. 20, 2018

Related U.S. Application Data

(62) Division of application No. 15/134,730, filed on Apr. 21, 2016, now Pat. No. 10,011,011.

(30) Foreign Application Priority Data

May 12, 2015   (JP) ................................ 2015-097214

(51) Int. Cl.
*B25J 9/16* (2006.01)
*G06F 3/0484* (2013.01)
*G06F 3/0482* (2013.01)

(52) U.S. Cl.
CPC ............. *B25J 9/161* (2013.01); *B25J 9/1671* (2013.01); *G06F 3/0482* (2013.01); *G06F 3/04842* (2013.01); *G05B 2219/40387* (2013.01)

(58) Field of Classification Search
CPC ........ B25J 9/161; B25J 9/1671; B25J 9/1692; B25J 9/047; B25J 9/018; B25J 15/0019;
(Continued)

(56) References Cited

U.S. PATENT DOCUMENTS 4,338,672 A    7/1982   Perzley
5,835,693 A    11/1998  Lynch
(Continued)

FOREIGN PATENT DOCUMENTS

CN    101501588    8/2009
CN    103862472    6/2014
(Continued)

OTHER PUBLICATIONS

Chinese Office Action dated Aug. 8, 2018 during prosecution of related Chinese application No. 201610300911.5. (Whole English-language translation included.).
(Continued)

*Primary Examiner* — Bao Long T Nguyen
(74) *Attorney, Agent, or Firm* — Venable LLP

(57) ABSTRACT

A displaying apparatus includes a virtual environment screen displaying a state of a robot identified, and a parameter setting screen numerically displaying the position and orientation data. When a changing a part of the position and orientation data are performed through the operating input unit, the part of the position and orientation data is changed according to the content of the operation and input. Position and orientation is calculated to identify the position or orientation of each part of the robot, based on the changed part of the position and orientation data, and new position and orientation data is calculated based on the position and orientation calculation. The content of virtual display on the virtual environment screen or numeric value display on the parameter setting screen of the displaying apparatus is updated, based on the changed part of position and orientation data, and the new position and orientation data.

18 Claims, 26 Drawing Sheets

(58) Field of Classification Search
CPC ..... B25J 9/1605; B25J 13/085; G06F 3/0482;
G06F 3/04842; G06F 17/50; G05B
2219/40387; G05B 19/4069; G05B
19/425; G05B 2219/40314; G05B
2219/40091; G05B 2219/40312
USPC .............................. 700/251, 257, 264; 703/7
See application file for complete search history.

(56) References Cited

U.S. PATENT DOCUMENTS

| | | | |
|---|---|---|---|
| 6,088,628 | A | 7/2000 | Watanabe |
| 6,167,328 | A | 12/2000 | Takaoka |
| 6,324,443 | B1 | 11/2001 | Kurakake |
| 6,718,229 | B1 * | 4/2004 | Takebayashi .......... B25J 9/1687 414/749.1 |
| 6,944,584 | B1 | 9/2005 | Tenney |
| 7,155,316 | B2 | 12/2006 | Sutherland |
| 8,024,068 | B2 | 9/2011 | Gray |
| 9,044,857 | B2 | 6/2015 | Sommerville |
| 9,248,574 | B2 | 2/2016 | Matsukuma |
| 9,278,449 | B1 * | 3/2016 | Linnell .................. B25J 9/1674 |
| 9,701,019 | B2 | 7/2017 | Eberst |
| 9,984,178 | B2 | 5/2018 | Kuwahara |
| 2004/0172168 | A1 | 9/2004 | Watanabe |
| 2005/0080515 | A1 | 4/2005 | Watanabe |
| 2013/0066616 | A1 | 3/2013 | Shimakawa |
| 2013/0116828 | A1 | 5/2013 | Krause |
| 2013/0255426 | A1 * | 10/2013 | Kassow .................. B25J 18/00 74/490.03 |
| 2014/0236565 | A1 | 8/2014 | Kuwahara |
| 2015/0209960 | A1 | 7/2015 | Li |

FOREIGN PATENT DOCUMENTS

| | | |
|---|---|---|
| CN | 104010774 | 8/2014 |
| CN | 104520076 | 4/2015 |
| EP | 1 462 224 | 9/2004 |
| JP | 1-288906 | 11/1989 |
| JP | 4-123108 | 4/1992 |
| JP | H8-328637 | 12/1996 |
| JP | 9-225872 | 9/1997 |
| JP | 2005-135095 | 5/2005 |
| JP | 2010-188485 | 9/2010 |
| JP | 2014-117781 | 6/2014 |
| JP | 2014-161921 | 9/2014 |
| WO | 98/03314 | 1/1998 |
| WO | 2007/099511 | 9/2007 |
| WO | 2007/113112 | 10/2007 |

OTHER PUBLICATIONS http://www.irf.uni-dortmund.de/cosimir/prospekt.d/pdf/cosimir5.pdf, "Cosimir Robotersimulation AUF PCs", XP-002254622, pp. 1-5 (1998) (Previously cited during prosecution of parent U.S. Appl. No. 15/134,730.).

European Search Report dated Nov. 8, 2016 in EP 16167431.2. (Previously cited during prosecution of parent U.S. Appl. No. 15/134,730.).

Japanese Office Action dated Apr. 9, 2019 during prosecution of related Japanese application No. 2015-097214.

Fanuc Robot series R-30iB/R-30iB control device instruction manual (basic operation knitting), pp. 454-467, Japan, Mar. 2013.

Japanese Office Action dated Sep. 10, 2019 during prosecution of related Japanese application No. 2015-097214. (English-language machine translation included.).

* cited by examiner

FIG. 5A

TEACHING POINT NAME: P100 — 212

[DETERMINE] — 209  [CANCEL] — 210  — 20

ABSOLUTE VALUE — 201
- X: -
- Y: -
- Z: -
- α: -
- β: -
- γ: -

RELATIVE VALUE (ARBITRARY) — 202
- X:
- Y:
- Z:
- α:
- β:
- γ:

SETTING
REFERENCE COORDINATE — 203
- P001
- P010 — 205
- P020 — 206

FIG. 5B

TEACHING POINT NAME: P100 — 212

[DETERMINE] — 209  [CANCEL] — 210  — 20

ABSOLUTE VALUE — 201
- X: 400
- Y: 350
- Z: 300
- α: 0
- β: 180
- γ: 0

RELATIVE VALUE (ARBITRARY) — 202
- X: 0
- Y: 0
- Z: 0
- α: 0
- β: 0
- γ: 0

SETTING
REFERENCE: P001 — 204
COORDINATE:
- TOOL — 205
- BASE — 207

FIG. 5C

| | | | |
|---|---|---|---|
| TEACHING POINT NAME | P100 212 | DETERMINE 209 | CANCEL 210 |

ABSOLUTE VALUE (201):
- X: 400
- Y: 350
- Z: 300
- α: 0
- β: 180
- γ: 0

RELATIVE VALUE (ARBITRARY) (202):
- X: 0
- Y: 0
- Z: 30 (208)
- α: 0
- β: 0
- γ: 0

SETTING:
- REFERENCE: P001
- COORDINATE: TOOL

FIG. 5D

| | | | |
|---|---|---|---|
| TEACHING POINT NAME | P100 212 | DETERMINE 209 | CANCEL 210 |

ABSOLUTE VALUE (201):
- X: 400
- Y: 350
- Z: 270
- α: 0
- β: 180
- γ: 0

RELATIVE VALUE (ARBITRARY) (202):
- X: 0
- Y: 0
- Z: 30
- α: 0
- β: 0
- γ: 0

SETTING:
- REFERENCE: P001
- COORDINATE: TOOL

FIG. 6C

| TEACHING POINT NAME | P100 | | | DETERMINE | CANCEL |
|---|---|---|---|---|---|
| ABSOLUTE VALUE | | RELATIVE VALUE (ARBITRARY) | | SETTING | |
| X | 400 | X | 0 | REFERENCE | P001 |
| Y | 350 | Y | 0 | COORDINATE | BASE |
| Z | 300 | Z | -30 | | |
| α | 0 | α | 0 | | |
| β | 180 | β | 0 | | |
| γ | 0 | γ | 0 | | |

FIG. 6D

| TEACHING POINT NAME | P100 | | | DETERMINE | CANCEL |
|---|---|---|---|---|---|
| ABSOLUTE VALUE | | RELATIVE VALUE (ARBITRARY) | | SETTING | |
| X | 400 | X | 0 | REFERENCE | P001 |
| Y | 350 | Y | 0 | COORDINATE | BASE |
| Z | 270 | Z | -30 | | |
| α | 0 | α | 0 | | |
| β | 180 | β | 0 | | |
| γ | 0 | γ | 0 | | |

FIG. 19A

| TEACHING POINT NAME | P100 | | | DETERMINE | CANCEL |
|---|---|---|---|---|---|

ABSOLUTE VALUE (201):
- X: 400
- Y: 350
- Z: 300
- α: 0
- β: 180
- γ: 0

RELATIVE VALUE (ARBITRARY) (202):
- X: 0
- Y: 0
- Z: 0
- α: 0
- β: 0
- γ: 0

SETTING:
- REFERENCE: P001 (203)
- COORDINATE: TOOL (204)

| TEACHING POINT NAME | P100 | | | DETERMINE | CANCEL |
|---|---|---|---|---|---|

ABSOLUTE VALUE (201) (208):
- X: 300
- Y: 350
- Z: 300
- α: 0
- β: 180
- γ: 0

RELATIVE VALUE (ARBITRARY) (202):
- X: 0
- Y: 0
- Z: 30
- α: 0
- β: 0
- γ: 0

SETTING:
- REFERENCE: P001 (203)
- COORDINATE: TOOL (204)

FIG. 19C

| TEACHING POINT NAME | P100 | | | DETERMINE | CANCEL |
|---|---|---|---|---|---|

ABSOLUTE VALUE (201):
- X: 300
- Y: 350
- Z: 270
- α: 0
- β: 180
- γ: 0

RELATIVE VALUE (ARBITRARY) (202):
- X: 100
- Y: 0
- Z: 30
- α: 0
- β: 0
- γ: 0

SETTING:
- REFERENCE: P001 (203)
- COORDINATE: TOOL (204)

FIG. 20A

| TEACHING POINT NAME | P100 | | | DETERMINE | CANCEL |
|---|---|---|---|---|---|

ABSOLUTE VALUE (201):
- X: 400
- Y: 350
- Z: 300
- α: 0
- β: 180
- γ: 0

RELATIVE VALUE (ARBITRARY) (202):
- X: 0
- Y: 0
- Z: 0
- α: 0
- β: 0
- γ: 0

SETTING:
- REFERENCE: P001
- COORDINATE: BASE

FIG. 20B

| TEACHING POINT NAME | P100 | | | DETERMINE | CANCEL |
|---|---|---|---|---|---|

ABSOLUTE VALUE (201):
- X: 300
- Y: 350
- Z: 300
- α: 0
- β: 180
- γ: 0

RELATIVE VALUE (ARBITRARY) (202):
- X: 0
- Y: 0
- Z: -30
- α: 0
- β: 0
- γ: 0

SETTING:
- REFERENCE: P001
- COORDINATE: BASE

FIG. 20C

| TEACHING POINT NAME | P100 | | | DETERMINE | CANCEL |
|---|---|---|---|---|---|

ABSOLUTE VALUE (201):
- X: 300
- Y: 350
- Z: 270
- α: 0
- β: 180
- γ: 0

RELATIVE VALUE (ARBITRARY) (202):
- X: -100
- Y: 0
- Z: -30
- α: 0
- β: 0
- γ: 0

SETTING:
- REFERENCE: P001
- COORDINATE: BASE

FIG. 25A

INFORMATION PROCESSING METHOD AND INFORMATION PROCESSING APPARATUS

This application is a division of application Ser. No. 15/134,730, filed Apr. 21, 2016.

BACKGROUND OF THE INVENTION

Field of the Invention

The present invention relates to an information processing method and an information processing apparatus that edit position data and orientation data that identify the positions or orientations of parts of a robot apparatus, and display the state of the robot identified by the position data and the orientation data.

Description of the Related Art

In recent years, for example, automatic production systems have been developed that cause an industrial robot apparatus to perform assembly simulating a human motion. It is required to perform programming (teaching) so as to allow an operation weaving between obstructions placed in surroundings, as with a human motion. For programming (teaching) a robot apparatus, an apparatus is sometimes used that is called a teaching pendant and allows the robot to actually perform an operation in a placement environment while accumulating and recording position and orientation data for performing the operation.

An information processing apparatus that has a hardware configuration substantially equivalent to that of a personal computer (PC) is sometimes used for programming (teaching) the robot apparatus. Such an information processing apparatus for programming (teaching) a robot apparatus has hardware including a displaying apparatus, a computer, a keyboard, and a pointing device. Such type of apparatus is configured so as to have a capability of programming (teaching) the robot operation through a form of a programming language for robot controlling or a form of a numeric value of position and orientation data. The information processing apparatus for programming (teaching) the robot apparatus may be used in an offline environment without actual connection to the robot apparatus.

Unfortunately, to cause the robot apparatus to perform, for example, an assembly operation simulating a human motion in consideration of interference with the surroundings, the teaching operation becomes significantly complex. This complexity tends to increase the man-hour for teaching and cause many teaching errors. In particular, the teaching operation that is performed in an offline environment incapable of confirming the actual operation of the robot using the information processing apparatus for programming (teaching) the robot apparatus as described above is difficult, and tends to cause problems, such as the increase in man-hour and teaching errors.

Here, as an example of a complex robot operation, a palletizing operation is discussed. The palletizing obtains (or obtains and moves, to another place,) one by one, works (parts) accommodated in respective spaces in a box separated by partitions. In actuality, such a palletizing operation requires total two teaching points for each one of the works accommodated in the different positions. The teaching points are an obtaining position, and a hovering position before obtainment. The teaching point is described in a format such as the format of the position and orientation data on a predetermined reference part at a distal end of a robot arm. For processing multiple works, at least the two teaching points are required to be taught for each of the works. In the case of teaching all the teaching points through manual teaching operations, the more the number of works increases, the more the man-hour for teaching increases. The increase significantly complicates the operations.

There is a scheme for simplifying the teaching. This scheme is a teaching method of obtaining the amount of relative movement from one reference teaching point to the next teaching point based on designed values, and setting the relative value as an offset. According to this method, in the case of the palletizing operation, a teaching point corresponding to a work can be taught only by teaching the reference teaching point corresponding to one work serving as a reference and subsequently setting offsets for other works.

The following Japanese Patent Application Laid-Open No. H8-328637 and Japanese Patent Application Laid-Open No. 2010-188485 disclose techniques that use a scheme of setting a relative value as the offset of the reference teaching point to thus set the relative value in the different coordinate system direction as the offset. Japanese Patent Application Laid-Open No. H8-328637 describes a method of setting an offset in a base coordinate system direction of a robot from a teaching point serving as a reference through use of an offset variable in an operation program, and performing trajectory calculation, thereby achieving movement to an offset position and orientation. The advantage of the offset is to easily achieve the movement of a robot in the horizontal, back-and-forth, and lateral directions. However, for an offset through much use of an oblique direction, translation, and rotation, matrix calculation according to the direction and angle is required. This calculation causes a problem of being susceptible to calculation and setting errors.

Meanwhile, Japanese Patent Application Laid-Open No. 2010-188485 discloses a method of setting an offset in a direction of a tool coordinate system defined at a distal end of a tool of a robot from a teaching point serving as a reference through use of an offset variable in an operation program, and performing trajectory calculation, thereby achieving movement to an offset position and orientation. The tool coordinate system is, for example, a coordinate system having an origin that is a tool center point (TCP) arbitrarily set by an operator. According to this method, for example, in the case of movement of a reference part in an oblique direction, the TCP is set so as to align the oblique direction with one direction of the tool coordinate system on the same straight line, and a relative value serving as the amount of movement in one direction is set. These settings allow movement in the desired oblique direction to be achieved.

As in Japanese Patent Application Laid-Open No. 2010-188485, it can be considered that a coordinate system, except a base coordinate system, allowing an operator to easily grasp the state, for example, the tool coordinate system, is used to facilitate an operation of setting a teaching point through, e.g., input of numeric values, and can reduce setting errors. For example, use of the tool coordinate system can input or edit the teaching point through relative value information in a coordinate system allowing the operator to easily imagine the state, such as an indicating direction with respect to the current orientation of the robot. Consequently, data operation, such as calculation of relative value information from a designed value is facilitated, thereby allowing the teaching man-hour and operational errors to be reduced. In the case of palletizing, teaching can be performed by setting one of work obtaining positions as a teaching point that is to be a reference, and setting the residual work obtaining positions and pre-obtaining positions, for example, as offsets in the base coordinate system relatively at regular intervals.

Here, both the case of performing teaching using a teaching pendant at an installation site while operating an actual robot and the case of performing teaching in an offline using the information processing apparatus as described above have advantages and disadvantages. For example, in the case of the palletizing, confirmation of the position and orientation having been offset according to the setting through use of an actual robot has a possibility that the robot interferes with a partition in the box during the confirmation. Meanwhile, a wide variety of schemes for inputting a teaching point using the offset can be prepared for the information processing apparatus for offline usage. Even without an operation of an actual robot, programming can replace such an operation. Consequently, the operation can advantageously be confirmed without causing interference with the placement environment.

Thus, in recent years, a configuration allowing the information processing apparatus for offline usage to perform offline teaching and confirmation of operation has been proposed. For example, instead of using a created teaching data to operate an actual apparatus, trajectory calculation based on a teaching data or three-dimensional model rendering is performed to cause a virtually displayed robot to operate in a display screen to confirm the operation. The following Japanese Patent Application Laid-Open No. 2014-117781 discloses a displaying apparatus and a teaching point formation method that form the teaching point in a virtual environment, create an operation program using the formed teaching point, and reproduce the operation trajectory of a robot in the virtual environment, thereby allowing confirmation of the state of interference with the operation of the robot.

It can be considered that if the operation trajectories created by Japanese Patent Application Laid-Open No. H8-328637 and Japanese Patent Application Laid-Open No. 2010-188485 are reproduced in the virtual environment according to Japanese Patent Application Laid-Open No. 2014-117781, the state of the complicated position and orientation can be confirmed without using an actual robot.

Unfortunately, the method of teaching (programming) the robot using such a virtual environment has some technical problems.

For example, the information processing using the offset calculation and a plurality of different robot coordinate systems obtains the position and orientation having been offset through trajectory calculation. In this case, if the position and orientation having been offset are within a movable range due to hardware limitation of the robot arm, actual movement of the robot causes no problem. However, the movable range of the robot is sometimes exceeded at the middle of the trajectory in case the operation program is erroneously created. In case a trajectory calculation error occurs, confirmation cannot be displayed any more without solving the occurring error. In the palletizing, correction of the teaching point serving as the reference changes the associated position and orientation having been offset. This change sometimes causes the position and orientation having been offset to be out of the movable range.

However, the conventional techniques have a problem in that error handling in the case where the position and orientation data is changed by an offset input or newly created cannot sufficiently be performed. For example, in information processing according to conventional robot control data (teaching data), for example, the position and orientation data is often stored, in a storing apparatus, as a simple flat data list containing items sequentially arranged along a time series where the reference part of the robot is moved. However, an actual robot control data (teaching data) sometimes has a relationship where change in the position and orientation data at a specific teaching point affects the position and orientation data at one or more other teaching points. For instance, the relationship between the reference teaching point of palletizing and another teaching point associated through an offset constitutes an example.

The conventional techniques often store position and orientation data as a simple flat data list. Accordingly, it is not easy to identify the range of the other position and orientation data affected by change in the position and orientation data at a specific teaching point. Consequently, in the information processing according to the conventional robot control data (teaching data), even if the position and orientation data at the specific teaching point is changed, it is not easy to identify the range subjected to a check process of whether the trajectory calculation or operation is within the movable range or not. Accordingly, even if the position and orientation data at the specific teaching point is input, edited or corrected, the display of the operation confirmation related to the change cannot immediately or sufficiently be performed in the conventional technique.

Also as to error checking on trajectory calculation, according to the storing format at the teaching point (position and orientation data) as described above, there is, for example, a possibility that the calculation cannot be performed without designation of the range of the stored teaching point to be subjected to trajectory calculation by a user. The conventional techniques can determine whether a trajectory calculation error (e.g., the position and orientation at the specific part is out of the movable range) occurs or not, only through trajectory calculation for the designated range. Consequently, even if a specific teaching point is input, edited or corrected, the trajectory calculation error cannot immediately be checked, and the user cannot confirm the trajectory calculation error at timings of the input, edit and correction.

SUMMARY OF THE INVENTION

In view of the above problems, when the position and orientation data of a robot apparatus is input, edited or corrected, the range of the affected position and orientation data should immediately be identified, and the error checking on trajectory calculation for the position and orientation data in the range should be allowed to be performed. In the process of inputting, editing or correcting the position and orientation data related to the teaching point, the progress of the input, edit or correction during execution should be allowed to be confirmed substantially in real time according to the operation through, for example, one of virtual display output and numeric value display. In input, edit or correction of the position and orientation data, the position and orientation data should be allowed to be designated through a relative value that is an offset, and a robot coordinate system that is easily grasped should arbitrarily be selected among multiple robot coordinate systems and used. Furthermore, the data structure for storing the position and orientation data of the robot apparatus should be improved.

According to an aspect of the present invention, provided are information processing method and apparatus using: a displaying apparatus that includes a virtual environment displaying unit of virtually displaying a state of a robot apparatus identified by a plurality of position data and orientation data identifying a position or an orientation of each part of the robot apparatus, and a parameter displaying unit of numerically displaying the position data and the orientation data; an operating input unit of editing content of the position data and the orientation data; and a controlling apparatus that performs information processing of controlling display on the displaying apparatus according to an operation and input through the operating input unit, and performed therein are: first calculating, when an operation and input of changing a part of the position data and the orientation data are performed through the operating input unit, causing the controlling apparatus to change the part of the position data and the orientation data according to content of the operation and input; second calculating that causes the controlling apparatus to perform position and orientation calculation that identifies the position or orientation of each part of the robot apparatus, based on the part of the position data and the orientation data changed in the first calculating, and calculate new position data and new orientation data based on a result of the position and orientation calculation; and display updating that causes the controlling apparatus to update content of virtual display on the virtual environment displaying unit or numeric value display on the parameter displaying unit of the displaying apparatus, based on the part of position data and orientation data changed in the first calculating, and the new position data and the new orientation data calculated in the second calculating.

In the case where different parts of the robot apparatus have a specific dependent relationship that can be identified based on the structure of the robot apparatus, the data structure allowing a storage unit to store the position and orientation data may has a configuration that stores the multiple position data and orientation data corresponding to the respective different parts as hierarchic structure data.

According to the configuration, when the position and orientation data of a robot apparatus is input, edited or corrected, the range of the affected position and orientation data can immediately be identified, and the error checking on trajectory calculation for the position and orientation data in the range can be allowed to be performed. In the process of inputting, editing or correcting the position and orientation data related to the teaching point, the progress of the input, edit or correction during execution can be confirmed substantially in real time according to the operation through one of virtual display output and numeric value display. Consequently, the operation man-hour can be reduced. The multiple position data and orientation data of the robot apparatus are thus stored as the hierarchic structure data, which allows associated position data and orientation data to be automatically edited in an appropriate manner according to input, edit and correction operations, and allows the result to be appropriately reflected in the virtual display output or the numeric value display.

Further features of the present invention will become apparent from the following description of exemplary embodiments with reference to the attached drawings.

BRIEF DESCRIPTION OF THE DRAWINGS

FIGS. 5A, 5B, 5C and 5D are diagrams illustrating parameter setting screens according to Embodiment 1 of the present invention.

FIGS. 6A, 6B, 6C and 6D are diagrams illustrating different parameter setting screens according to Embodiment 1 of the present invention.

FIGS. 19A, 19B and 19C are diagrams illustrating parameter setting screens according to Embodiment 3 of the present invention.

FIGS. 20A, 20B and 20C are diagrams illustrating parameter setting screens according to Embodiment 3 of the present invention.

FIGS. 25A, 25B and 25C are diagrams illustrating parameter setting screens according to Embodiment 5 of the present invention.

DESCRIPTION OF THE EMBODIMENTS

Preferred embodiments of the present invention will now be described in detail in accordance with the accompanying drawings.

Hereinafter, referring to embodiments illustrated in the accompanying diagrams, modes for implementing the present invention are described. The following embodiments are only exemplary ones. For example, the detailed configuration can appropriately be changed by those skilled in the art in a range without departing the gist of the present invention. Numeric values described in the embodiments are for reference purposes, and do not limit the present invention.

Embodiment 1

Hereinafter, referring to FIGS. 1 to 10, an embodiment of an information processing apparatus and an information processing method for teaching (programming) a robot apparatus that adopts the present invention is described.

Figure 1:
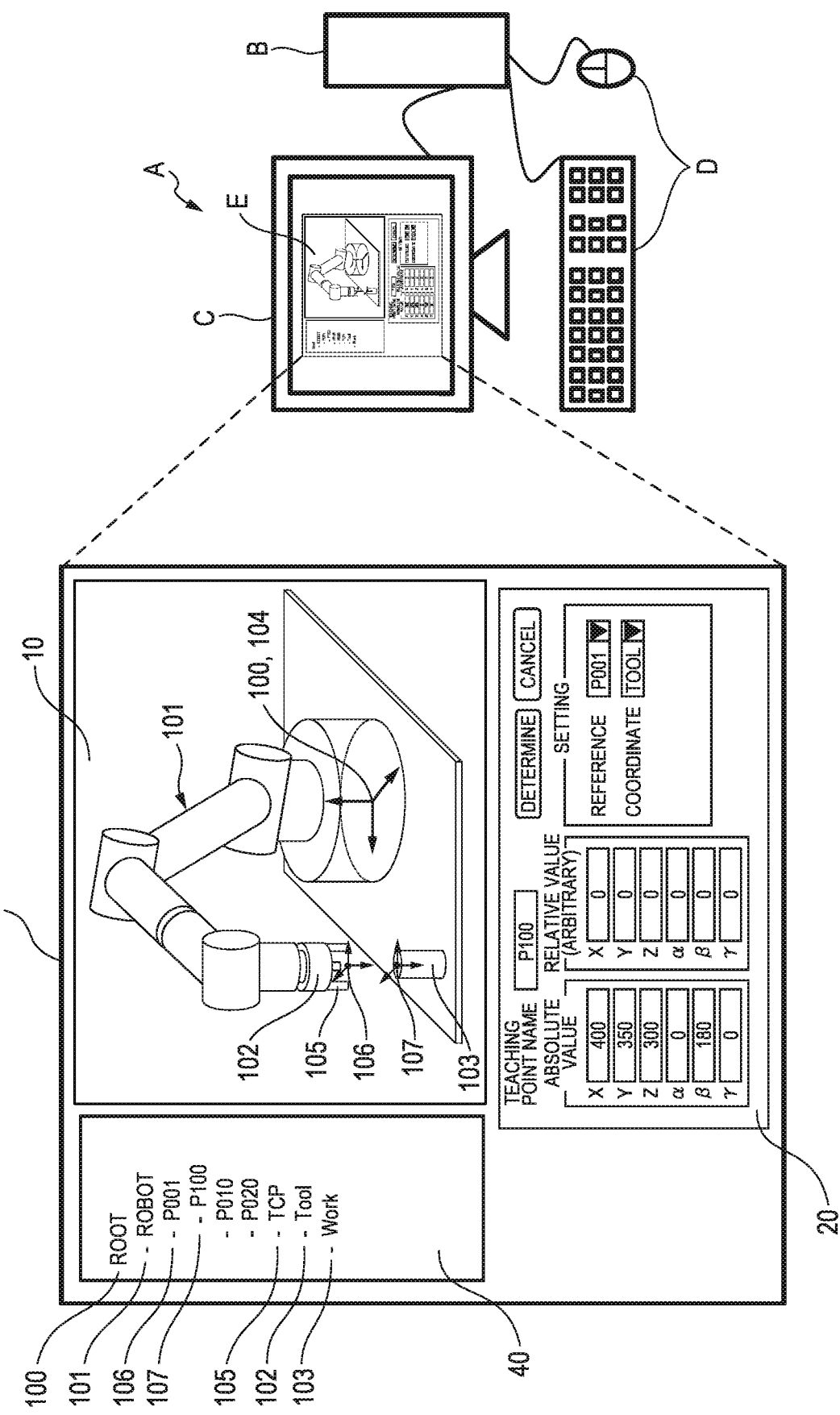
FIG. 1 is a diagram illustrating a displaying apparatus according to Embodiment 1 of the present invention.
Figure 2:
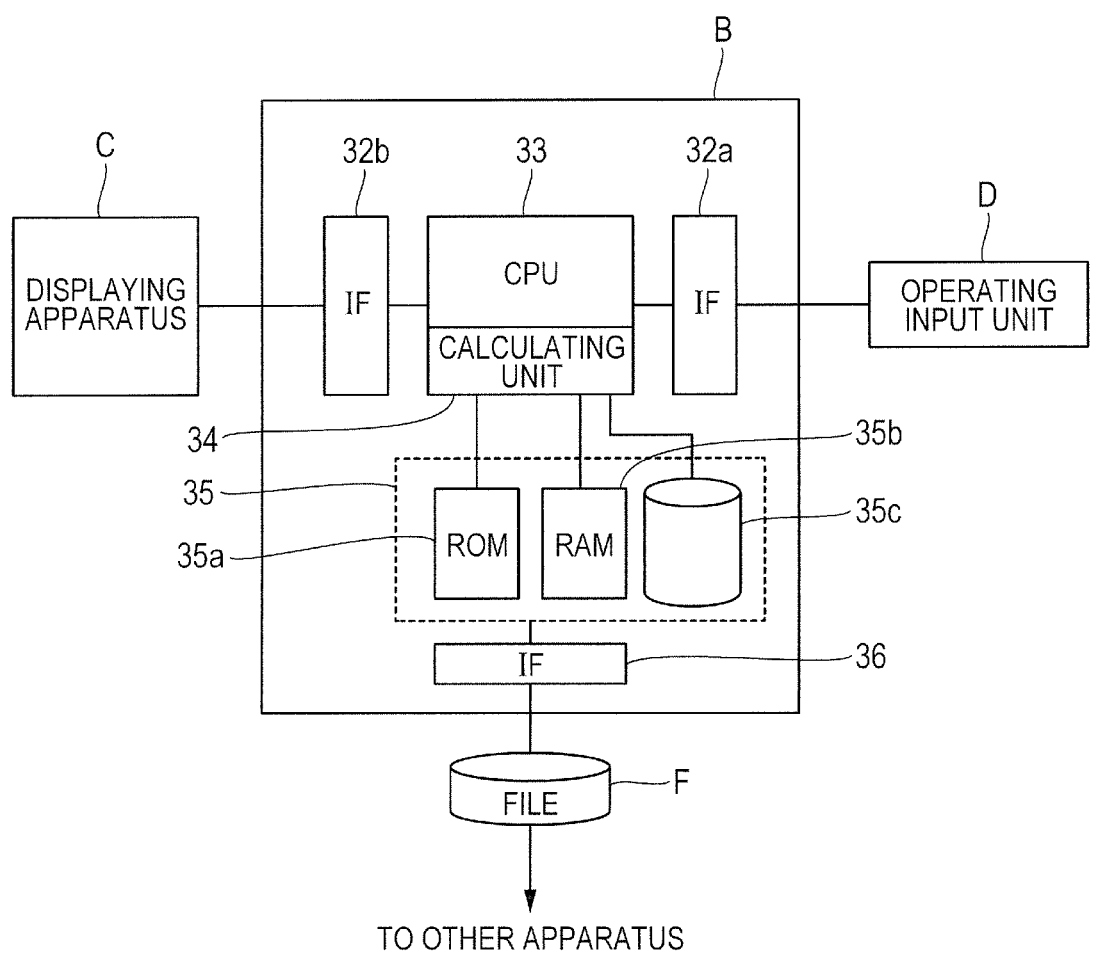
FIG. 2 is a block diagram of an offline teaching system according to Embodiment 1 of the present invention.

FIGS. 1 and 2 illustrate the configuration of the information processing apparatus A according to this embodiment. As illustrated in FIG. 1, the information processing apparatus A of this embodiment may have a configuration where, for example, a personal computer B is equipped with a displaying apparatus C and an operating input unit D, which serve as interfaces. The operating input unit D may be operation devices, such as a pointing device including a mouse or a track pad, and a keyboard.

The displaying apparatus C may be a displaying apparatus, such as an LCD (or a displaying apparatus with another display scheme). The displaying apparatus C may be configured by stacking what is called a touch panel on the display screen of the apparatus. In such a case, an input operation equivalent to an operation for an operation device, such as a pointing device or a keyboard of the operating input unit D, may be achieved through the touch panel. In some cases, a configuration without the operating input unit D may be adopted.

The information processing apparatus A of this embodiment is configured so that the apparatus can be used to input, edit and change the teaching data of the robot apparatus mainly in an offline environment rather than an online environment where the apparatus is actually connected to the robot apparatus and this apparatus is operated. The information processing apparatus A of this embodiment is configured so as to allow operations of inputting, editing and changing the teaching data for the robot apparatus to be performed through the operating input unit D, and can display, for example, a display screen E for the offline teaching system as illustrated in FIG. 1 on the displaying apparatus C.

The display screen E in FIG. 1 has a configuration that includes at least a virtual environment screen 10, a parameter setting screen 20, and a management screen 40.

The virtual environment screen 10, the parameter setting screen 20, and the management screen 40 may be configured as graphical user interfaces (GUIs). In this case, display objects (such as a menu, input fields for numeric values and characters, and a virtual display of the robot arm) constituting the display screen E are configured so as to allow operations through the pointing device, such as a mouse, (or the touch panel) of the operating input unit D. Details of a method of implementing such a GUI environment are almost publicly known. Consequently, the detailed description of the method is herein omitted.

On the virtual environment screen 10 (virtual environment displaying unit), a virtual environment is displayed. In the virtual environment, a placement environment equivalent to that of the actual robot apparatus to be programmed (taught) by this apparatus is reproduced. For example, the virtual environment screen 10 virtually displays the state of the robot 101 apparatus identified by the position and orientation data in a three-dimensional model representation, such as of a three-dimensional CAD model. In this case, the display control function of a CPU (33), described later, for controlling the displaying apparatus C renders, for example, a three-dimensional image of the robot 101 at the position and orientation identified by the position and orientation data in a virtual space that simulates the operating environment of the robot 101, and achieves virtual display. Such (image) displaying control for virtually displaying the robot 101 through three-dimensional CAD model representation according to the position and orientation data is publicly known. Consequently, the detailed description of this control is herein omitted.

In the case of FIG. 1, the robot 101 corresponding to the actual robot apparatus programmed (taught) by the present apparatus, a tool 102 attached to the distal end of the robot 101, and a work 103 are placed and displayed on the virtual environment screen 10. In this embodiment, when the user (operator) performs input or editing for the robot program or the teaching data (position and orientation data), the display of the virtual environment on the virtual environment screen 10 is updated according to the change. The user (operator) can thus easily confirm the details of the input or editing through the display of the virtual environment on the virtual environment screen 10.

Many robot apparatuses adopt coordinate data for representing the position and orientation data. Coordinate data items in some different coordinate systems are used to represent the coordinate data. For example, the robot 101 dealt with by this apparatus adopts a base coordinate system 104 (absolute coordinate system 100) and a tool coordinate system 105. In this embodiment, the base coordinate system 104 of the robot 101 is arranged at a position that coincides with the absolute coordinate system 100 of the virtual environment. At the distal end of the tool 102, there is the tool coordinate system 105. These coordinate systems are three-dimensional coordinate systems. On the virtual environment screen 10, the coordinate axes that are the three axes (X, Y, Z) can be displayed as illustrated in the diagram, as necessary.

On the virtual environment screen 10 exemplified in FIG. 1, a teaching point 106 serving as a reference is displayed above the work 103. This teaching point 106 is, for example, a teaching point having already been input. For example, an operation of causing the tool 102 to descend from the teaching point 106 toward the work 103 is herein discussed.

In this case, a method of teaching an offset teaching point 107 set using a relative value that is an offset from the teaching point 106 serving as the reference, on an upper surface of the work 103 is used, for example. In this case, the relative value of the offset used for the teaching point 106 is represented by a numeric value, such as the amount of movement (distance) in the Z-axis direction, for example. On the virtual environment screen 10 in FIG. 1, the position and orientation of the robot 101 are displayed as position and orientation in the case where a predetermined part of the robot (e.g., a grasping center of the tool 102 or the center of a tool attachment surface) coincides with the teaching point 106 serving as the reference.

Furthermore, the parameter setting screen 20 is displayed on the display screen E of the displaying apparatus C. In this embodiment, the parameter setting screen 20 has both a function as a parameter displaying unit that displays a numeric value of the position and orientation data, and a function of a parameter setting unit that sets the value through a GUI operation. On the parameter setting screen 20, parameters representing the current position and orientation of the robot 101 are represented in a form of numeric value representation at respective display positions. The display positions of the numeric values corresponding to the respective parameters on the parameter setting screen 20 are each configured as what is called an input box for numeric value (character) input. A configuration is adopted where the numeric values (or characters) in the input boxes for these parameters can newly be input and values having already been input can be changed by an operation through the operating input unit D. The details of hardware and software for implementing such a user interface through the input boxes are publicly known. Consequently, the detailed description is herein omitted.

The teaching data (the entities of the teaching point, the position and orientation and numeric value data) for controlling the robot apparatus (robot 101), and model information for modeling or rendering in three-dimensional model representation on the virtual environment screen 10 are stored and managed in a format of a hierarchic data.

A RAM 35b and an external storing apparatus 35c of the storing apparatus 35 are used as storage units for storing the multiple position data and orientation data. For example, in the case of presence of a specific dependent relationship according to which different parts of the robot 101 are identified by the structure of the robot apparatus, the multiple position data and orientation data corresponding to the respective different parts are stored as the hierarchic structure data in the storing apparatus 35.

The structure and details of the hierarchic structure data can be understood through, for example, illustration of the following management screen 40 (management displaying unit).

That is, in this embodiment, the management screen 40 (management displaying unit) for displaying the data structures of the teaching data (the teaching point and the position and orientation data) and the model information is displayed on the display screen E of the displaying apparatus C. On the management screen 40, the model information displayed on the virtual environment screen 10 and the teaching point information are comprehensively subjected to node management, and the state is displayed in a form of what is called a tree diagram.

The node management related to the teaching data and the model information in this embodiment adopts a data structure which defines the model information on the root at the top as the absolute coordinate system 100 (ROOT), and indicates the association between multiple model information items in branches and the hierarchic structure in the absolute coordinate system (100). In the data structure of the position and orientation data in this embodiment, a model close to the root is called a parent model, and a model close to a leaf is called a child model.

It is assumed that information managed as association holds the relationship between parent and child pieces of model information, and the relative value information representing the position and orientation of the model from the parent to the child. Note that information managed by node management related to the teaching data and the model information in this embodiment is not limited to the relative value information. For example, the absolute value information corresponding to the positions and orientations of the models from the root to the child may be stored.

The data storing format of the (hierarchic) node format for managing the teaching data and the model information in this embodiment may adopt a format that is, for example, a linked list that associates the data on each node through, e.g. an address pointer, and stores the data on a memory. Alternatively, in the case of storing the teaching data and the model information in a file system in an external storing apparatus, such as an HDD or SSD, a data storing format in any of various types of relational database systems may be adopted.

Through the entire specification, the display of the management screen 40 is dealt with as visual representation of a hierarchic tree structure that includes the nodes of the teaching data (position and orientation data) stored in the storing apparatus 35. Meanwhile, the illustration of the management screen 40 can be considered as memory map representation of the teaching data (position and orientation data) on the tree structure stored in the storing apparatus 35.

According to the node management described above, when the relative value information serving as the position and orientation of the parent model is changed, traceability can be achieved according to the parent model because the child model holds the relative value information corresponding to the position and orientation of the model from the parent to the child.

According to the data structure displayed on the management screen 40 in FIG. 1, the robot 101 (ROBOT) and the work 103 (Work) are positioned at the descendant of the child model information in the absolute coordinate system 100 (ROOT). The tool 102 (Tool) and the tool coordinate system 105 (TCP) are positioned at the child model information of the robot 101. Furthermore, the teaching point is associated with the child model of the robot 101. For example, as one of the child models of the robot 101, the teaching point 106 (P001) serving as the reference is associated. Furthermore, the offset teaching point 107 (P100) is associated with the child model at the teaching point 106 serving as the reference.

Next, FIG. 2 illustrates a configuration of a control system made up of the personal computer B of the information processing apparatus A in FIG. 1. As illustrated in FIG. 2, the personal computer B constituting the information processing apparatus A in FIG. 1 includes the CPU 33, a ROM 35a, a RAM 35b, and an external storing apparatus 35c in an aspect of hardware. Furthermore, the personal computer B includes an interface 32a for connection to the operating input unit D, an interface 32b for connection to the displaying apparatus C, and an interface 36 for transmitting and receiving data to and from an external apparatus in, for example, a format of a file F. These interfaces include, for example, various types of serial buses and parallel buses, and network interfaces.

FIG. 2 illustrates a calculating unit 34 together with the CPU 33. This calculating unit 34 is achieved by the CPU 33 executing a control program for the following control calculation in actuality. The displaying apparatus C displays the GUI type display screen E that includes the virtual environment screen 10, the parameter setting screen 20, and the management screen 40. The operating input unit D constitutes a graphical user interface (GUI) together with the display screen E of the displaying apparatus C, and accepts a GUI operation by the user through the pointing device and the keyboard of the operating input unit D.

The CPU 33 performs a system control for the entire information processing apparatus A. The CPU 33 performs the control calculation for the calculating unit 34 based on an input performed by the operating input unit D and an edit operation. The control calculation of the calculating unit 34 generates display control information for updating the display on the displaying apparatus C, and updates the teaching data and the model information stored in the storing apparatus 35.

The storing apparatus 35 stores the three-dimensional CAD model information displayed on the virtual environment screen 10, placement environment information, and the teaching data. In particular, the teaching data and the model information are stored in the (hierarchic) node format. Various types of data stored in the storing apparatus 35 are output according to a request issued by the CPU 33, and updated according to a request issued by the CPU 33.

According to a request issued by an external apparatus or a specific operation through the operating input unit D, the CPU 33 can transmit the various types of data stored in the storing apparatus 35 in the format of the file F through the interface 36. Furthermore, the file F can be read from the outside via the interface 36, as necessary. For example, at activation of the information processing apparatus A or in a restoring process, the file F having previously been output can be read from the external apparatus (e.g., any of external storing apparatuses, such as external HDD, SDD and NAS), the storing apparatus 35 can be updated, and the previous storing state can be reproduced.

In this embodiment, the storing area in the storing apparatus 35 that stores the teaching data and the model information for the robot 101 may arbitrarily be defined. For example, a predetermined area on the RAM 35*b* and a storing area (e.g., corresponding to a predetermined file) of the external storing apparatus 35*c* may be used.

What has been described above is one example of the entire configuration of the information processing apparatus A. For example, the hardware configuration such as of the personal computer B has thus been exemplified as an example of a system suitable for offline teaching. However, the information processing apparatus A is not limited to the offline teaching system. Alternatively, this apparatus may have a hardware configuration, such as of a teaching pendant that is placed at a location with the robot apparatus. In this case, if a displaying apparatus of the teaching pendant has a configuration capable of displaying a virtual environment screen equivalent to what has been described above, a configuration equivalent to that of this embodiment can be implemented.

As an example of the formation and editing processes in this embodiment, processes of forming and editing the offset teaching point 107 in the configuration described above are described. The processes of forming and editing the offset teaching point 107 perform different processes and display according to an operation through the operating input unit D and the GUI on the displaying apparatus C.

For example, as to the offset teaching point 107 in FIG. 1, such a type of information processing apparatus A is required to support input and editing of the position and orientation data using a coordinate value in a different coordinate system. Furthermore, this apparatus is also required to support the case where the user switches the coordinate system used for parameter display after the position and orientation data is once input, and the case where the user edits the position and orientation data on the teaching point 106 serving as the original reference.

As to the processes of forming and editing the offset teaching point 107, the following four cases are hereinafter described. These processes are forming and editing processes in "the case of selecting the tool coordinate system 105", "the case of selecting the base coordinate system 104", "the case of switching the coordinate systems", and "the case of editing the teaching point 106 serving as the reference".

(Formation of Offset Teaching Point Using Tool Coordinate System)

The first case, that is, procedures and process for forming the offset teaching point 107 by selecting the tool coordinate system 105 are described with reference to FIGS. 3 to 5D and FIGS. 7A to 8. In this example, the offset teaching point 107 offset by "30 mm" in the Z-axis direction from the teaching point 106 serving as the reference is formed.

Figure 3:
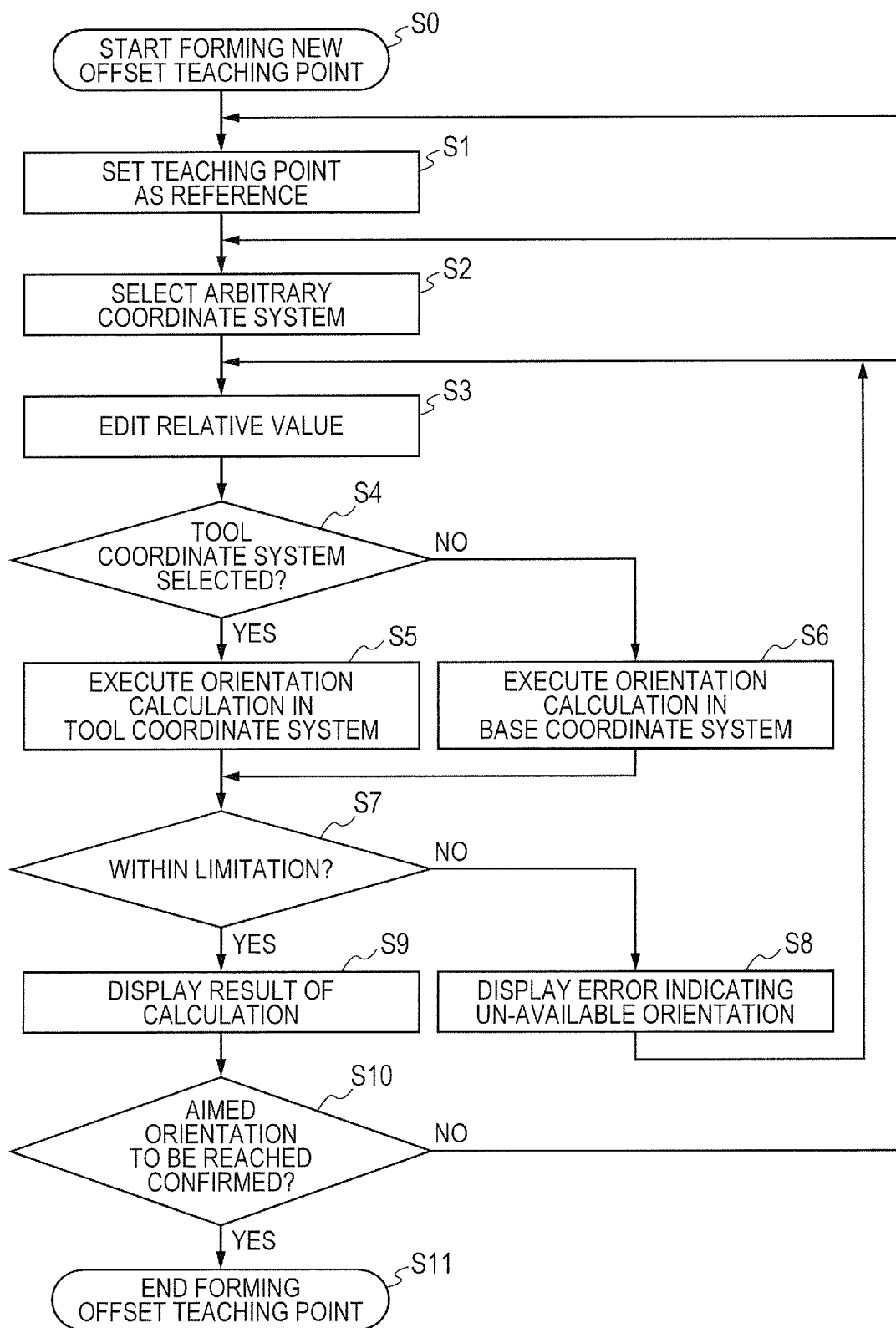
FIG. 3 is a flowchart illustrating formation of an offset teaching point according to Embodiment 1 of the present invention.

FIG. 3 illustrates a flow of control procedures executed by the CPU 33 in the case of newly forming the offset teaching point 107. The illustrated procedures can be stored in a form of a program executable by the CPU 33, for example, in the ROM 35*a* of the storing apparatus 35 or in the external storing apparatus 35*c*. This point is analogous to that in the control procedures illustrated in another flowchart, described later.

The ROM 35*a* corresponds to a recording medium that is for storing an information processing program, as described later, and is readable by the computer (CPU 33). The CPU 33 executes robot control including torque control, as described later, by executing the information processing program stored in, for example, the ROM 35*a*. A part of the ROM 35*a* may be made up of a rewritable nonvolatile region, such as E(E)PROM. In this case, the nonvolatile region may be made up of a computer-readable memory device (recording medium), such as a flash memory or an optical disk, not illustrated. For example, the memory device is replaced, which allows the information processing program to be installed or updated. The information processing program obtained via the network may newly be installed in the rewritable nonvolatile region. The information processing program stored in the rewritable nonvolatile region can be updated with data obtained from the computer-readable recording medium or via a network.

FIGS. 4A to 4D illustrate display states on the virtual environment screen 10 of the robot 101 related to the processes of forming and editing the offset teaching point 107. FIG. 1 includes illustration as with a perspective view from the front. Meanwhile, FIGS. 4A to 4D adopt illustration of the virtual environment screen 10 from a side for convenience of understanding.

Figure 4A:
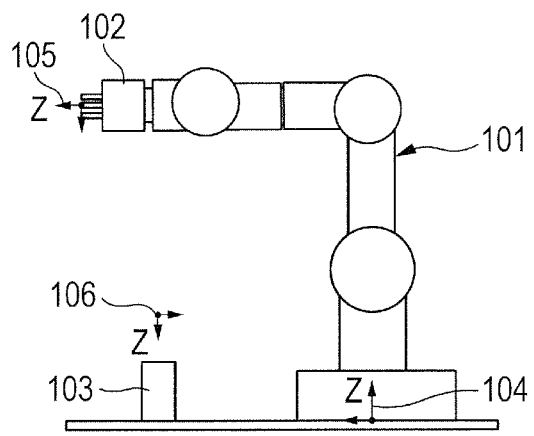
FIGS. 4A, 4B, 4C and 4D are diagrams illustrating virtual environment screens according to Embodiment 1 of the present invention.

FIG. 4A illustrates the initial orientation of the robot 101, and the position and orientation at the start of the process of forming the offset teaching point 107 in FIG. 3. The teaching point 106 serving as the reference is, for example, the teaching point represented by the relative value of the robot 101 from the base coordinate system 104. A state is herein assumed where the point has already been formed.

FIGS. 5A to 5D (also later-described FIGS. 6A to 6D) illustrate the GUI during formation and editing processes of the offset teaching point 107, in particular, the state of input and display on the parameter setting screen 20.

According to the processing procedures in FIG. 3, in step S0, a predetermined operation is performed through the operating input unit D, and the process of newly forming the offset teaching point 107 is designated. For this formation of the teaching point (107), the parameter setting screen 20 as illustrated in FIGS. 5A to 5D is used.

On the parameter setting screen 20 in FIGS. 5A to 5D, an absolute value setting unit 201, a relative value setting unit 202, a teaching point setting unit 203, and a coordinate system selecting unit 204 are displayed. In the initial state in FIG. 5A, the operation of newly forming the offset teaching point has not been performed yet, and no parameter has been input.

The absolute value setting unit 201 is used to input an absolute coordinate value in, for example, an absolute coordinate system (e.g., the base coordinate system 104). The relative value setting unit 202 is used to input a relative coordinate value in, for example, a relative coordinate system (e.g., the tool coordinate system 105). The coordinate system selecting unit 204 constitutes a coordinate system designating unit for designating one of different coordinate systems used in relation to the robot 101, as a coordinate system used to display a coordinate value corresponding to the position and orientation data on the parameter setting screen 20.

In newly forming the offset teaching point, the teaching point (106) serving as the reference is required to be set. In the case of setting the teaching point 106 serving as the reference (teaching point setting unit; step S1 in FIG. 3), an operation of setting the teaching point 106 serving as the reference is performed as illustrated in FIG. 5A.

For example, the user clicks the teaching point setting unit 203 in FIG. 5A at a cursor 205 of the mouse of the operating input unit D. In response to this clicking, the CPU 33 controls the displaying apparatus C to display a list 206 of teaching points which can be selected using the teaching point setting unit 203 on the parameter setting screen 20 in a manner of, for example, a pulldown menu. The user (operator) can select the teaching point 106 serving as the reference in this teaching point list 206 by mouse-clicking.

After the selection of the teaching point 106 serving as the reference is thus completed, the CPU 33 reads the parameter of the selected teaching point "P001" recorded in the storing apparatus 35, and updates the display screen E of the displaying apparatus C based on the read parameter. More specifically, display "REFERENCE" in the teaching point list 206 is switched to display corresponding to the teaching point "P001" as in FIG. 5B.

Figure 4B:
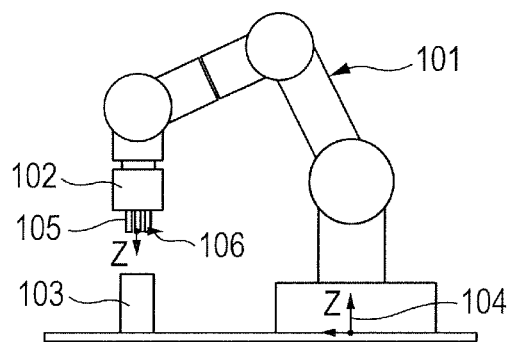

At this time, the display of the virtual environment screen 10 of the displaying apparatus C can be updated to, for example, the display as in FIG. 4B. FIG. 4B illustrates, from a side, the position and orientation of the robot 101 displayed on the updated virtual environment screen 10 of the displaying apparatus C. On the virtual environment screen 10 in FIG. 4B, the position and orientation are displayed where the reference part of the arm of the robot 101 coincides with the (reference) teaching point 106.

In this embodiment, any coordinate system can arbitrarily be selected to input a new offset teaching point 107 (coordinate system selecting unit; step S2).

For example, the user clicks the coordinate system selecting unit 204 at the cursor 205 of the mouse as illustrated in FIG. 5B. In response to this clicking, the CPU 33 controls the displaying apparatus C to display a list 207 of coordinate systems which can be selected using the coordinate system selecting unit 204 on the parameter setting screen 20 in a manner of, for example, a pulldown menu. The user (operator) can select any coordinate system in the coordinate system list 207 displayed on the coordinate system selecting unit 204. Here, the user selects, for example, the tool coordinate system 105 in the coordinate system list 207.

As illustrated in FIGS. 5A to 5D, the absolute value setting unit 201 and the relative value setting unit 202 are displayed on (a left part of) the parameter setting screen 20. The user can numerically input the position and orientation data on the teaching point designated as described above in the designated coordinate system, using the absolute value setting unit 201 and the relative value setting unit 202. The absolute value setting unit 201 and the relative value setting unit 202 can designate the position and orientation data with three-dimensional coordinate values and rotation angles about the axes, which are represented using, e.g., X, Y, Z, α, β and γ. In this representation, the unit of the coordinate values may be represented as, for example, "mm", and the rotation angles about the respective axes can be represented using, for example, Euler angles ZYX(αβγ).

In this stage, the user can set a relative value that is an offset of a new offset teaching point 107 (parameter setting unit; step S3).

A part above the absolute value setting unit 201 and the relative value setting unit 202 serves as a teaching point name setting unit 212 where a teaching point name to be created is input and displayed. Here, the user inputs a desired teaching point name (e.g., "P100" in the example in FIGS. 5A to 5D) in the teaching point name setting unit 212. At this stage, in the teaching point name setting unit 212, the CPU 33 may display an automatically created teaching point name in a state of having already been input.

In the input of the new offset teaching point 107, the initial state of every field in the relative value setting unit 202 is zero (FIG. 5B). At this time, in the absolute value setting unit 201, for example, the same value (copy) as the position and orientation data on the teaching point 106 serving as the reference can be displayed.

At this stage, as described above, as illustrated in FIG. 4B, the reference part of the arm is in the state of coinciding with the (reference) teaching point 106. To designate the offset to the teaching point 106 (P001), for example, the tool coordinate system 105 can be used. Here, the tool coordinate system 105 (having been designated as described above) is used to designate and form the offset teaching point 107 that is offset by "30 mm" in the Z-axis direction.

For example, the user selects the setting field 208 corresponding to the field for the Z-coordinate value in the relative value setting unit 202 using the mouse of the operating input unit D as illustrated in FIG. 5C, inputs a value "30" through the keyboard of the operating input unit D, and presses an [Enter] key of the keyboard.

In response to the numeric input into the relative value setting unit 202, the CPU 33 updates the content in a memory area corresponding to the relative value setting unit 202 arranged on, for example, the RAM of the storing apparatus 35. That is, when operation and input of changing a part of the position and orientation data through the operating input unit D are made, the part of the position and orientation data is changed according to the content of the operation and input (first calculating).

When the [Enter] key of the keyboard of the operating input unit D is pressed, position and orientation calculation in the calculating unit 34 made up of software for the CPU 33 is started (orientation calculation unit).

First, it is herein determined whether the coordinate system selected in relation to the offset teaching point 107 is the tool coordinate system 105 or not (step S4 in FIG. 3). When the coordinate system selected here is the tool coordinate system 105, the processing proceeds to step S5, and the orientation calculation process in the tool coordinate system 105 is executed (articulation value calculating process; step S5).

Here, the articulation value is represented by the bending (rotation) angle of a certain articulation of the robot 101, and is an articulation data that identifies the position (or orientation) of the articulation. In this embodiment, such an articulation data is used to check a limitation error, described later, in the middle of the calculation. An example of directly inputting and editing the articulation data as a part of the position and orientation data in an explicit manner is described in Embodiment 5, described later.

Here, the calculation in the case of selecting the tool coordinate system 105 is performed according to the following equation (1) (coordinate transformation). Here, an orientation matrix $T_3$ of relative values of the robot 101 from the base coordinate system 104 to the offset teaching point 107 is calculated as a product of an orientation matrix $T_1$ of relative values of the teaching point 106 serving as the reference and an orientation matrix $T_2$ of relative values serving as offsets.

$$T_3 = T_1 \cdot T_2 \quad (1)$$

Here, the orientation matrix T is a matrix with four rows and four columns as represented in the following equation (2). Parameters on the first row and the first column to the third row and the third column constitute a rotation matrix R. The parameters on the first to third rows and the fourth column constitute a position matrix P. The parameters on the fourth row and the first column to the fourth row and the third column constitute a 0 matrix. The parameter on the fourth row and the fourth column is one.

$$T = \begin{bmatrix} R & P \\ 0 & 1 \end{bmatrix} = \begin{bmatrix} r_{11} & r_{12} & r_{13} & p_x \\ r_{21} & r_{22} & r_{23} & p_y \\ r_{31} & r_{32} & r_{33} & p_z \\ 0 & 0 & 0 & 1 \end{bmatrix} \quad (2)$$

An inverse kinematic calculation is applied to the calculation result of the equation (1) to calculate the articulation value of each axis of the robot 101. That is, in step S5 (or S6, described later), the CPU 33 performs position and orientation calculation that identifies the position or orientation of each part of the robot apparatus, based on a part of the position and orientation data (on the offset teaching point 107) changed in the first calculating. Based on the result of this position and orientation calculation, new position and orientation data (e.g., articulation value) is obtained (second calculating).

Furthermore, the CPU 33 updates the display of the display screen E of the displaying apparatus C, based on the result of the inverse kinematic calculation (steps S7 to S9 in FIG. 3). That is, the CPU 33 updates the display of the display screen E of the displaying apparatus C, based on a part of the position and orientation data having been changed in the first calculating, and on the new position and orientation data having been calculated in the second calculating (display updating).

In the updating of the display of the display screen E of the displaying apparatus C, for example, the content of the management screen 40 of the displaying apparatus C, the virtual display on the virtual environment screen 10, and the numeric value display on the parameter setting screen 20 is updated. Before the updating of the display screen E of the displaying apparatus C, error checking is performed on whether each articulation value corresponding to the position and orientation data calculated in the second calculating is within a limitation defined by the hardware specifications of the actual robot 101 or not (the following step S7).

In step S7, it is determined whether each articulation value on the offset teaching point 107 is within the limitation defined by the hardware specifications of the actual robot 101 (or further by operational regulations) or not (limitation determining process). For example, in the actual robot apparatus, the range of possible rotation angle of a certain articulation is sometimes limited within a specific range. It is determined whether each articulation value of the robot 101 is within such a range of limitation or not. Such conditions of limitation including the movable range of the robot 101 have preliminarily been stored in the ROM 35a, the RAM 35b, or the external storing apparatus 35c, in an appropriate storing format.

When the result of the determination in step S7 is within the limitation, the CPU 33 updates the display screen E of the displaying apparatus C (normality displaying process; S9). Here, the display of the robot 101 on the virtual environment screen 10, and the content of the parameter setting screen 20 are updated. Here, the base coordinate system 104 of the robot 101 coincides with the absolute coordinate system 100 as described above. Consequently, the update is performed by reflecting the relative value from the base coordinate system 104 to the offset teaching point 107 in the absolute value setting unit 201, and the result of calculation of the articulation value on each axis of the robot 101 by the inverse kinematic calculation on the virtual environment screen 10.

Furthermore, in the updating of the display screen E of the displaying apparatus C, all the GUIs (the virtual environment screen 10, parameter setting screen 20 and management screen 40) including the changed points and unchanged points are updated. Consequently, for example, the parameter setting screen 20 is updated as illustrated in FIG. 4C.

Figure 4C:
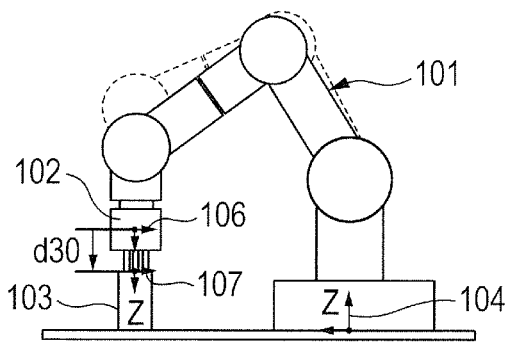
Figure 4D:
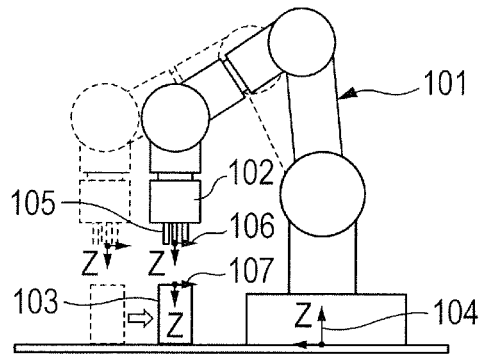

FIG. 4C illustrates the display of the robot 101 on the updated virtual environment screen 10 of the displaying apparatus C. As apparent by comparison with FIG. 4B, the display of the robot 101 in FIG. 4C is changed to the display where the reference part of the arm has the position and orientation residing on the offset teaching point 107. What is indicated by d30 in FIG. 4C is the amount of offset by 30 mm, described above.

FIG. 5D illustrates the display of the updated parameter setting screen 20 on the display screen E of the displaying apparatus C. If no error occurs in step S7, the parameters on the offset teaching point 107 are updated as illustrated in this diagram.

As described above, when an input is made into the relative value setting unit 202 through the operating input unit D, the display of the robot 101 on the virtual environment screen 10 and the display on the parameter setting screen 20 are immediately updated, thereby allowing the position and orientation and the parameters on the new offset teaching point 107 to be confirmed.

Consequently, even if the robot apparatus is actually not connected to the information processing apparatus A or if the actual robot apparatus is not operated, the user (operator) can confirm the validity of the input (edit) operation only by viewing the display screen E of the displaying apparatus C. Thus, the man-hour having conventionally been required to confirm the validity of the input (edit) operation can be reduced.

According to the result of the position and orientation calculation, for example, when any of the articulation values is determined to be out of the hardware limitation in step S7, the CPU 33 causes the displaying apparatus C to display an error indicating unavailable orientation (abnormality displaying process; S8). For example, in this case, an error screen 50 to be displayed may be a screen as in FIG. 8. The error screen 50 of FIG. 8 indicates that the orientation to be reached is out of the limitation and an error occurs, using a character string and a graphical symbol.

In the case of displaying this screen, the CPU 33 clears the numeric value on the offset teaching point 107 on the parameter setting screen 20 and returns the state to the state before input of the relative value (e.g., FIG. 5A or 5B). Subsequently, in the case of the control in FIG. 3, the processing is returned to the operation of editing (inputting) the relative value in step S3. Consequently, the operation of changing the input value on the offset teaching point 107 can be performed as described above.

That is, the CPU 33 determines whether the obtained position and orientation data is within the limitation of the mechanism of the robot 101 or not according to the result of the calculation in the second calculating. When the position and orientation data exceeds the limitation of the mechanism of the robot apparatus, error information notifying an editing error (e.g., the error screen 50) is generated.

Subsequently, the user viewing the display of the robot 101 on the virtual environment screen 10 and the display of the parameter setting screen 20 performs an operation of confirming whether the aimed orientation to be reached is achieved or not (step S10). In step S10, when the aimed orientation to be reached is achieved on the offset teaching point 107, a confirmation operation is performed that selects the determination button 209 using the cursor of the mouse and clicks the mouse. This confirmation operation finishes the forming of the offset teaching point 107. Thus, the CPU 33 stores the information on the confirmed offset teaching point 107 in the storing apparatus 35.

As described above, the forming of the new offset teaching point 107 is finished (recording unit; step S11 in FIG. 3). As to information to be recorded in the storing apparatus 35, for example, three pieces of information which are a piece of information on the teaching point 106 serving as the reference, a piece of information of the selected coordinate system and a piece of offset information are adopted as the information on (related to) the offset teaching point 107. This information is recorded in the storing apparatus 35. Furthermore, tag information related to a data class that indicates that the information on the teaching point is relative "offset" information may be included and then stored in the storing apparatus 35. In such a storing format, the offset teaching point 107 is defined with reference to the teaching point 106. That is, it can be identified that the teaching point 107 is data belonging to the descendant of the teaching point 106.

Figure 7A:
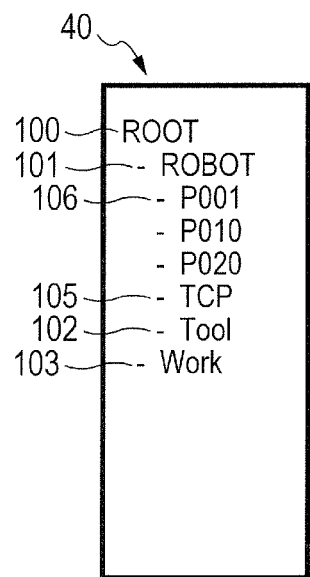
FIGS. 7A, 7B and 7C are diagrams illustrating management screens according to Embodiment 1 of the present invention.
Figure 7B:
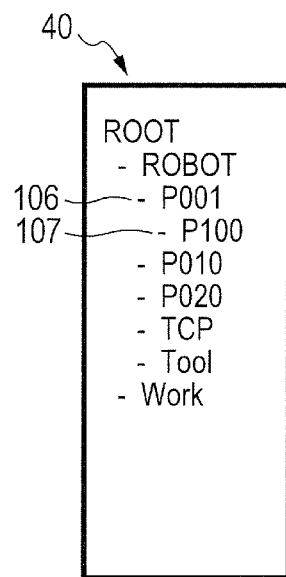

As to forming of the new offset teaching point 107, the display of the management screen 40 can also be updated under control of the CPU 33. Here, FIGS. 7A and 7B illustrate the display states of the management screen 40 before the formation of the offset teaching point 107 and after the formation of the offset teaching point 107 is completed, respectively. In FIG. 7A, in a tree of the robot 101, nodes on the teaching points 106 of P001, P010 and P020, and nodes on TCP (105) and Tool (102) are stratified.

After the new offset teaching point 107 is normally formed as described above, the node on the new offset teaching point 107 is newly formed at the descendant of the teaching point 106 serving as the reference on the management screen 40 for nodes. The node of the new offset teaching point 107 is thus displayed at the descendant of the teaching point 106 serving as the reference. Consequently, the user can significantly clearly recognize that the offset teaching point 107 is a (an offset) teaching point having a relationship where this point 107 belongs, as a child, to the node of the parent teaching point 106.

Figure 7C:
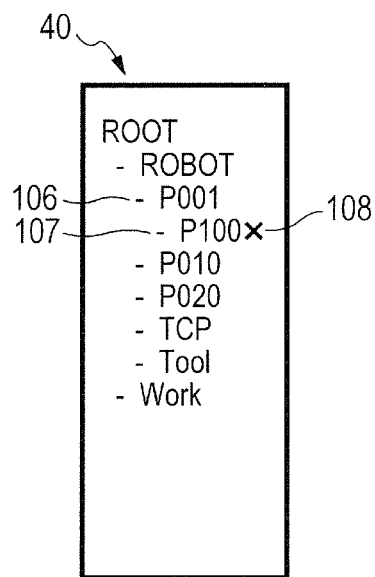

Each of the nodes on the management screen 40 in FIGS. 7A to 7C can be used as a button (or icon) on the GUI for selecting the node. For example, when each node on the management screen 40 is clicked using the mouse, the CPU 33 determines that an edit operation for the (position and orientation) data on the node is designated. For example, in the case of editing the offset teaching point 107, the user can start (re-)editing the teaching point by clicking the offset teaching point 107 on the management screen 40 using the cursor of the mouse.

The position and orientation data stored in the storing apparatus 35 can be output to an external apparatus (input and output unit) in units of the entire tree (e.g., the entire tree of each of FIGS. 7A to 7C) or a specific part of the tree designated through the operating input unit D, in the format of the file F, via the interface 36.

The file F having thus been output can be read via the interface 36 later. Consequently, if, for example, the entire tree (e.g., the entire tree of each of FIGS. 7A to 7C) is read from the file F, the state of the system at the time of creating the position and orientation data on the file F can be restored. For example, according to reading of the file F, the CPU 33 displays the management screen 40 of FIG. 7B. For example, after the offset teaching point 107 is selected from the screen, the state in FIGS. 4C and 5D can be reproduced.

The file F may be adjusted (converted) to have a format common to the controller of the actual robot apparatus, and output from the interface 36. Consequently, the teaching data created by the information processing apparatus A can directly be input into the actual robot apparatus.

Here, for example, the interface of the controller of the actual robot apparatus is made up of an operation program and an offset variable in some cases. In such cases, a mode can be considered where the CPU 33 outputs the information on the teaching point 106 serving as the reference, as the teaching point information, via the file F, while outputting the offset teaching point 107 as the offset edit information on the operation program.

Furthermore, a configuration can be considered where the interface of the teaching point information on the controller of the actual robot apparatus uses only the relative value information from the base coordinate system 104 of the robot. In such cases, the CPU 33 can calculate the product of the offset teaching point 107 and the teaching point 106 serving as the reference, convert the entire teaching point information into the relative value in the base coordinate system 104 of the robot, and output the value via the file F.

As described above, in the case of input and output of data via the interface 36 and the file F to and from an external apparatus, particularly an actual robot apparatus, necessary format conversion is performed to allow various actual robot apparatuses (or controllers) to be supported.

In the case of stopping formation the offset teaching point 107, a cancel button 210 at an upper right part of the parameter setting screen 20 in FIGS. 5A to 5D is clicked by the cursor of the mouse. When the cancel button 210 is clicked, the CPU 33 deletes the information on the offset teaching point 107, and updates the display screen E of the displaying apparatus C to the state before the formation of the offset teaching point 107.

As described above, the new offset teaching point 107 can be formed.

(Formation of Offset Teaching Point Using Base Coordinate System)

Next, the second case, that is, procedures and process for forming the offset teaching point 107 to perform offset by "−30 mm" in the Z-axis direction, by selecting the base coordinate system 104 from the teaching point 106 serving as the reference, are described with reference to FIGS. 6A to 6D. FIGS. 6A to 6D illustrate transition of the GUI on the parameter setting screen 20 in a manner analogous to the manner in FIGS. 5A to 5D. The control procedures in the case of using the base coordinate system 104 are described in a part of FIG. 3 as described above.

Figure 6A:
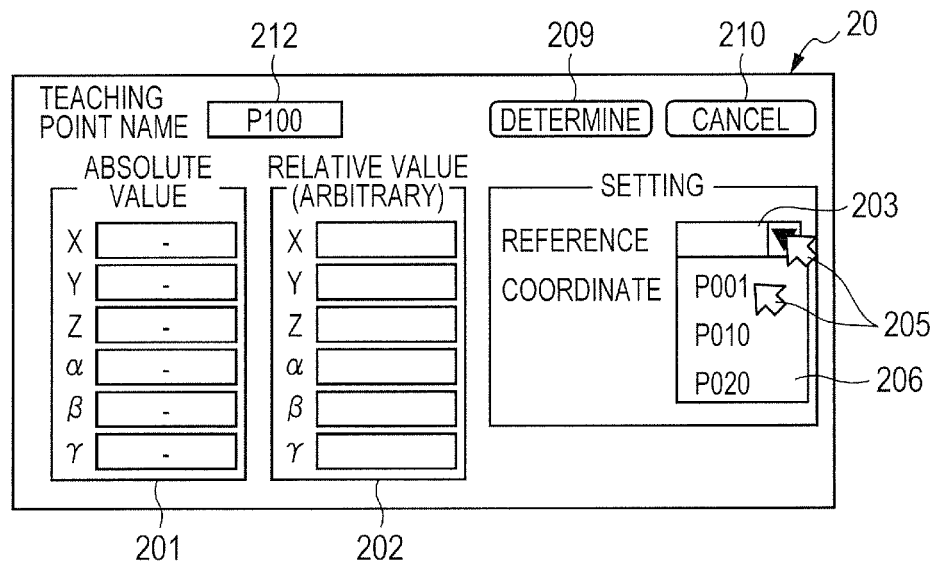

In FIG. 6A, through a setting operation on the teaching point 106 serving as the reference, this teaching point 106 serving as the reference is selected using the teaching point setting unit 203 in a manner, for example, of a pulldown menu, as with the FIG. 5A, described above (teaching point setting unit; step S1 in FIG. 3).

Figure 6B:
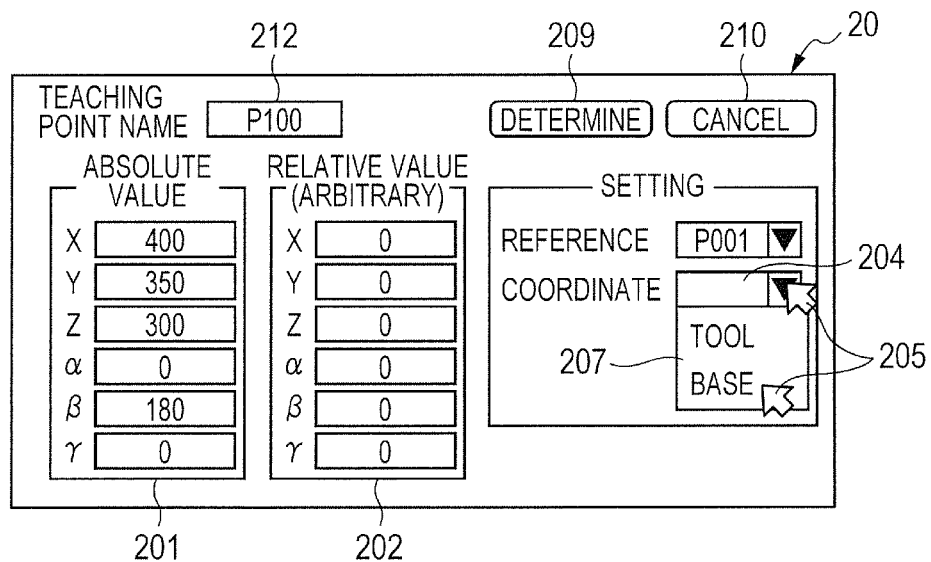

Next, the base coordinate system 104 is selected (coordinate system selecting unit; step S2). FIG. 6B illustrates an operation of selecting a coordinate system. Here, as with FIG. 5B described above, the coordinate system selecting unit 204 is used in a manner, for example, of a pulldown menu, to select the base coordinate system 104 (coordinate system selecting unit; step S2).

As described above, selection of the teaching point 106 serving as the reference, and selection of the coordinate system to be used for input (base coordinate system 104) are finished, and preparation required to set the relative value that is the offset of the offset teaching point 107 is completed.

Next, the relative value to be the offset is set (parameter setting unit; S3). FIG. 6C illustrates the situation where the setting field 208 of the relative value setting unit 202 is set. Here, the setting field 208 on the Z-axis of the relative value setting unit 202 is clicked by the cursor of the mouse. A numeric value of "−30" is input into the Z-axis setting field 208 of the relative value setting unit 202 through the keyboard operated by the operating input unit D, and the [Enter] key is pressed.

The offset input value is equivalent to an example of the offset input of 30 mm downward using the tool coordinate system described above. The offset "30" has a different sign, because the tool coordinate system is used in the aforementioned example but the base coordinate system is used in this example, as the coordinate system used for input. That is, the positive value of 30 (mm) is input in the aforementioned example, because the front of the tool is typically defined as the positive direction of the Z-axis in the aforementioned tool coordinate system. The negative value of −30 (mm) is input in this example, because the positive direction (upper part of FIGS. 4A to 4D) of the Z-axis is defined in the base coordinate system and the offset downward has a negative value accordingly.

In response to the numeric input into the relative value setting unit 202, the CPU 33 updates the content in a memory area corresponding to the relative value setting unit 202 arranged on, for example, the RAM of the storing apparatus 35. That is, when operation and input of changing a part of the position and orientation data through the operating input unit D are made, the part of the position and orientation data is changed according to the content of the operation and input (first calculating).

Subsequently, when the user presses the [Enter] key of the keyboard of the operating input unit D, the CPU executes the position and orientation calculation according to the function of the calculating unit 34 (orientation calculation unit).

First, it is herein determined whether the coordinate system selected is the tool coordinate system 105 or not (step S4 in FIG. 3). In this example, what is selected is the base coordinate system 104. Accordingly, the processing proceeds from step S4 to step S6, and the position and orientation calculation in the base coordinate system 104 is performed (step S6).

For example, in the case of the position and orientation calculation in the base coordinate system 104, calculation is performed according to procedures where the orientation matrix is divided into the position matrix and the rotation matrix, the calculation is then performed, and finally the product of the results of calculation is obtained.

First, the sum of the orientation matrix $T_1$ of relative values from the base coordinate system 104 of the robot 101 to the teaching point 106 serving as the reference and the orientation matrix $T_2$ of the relative values serving as offsets on the offset teaching point 107 is calculated, and an orientation matrix $T_{tmp1}$ is created (the following equation (3)). A rotation matrix $R_{tmp1}$ at this time is defined as 0.

$$T_{tmp1} = \begin{bmatrix} 0 & P_1 + P_2 \\ 0 & 1 \end{bmatrix} \quad (3)$$

Next, according to the orientation matrix $T_2$ of the relative values that are the offset of the offset teaching point 107, an orientation matrix $T_{tmp2}$ where the position matrix $P_2$ is defined as 0 is formed (the following equation (4)).

$$T_{tmp2} = \begin{bmatrix} R_2 & 0 \\ 0 & 1 \end{bmatrix} \quad (4)$$

Next, according to the orientation matrix $T_1$ of relative values from the base coordinate system 104 of the robot 101 to the teaching point 106 serving as the reference, an orientation matrix $T_{tmp3}$ where the position matrix $P_1$ is defined as 0 is formed (the following equation (5)).

$$T_{tmp3} = \begin{bmatrix} R_1 & 0 \\ 0 & 1 \end{bmatrix} \quad (5)$$

Next, according to the product of equations (3), (4) and (5), the orientation matrix $T_3$ of relative values from the base coordinate system 104 of the robot 101 to the offset teaching point 107 is calculated (the following equation (6)).

$$T_3 = T_{tmp1} \cdot T_{tmp2} \cdot T_{tmp3} \quad (6)$$

Furthermore, an inverse kinematic calculation is applied to the calculation result of the equation (6) to calculate the articulation value of each axis of the robot 101. That is, in step S6, the CPU 33 performs position and orientation calculation that identifies the position or orientation of each part of the robot apparatus, based on a part of the position and orientation data (on the offset teaching point 107) changed in the first calculating. Based on the result of this position and orientation calculation, new position and orientation data (e.g., articulation value) is obtained (second calculating).

According to the position and orientation calculation described above, the offset teaching point 107 in the case of selecting the base coordinate system 104 can be obtained.

According to the control of FIG. 3, determination sequentially from step S7 to step S11 on whether to be in the limitation range or not is executed as with the case of input of the offset teaching point 107 through use of the tool coordinate system 105 described above. An error handling for the determination on whether to be in the limitation range or not (e.g., message display in FIG. 8; step S8) can be performed in a manner analogous to what has been described above.

After the position and orientation calculation (step S6) in the base coordinate system, when no error occurs, the display of the virtual environment screen 10, the parameter setting screen 20 and additionally the management screen 40 of the displaying apparatus C is updated in step S9 in FIG. 3. The situations at this time are analogous to the situations illustrated in FIGS. 4B, 4C, 5C, and FIGS. 7A and 7B having been described for the case of using the tool coordinate system. The confirmation by the user in step S10, and the determination operation in S11 are analogous to those in the case of using the tool coordinate system (FIG. 5D).

That is, the CPU 33 updates the display of the display screen E of the displaying apparatus C, based on a part of the position and orientation data having been changed in the first calculating, and on the new position and orientation data having been calculated in the second calculating (display updating).

As described above, the base coordinate system 104 can be selected to form the offset teaching point 107. Upon formation of the offset teaching point 107, the display of the virtual environment screen 10, the parameter setting screen 20 and further the management screen 40 of the displaying apparatus C is updated. Consequently, the position and orientation and the parameters at the new offset teaching point 107 can be confirmed.

Consequently, even if the robot apparatus is actually not connected to the information processing apparatus A or if the actual robot apparatus is not operated, the user (operator) can confirm the validity of the input (edit) operation only by viewing the display screen E of the displaying apparatus C. Thus, the man-hour having conventionally been required to confirm the validity of the input (edit) operation can be reduced.

(Editing of Offset Teaching Point 107 and Switching Coordinate System)

Figure 9:
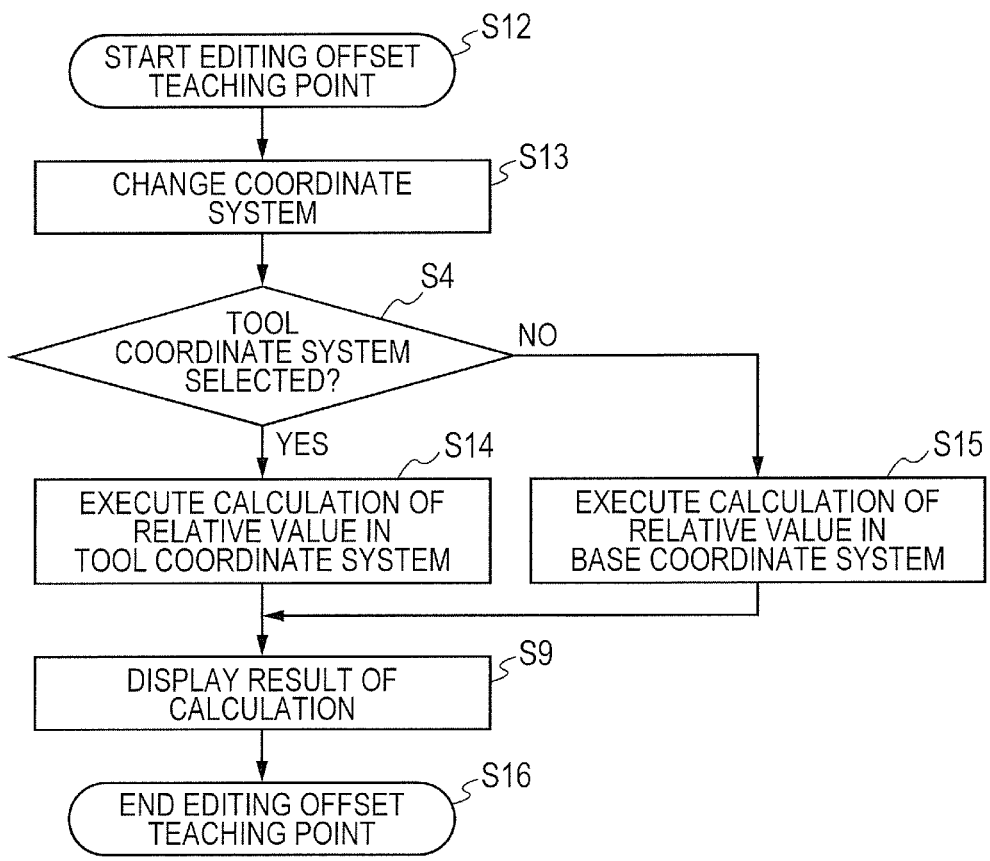
FIG. 9 is a flowchart illustrating an edit process of an offset teaching point according to Embodiment 1 of the present invention.

Next, control in the third case, in which the formed offset teaching point 107 is edited and the coordinate system is switched, is described with reference to FIG. 9. FIG. 9 illustrates control procedures in the case of switching the coordinate system of the input offset teaching point 107.

Conventionally, in the case where necessity of switching the coordinate system occurs, the operator (user) performs matrix calculation to calculate parameters. Unfortunately, human errors, such as errors of inputting the calculated numeric values, sometimes occur. As described in this example, according to the configuration of calculating the relative value parameter in the coordinate system direction automatically switched when the coordinate system is switched, such human calculation errors can be reduced. The cases of switching the base coordinate system 104 and the tool coordinate system 105 are hereinafter described. First, processing in the case of switching the tool coordinate system 105 to the base coordinate system 104 is discussed.

The start of editing the offset teaching point 107 (step S12 in FIG. 9) is designated, for example, by selecting the offset teaching point 107 (P100) having already been input through the mouse of the operating input unit D as described above on the management screen 40 (FIG. 7B).

Next, the tool coordinate system 105 is switched to the base coordinate system 104 (coordinate system selecting unit; step S13). For example, when the coordinate system selecting unit 204 on the parameter setting screen 20 in FIG. 5B (FIG. 6B) is clicked using the mouse of the operating input unit D, the coordinate system list 207 is displayed. Here, the tool coordinate system 105 is switched to the base coordinate system 104 using the coordinate system list 207.

When the system is switched to the base coordinate system 104 by the coordinate system selecting unit 204 on the parameter setting screen 20 (step S13 in FIG. 9), the position and orientation calculation accompanied by coordinate system transformation is performed according to the function of the calculating unit 34 of the CPU 33 (orientation calculation unit: S15 in this example) as described below.

First, it is determined whether the selected coordinate system is the tool coordinate system 105 or not (step S4). When the base coordinate system 104 is selected here, the processing proceeds from step S4 to step S15, and calculation of the relative value of the base coordinate system 104 is executed (relative value calculating process; step S15).

In the relative value calculation of the base coordinate system 104, according to the equation (1), the orientation matrix $T_3$ of relative values from the base coordinate system 104 to the offset teaching point 107 is calculated. Next, according to the equation (5), the orientation matrix $T_{tmp3}$ is calculated where the position matrix $P_1$ of the orientation matrix $T_1$ of relative values from the base coordinate system 104 to the teaching point 106 serving as the reference is defined as 0.

Subsequently, the product of inverse matrices of the equations (1) and (5) is calculated, and an orientation matrix $T_{tmp4}$ is calculated (the following equation (7)).

$$T_{tmp4} = T_3 \cdot T_{tmp3}^{-1} \quad (7)$$

Subsequently, an orientation matrix is calculated where the position matrix of the orientation matrix $T_{tmp4}$ calculated according to the equation (7) is defined as 0 (the following equation (8)).

$$T_{tmp5} = \begin{bmatrix} R_{tmp4} & 0 \\ 0 & 1 \end{bmatrix} \quad (8)$$

Subsequently, the product of inverse matrices of the orientation matrix $T_{tmp4}$ calculated according to the equation (7) and the orientation matrix $T_{tmp5}$ calculated according to the equation (8) is calculated, and an orientation matrix $T_{tmp6}$ is calculated (the following equation (9)).

[Expression 9]

$$T_{tmp6} = T_{tmp4} \cdot T_{tmp5}^{-1} \quad (9)$$

Subsequently, from the rotation matrix $R_{tmp4}$ of the equation (7), the rotational components ($\alpha$, $\beta$ and $\gamma$) of the relative values that are the offset in the direction of the base coordinate system 104 are calculated. From the translational components $P_{tmp6}$ of the equation (9), the difference of the position matrix $P_1$ of the orientation matrix $T_1$ of relative values from the base coordinate system 104 of the robot 101 to the teaching point 106 serving as the reference is calculated, and the translational components (X, Y and Z) of the relative values which are the offset in the direction of the base coordinate system 104 are calculated.

Based on the relative values (X, Y, Z, $\alpha$, $\beta$ and $\gamma$) that are the offset in the direction of the base coordinate system 104, output according to the above calculation result, the CPU 33 updates the display screen E of the displaying apparatus C (displaying unit). As in this example, in the case of changing (only) the coordinate system, the position and orientation of the robot 101 are not changed. Update of the display screen E may be performed only for the relative value setting unit 202 (normality displaying process; step S9).

In the case of change (only) in coordinate system, it is a matter of course that the display of the position and orientation of the robot 101 on the virtual environment screen 10 is not necessarily changed.

Here, for example, with the position and orientation of the robot 101 displayed after teaching of the offset teaching point 107 in FIG. 4C, the orientation is achieved where the tool coordinate system 105 and the base coordinate system 104 are aligned to have the Z-axes arranged to have positive and negative directions, which are opposite to each other exactly on a straight line.

Consequently, the display of the relative value setting unit 202 on the parameter setting screen 20 is the display in FIG. 5D before the coordinate system is switched from the tool coordinate system to the base coordinate system. However, the display is switched to the display in FIG. 6D according to the switching of the coordinate system in this example. That is, the amount of offset by "30 mm" on the Z-axis in the tool coordinate system 105 illustrated in FIG. 5D becomes the amount of offset by "−30 mm" on the Z-axis in the base coordinate system 104 illustrated in FIG. 6D, according to the result of the coordinate system calculation due to the coordinate system switching.

After the user views and confirms the display screen E of the displaying apparatus C switched as described above, the editing of the offset teaching point 107 is finished in step S16.

As described above, according to this example, upon switching the coordinate system, the user (operator) can confirm the relative value parameter in the direction of the automatically switched coordinate system. Consequently, unlike the conventional case, the matrix calculation accompanied by the coordinate system transformation is not required to be manually performed. The man-hour and human errors can thus be reduced.

According to the control in the case of switching from the base coordinate system 104 to the tool coordinate system 105, transition occurs from step S4 to step S14 in FIG. 9 (control details other than this point are analogous to what have been described above).

Also in switching from the base coordinate system 104 to the tool coordinate system 105, the base coordinate system 104 is switched to the tool coordinate system 105 using the coordinate system selecting unit 204 on the parameter setting screen 20 in step S13 in FIG. 9 as described above (coordinate system selecting unit).

In step S4 in FIG. 9, it is determined whether the selected coordinate system is the tool coordinate system 105 or not, and the position and orientation calculation (orientation calculation unit: S14 in this example) accompanied by coordinate system transformation is performed according to the function of the calculating unit 34 of the CPU 33.

The relative value calculation in the tool coordinate system 105 calculates the orientation matrix $T_2$ of relative values that are the offset of the offset teaching point 107 (the following equation (10)). Here, the orientation matrix $T_2$ is obtained as the product of inverse matrices of the orientation matrix $T_3$ that is the calculation result of the equation (6) and the orientation matrix $T_1$ of relative values of the teaching point 106 serving as the reference in the base coordinate system 104 of the robot 101.

[Expression 10]

$$T_2 = T_3 \cdot T_1^{-1} \quad (10)$$

Based on the result of calculation of the equation (10), Euler-angle transformation is performed, and the relative values (X, Y, Z, α, β and γ) that are the offset of the offset teaching point 107 in the direction of the tool coordinate system 105 are calculated.

Based on the relative values (X, Y, Z, α, β and γ) that are the offset and are output according to the calculation result, the CPU 33 updates the display screen E of the displaying apparatus C (displaying unit; step S9), and finishes the editing of the offset teaching point 107 (step S16).

It is the matter of course that in this display update, on the contrary to the case of the transformation to the base coordinate system, the parameter setting screen 20 is switched from the display of FIG. 6D to the display of FIG. 5D. That is, according to the result of the coordinate system calculation due to the coordinate system switching, the amount of offset by "−30 mm" on the Z-axis in the base coordinate system 104 illustrated in FIG. 6D becomes the amount of offset by "30 mm" on the Z-axis in the tool coordinate system 105 illustrated in FIG. 5D. In the case of change (only) in coordinate system, it is a matter of course that the display of the position and orientation of the robot 101 on the virtual environment screen 10 is not necessarily changed.

As described above, even in the case of switching from the base coordinate system to the tool coordinate system, upon switching the coordinate system in a manner analogous to what has been described above, the user can immediately confirm the relative value parameter in the direction of the automatically changed coordinate system. Consequently, for example, the operator is not required to manually perform the matrix calculation. The man-hour and human errors can thus be reduced.

(Editing Teaching Point 106 Serving as Reference)

Figure 10:
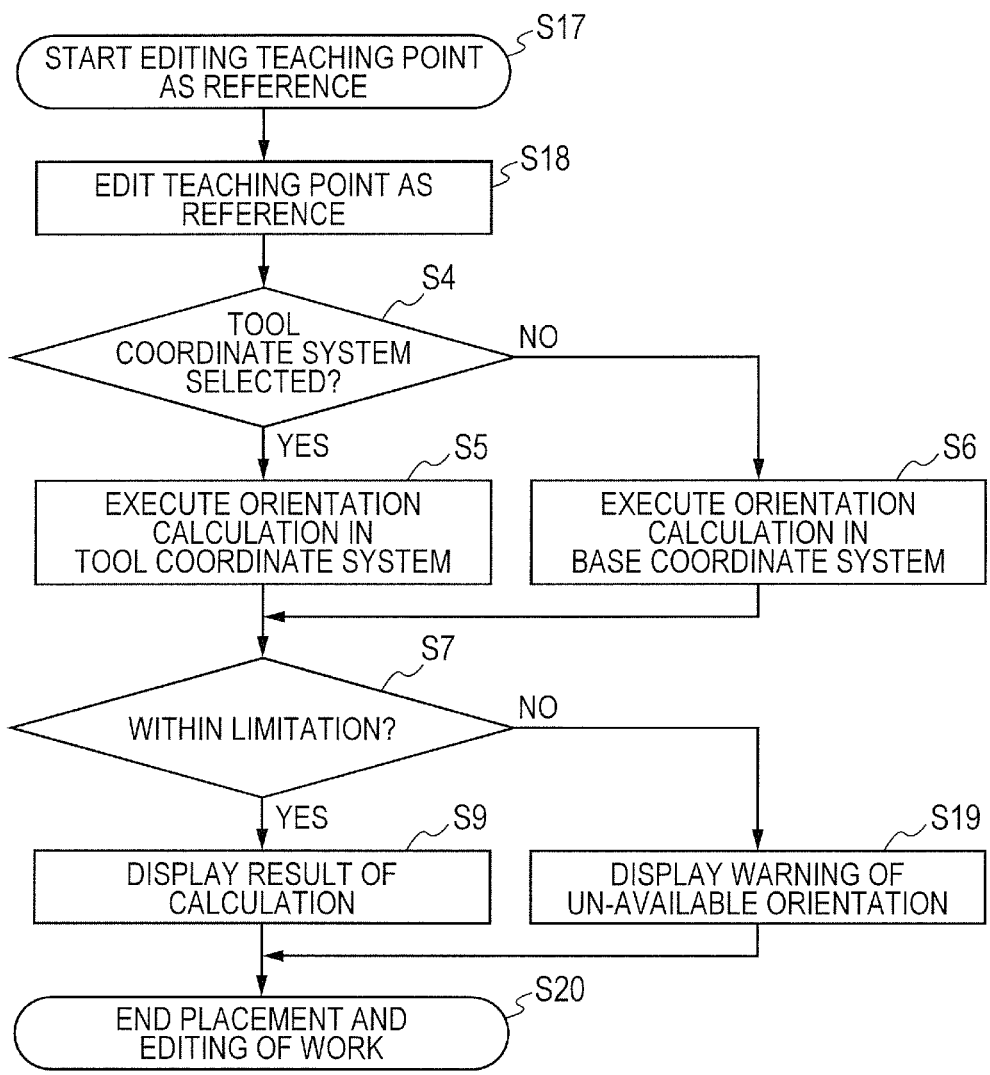
FIG. 10 is a flowchart illustrating a parameter setting screen according to Embodiment 1 of the present invention.

Finally, the process for the offset teaching point 107 in the case where the teaching point 106 serving as the reference is edited is described with reference to FIG. 10. FIG. 10 illustrates control procedures in the case of changing the teaching point 106 corresponding to the ascendant node of the offset teaching point 107 having already been input.

It is assumed that on the parameter setting screen 20 for editing the teaching point 106 serving as the reference, the absolute value setting unit 201 and the relative value setting unit 202 are displayed (e.g., FIGS. 5A to 5D or FIGS. 6A to 6D). As illustrated on the management screen 40 of FIG. 7B, the offset teaching point 107 holds the relationship of being a child model of the teaching point 106 that is the reference (parent).

Consequently, in the hierarchically structured data, when the teaching point 106 serving as the reference is edited, the CPU 33 is required to change also the offset teaching point 107 while holding the relative value relationship.

The start of editing the teaching point 106 serving as the reference on the management screen 40 (step S17 in FIG. 10) is designated, for example, by clicking the teaching point 106 serving as the reference (P001) with the mouse of the operating input unit D on the management screen 40 (FIG. 7A).

Consequently, the CPU 33 switches the display of the teaching point name setting unit 212 on the parameter setting screen 20 to "P001" corresponding to the teaching point 106, reads the position and orientation data at the teaching point 106, and displays the data on the absolute value setting unit 201.

In this stage, the user corrects the position of the teaching point 106 serving as the reference by changing the numeric value in the absolute value setting unit 201 using the keyboard of the operating input unit D (step S18 in FIG. 10). After the edit operation is performed for the teaching point 106 serving as the reference, the position and orientation calculation for the teaching point 106 serving as the reference is performed according to the function of the calculating unit 34 of the CPU 33.

In this embodiment, as described above, the teaching point 106 serving as the reference and the offset teaching point 107 are stored in the storing apparatus 35 according to the hierarchic node structure. Consequently, the CPU 33 recognizes that the teaching point 106 is the parent node, and the offset teaching point 107 is stored as a node affected by the parent node at the descendant of the parent node, through the storing format of the position and orientation data as described above and its content of data.

When the edit operation for the teaching point 106 serving as the reference is performed here, the position and orientation calculation is then performed also for the offset teaching point 107 according to the function of the calculating unit 34 of the CPU 33 (articulation value calculating process: S4 and S5 or S6 in FIG. 10).

First, it is herein determined whether the coordinate system used for the description format of the offset teaching point 107 having a relationship of being a child model with respect to the teaching point 106 serving as the reference, is the tool coordinate system 105 or not (step S4 in FIG. 10). As described above, data indicating the coordinate system that describes the offset teaching point 107 is stored in the storing apparatus 35. The determination of step S4 can be performed by referring to this coordinate system data.

If the coordinate system describing the offset teaching point 107 is the tool coordinate system 105 in step S4, the processing proceeds to step S5. In step S5, based on the result of the correction of the teaching point 106 serving as the reference (step S18), the position and orientation calculation for the offset teaching point 107 in the tool coordinate system 105 is performed (step S5).

If the coordinate system describing the offset teaching point 107 is the base coordinate system 104 in step S4, the processing proceeds to step S6. In step S6, based on the result of the correction of the teaching point 106 serving as the reference (step S18), the position and orientation calculation for the offset teaching point 107 in the base coordinate system 104 is performed (step S6).

In step S5 or S6, the articulation value calculating process for each articulation of the robot 101 is also executed. If there are multiple offset teaching points 107 as child models in this case, the articulation value calculation for all the teaching points is performed.

Subsequently, the CPU 33 determines whether or not each articulation value of the robot 101 for achieving the offset teaching point 107 calculated in step S5 or S6 is within the limitation due to hardware or specifications (limitation determining process; step S7).

If each articulation value of the robot 101 is within the limitation in step S7, the CPU 33 updates the display screen E of the displaying apparatus C in step S9 (normality displaying process). At the same time, the display of the robot 101 on the virtual environment screen can be changed to have the position and orientation corresponding to the teaching point immediately (or when the teaching point is designated on the management screen 40).

On the other hand, if each articulation value of the robot 101 exceeds the limitation in step S7, the CPU 33 displays an error using the display screen E of the displaying apparatus C in step S19. As an example of this error display, a mark 108 (e.g., an x mark as illustrated in the diagram) is displayed at the teaching point 107 using the management screen 40 to indicate that the point is an unmovable teaching point as exemplified in FIG. 7C.

Here, the teaching point that is a child node of the teaching point 106 serving as the reference is only the teaching point 107 (P100). The CPU 33 can examine the relationship between another teaching point and the limitation range according to an analogous calculation process. Consequently, if there are other teaching points having the relationship of being a child node and any of the nodes is determined to be a teaching point out of the movable range, the CPU 33 displays the mark 108 for the teaching point as with in FIG. 7C. Through such display, the user can immediately recognize the validity (or a problem) of the change of the teaching point 106 serving as the reference which has now been executed.

The user having confirmed the display of the management screen 40 can determine the details of editing at the teaching point 106 serving as the reference, by clicking the determination button 209 (FIGS. 5A to 5D and FIGS. 6A to 6D) using the mouse (step S20). The CPU 33 causes the teaching data in the storing apparatus 35 to reflect the changed content. Alternatively, the teaching data reflecting the changed content can be transmitted in the format of the file F to the external apparatus. To cancel editing of the teaching point 106 serving as the reference, the cancel button 210 (FIGS. 5A to 5D and FIGS. 6A to 6D) is clicked. When this cancel operation is performed, the CPU 33 discards the changed content and restores the display on the displaying apparatus C to the state before editing.

For example, when a specific teaching point is selected on the management screen 40 after completion of the editing, the CPU 33 can change the display of the robot 101 on the virtual environment screen 10 to the position and orientation corresponding to this teaching point. When the teaching point is selected in the state where the mark 108 indicating immobility is displayed on the management screen 40, the CPU 33 notifies the user of an error by displaying, for example, the error screen 50 (FIG. 8) on the displaying apparatus C. In this case, the CPU 33 is not required to execute display control that changes the display of the robot 101 on the virtual environment screen to the position and orientation corresponding to the teaching point.

As described above, the teaching point 106 serving as the reference can be edited and corrected. As described above, in this embodiment, for example, the offset teaching point 107 is stored in the hierarchic node format at the node having a relationship of being a child of the teaching point 106 serving as the reference. Consequently, when the teaching point 106 is changed, the CPU 33 can immediately, automatically execute the position and orientation calculation for the teaching point 107, and causes the display screen E to reflect the result.

Therefore, the user can confirm the effect pertaining to the position and orientation at the associated offset teaching point 107 in real time during the editing process only by editing the teaching point 106 serving as the reference, thereby allowing the operation man-hour to be reduced.

As described above, according to this embodiment, in inputting and editing the position and orientation data on the robot apparatus in the information processing apparatus A, the operator can easily form and edit the offset teaching point 107 and the teaching point 106 serving as the reference and switch the coordinate system. In this embodiment, the position and orientation calculation for the robot apparatus is automatically executed based on the edit result. The result is immediately reflected in the display screen E of the displaying apparatus C, the numeric value display on the parameter setting screen 20, the position and orientation display on the virtual environment screen 10, and the management display on the management screen 40. Consequently, the user can confirm the validity of input and editing of the position and orientation data on the robot apparatus having now been executed, through the display screen E of the displaying apparatus C, without performing complicated manual calculation. The operation man-hour and human errors can be reduced accordingly.

This embodiment adopts the data structure for storing the nodes of the position and orientation data that is the robot control data (teaching data) in the storing apparatus 35 according to the hierarchic tree structure. For example, the data items having a relationship between a parent and a child, such as the offset teaching point and the teaching point serving as the reference, are not stored in a conventional, simple and flat data structure, but are stored in the storing apparatus according to the hierarchic node structure instead. Consequently, when the position and orientation data is input, edited or corrected, the range of the affected position and orientation data can immediately be identified, and the error checking on trajectory calculation for the position and orientation data in the range can be performed.

This embodiment adopts the tree-structured storing format that hierarchically arranges the nodes of the position and orientation data. Consequently, during the processes of inputting, editing and correcting the position and orientation data on the teaching point, a part to be updated can be swiftly and securely identified in, for example, the virtual display output, numeric value display, and management display. The virtual display output, numeric value display, and management display can be updated so as to allow the progress of input, edit and correction being executed to be confirmed in real time substantially according to the operation as it is.

According to this embodiment, in input, edit or correction of the position and orientation data, the position and orientation data can be designated through a relative value that is an offset, and a robot coordinate system that is easily grasped can arbitrarily be selected among multiple robot coordinate systems and used. If the position and orientation data is input and edited according to the offset relative value, the position and orientation calculation in conformity with the input and editing is executed using the storing format of the hierarchical node structure, which can swiftly and securely update, for example, the virtual display output, numeric value display, and management display.

Two types which are the base coordinate system 104 and the tool coordinate system 105 have been described above as selectable coordinate systems. Alternatively, for the aimed robot apparatus, another coordinate system, for example, a coordinate system with reference to another specific part of the robot is sometimes used. In this case, coordinate systems other than the base coordinate system 104 and the tool coordinate system 105 may be adopted as alternatives of the coordinate systems. For example, in the case where there are two robots 101 and these two robots 101 operate in collaboration with each other, a configuration can be considered where the base coordinate system 104 and the tool coordinate system 105 of the other robot 101 are selectable to support the operation of the other robot 101. In the case of presence of a work coordinate system with reference to the origin of the work 103, the GUI of the display screen E can be designed to allow the work coordinate system to be selectable. Variation examples related to these coordinate systems are also executable in each of embodiments, which will be described later.

Some different embodiments are hereinafter described for the information processing apparatus and the information processing method of the present invention. Hereinafter, the same reference signs are used for the same configuration elements. The detailed description of the elements is omitted. In the control procedures illustrated in a flowchart, described later, the same step numbers are used for steps equivalent to the steps in FIG. 3, for example. The relationships of the step numbers in each flowchart, described later, with, for example, the first calculating, the second calculating, and the display updating are equivalent to the relationships in FIG. 3, described above.

Embodiment 2

An information processing apparatus and an information processing method according to Embodiment 2 of the present invention are hereinafter described with reference to FIGS. 11A to 16C. In the following description, basic parts of the hardware configuration and the display screen configuration are the same as the parts in Embodiment 1. Description on the details is omitted. In the following embodiments, the same reference signs are used for the same or corresponding members. The detailed description of these members is omitted.

In Embodiment 1 described above, the teaching point 106 serving as the reference is, for example, the teaching point represented by the relative value of the robot 101 from the base coordinate system 104. In this case, for example, when the position and orientation of the work 103 are changed, changing of the position and orientation of the work 103 in the virtual environment and editing of the position and orientation of the associated teaching point 106 serving as the reference are additionally required. Consequently, automatic editing of the position and orientation of the teaching point 106 serving as the reference according to the change of the position and orientation of the work 103 is convenient.

Thus, this embodiment exemplifies a method of managing the teaching point 109 serving as the reference and the offset teaching point 110 (FIGS. 11A and 11B) associated with the work 103, by model information management through the management screen 40. In this embodiment, for example, when the position and orientation of the work 103 are edited, associated teaching points are allowed to comprehensively, automatically be edited.

In the process of editing the offset teaching point 110 associated with the work 103, processes and display different according to GUI selecting procedures on the display screen E of the displaying apparatus C are performed. For example, as to editing of teaching point information associated with the work 103, two cases which are "the case of editing the offset teaching point 110" and "the case of editing the work 103" are hereinafter described.

As to the "the case of switching the coordinate system" and "the case of editing the teaching point 106 serving as the reference", which have been described in Embodiment 1, processes analogous to the processes in Embodiment 1 are performed.

(Process of Editing Offset Teaching Point 110 Associated with Work 103)

Figure 11A:
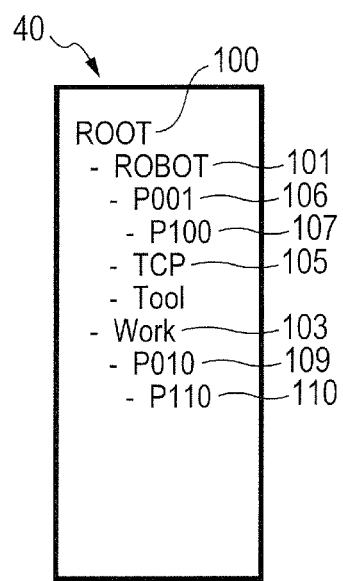
FIGS. 11A and 11B are diagrams illustrating node management screens according to Embodiment 2 of the present invention.

First, the first case, that is, edit procedures and processes on the offset teaching point 110 associated with the work 103 are described with reference to FIGS. 11A, 11B and 12. FIG. 11A displayed on the display screen E of the displaying apparatus C of the information processing apparatus A illustrates the configuration of the management screen 40. The virtual environment screen 10 and the parameter setting screen 20 can be arranged on other parts of the display screen E as illustrated in FIG. 1, for example.

As to the teaching data corresponding to the management screen 40 in FIG. 11A, nodes of teaching data items on the robot 101 (ROBOT) and the work 103 (Work) are stored at the descendent of the node ROOT (100) in the hierarchic node structure. The nodes of the robot 101 are the teaching point 106 (P001) serving as the reference, and the offset teaching point 107 which is a child node of the teaching point 106, TCP (105) and Tool (102).

As illustrated in FIG. 11A, in this embodiment, the nodes of the teaching point 109 serving as the reference and the offset teaching point 110 are hierarchically stored as child models of the model information of the work 103 in the storing apparatus 35. The CPU 33 (FIG. 2) can manage the position and orientation data on each of the associated (correlated) nodes, using such a data structure.

Here, the teaching point 109 serving as the reference of the work 103 corresponds to the position and orientation data on a specific part, for example, a position for grasping the work 103 by the robot 101. The offset teaching point 110 has the position and orientation represented by an offset relative value with respect to the position and orientation of the teaching point 109 serving as the reference.

The teaching point 109 serving as the reference and the offset teaching point 110 are stored in the storing apparatus 35 according to a hierarchic node structure as with the case of the teaching point 106 serving as the reference and the offset teaching point 107 in the above embodiment. Consequently, editing and display control related to the editing which are analogous to those on the teaching point 106 serving as the reference and the offset teaching point 107 in the above embodiment can be executed.

The offset teaching point 110 is edited according to procedures exemplified as follows. FIG. 12 illustrates control procedures executed by the CPU 33 in the case of editing the offset teaching point 110.

Figure 12:
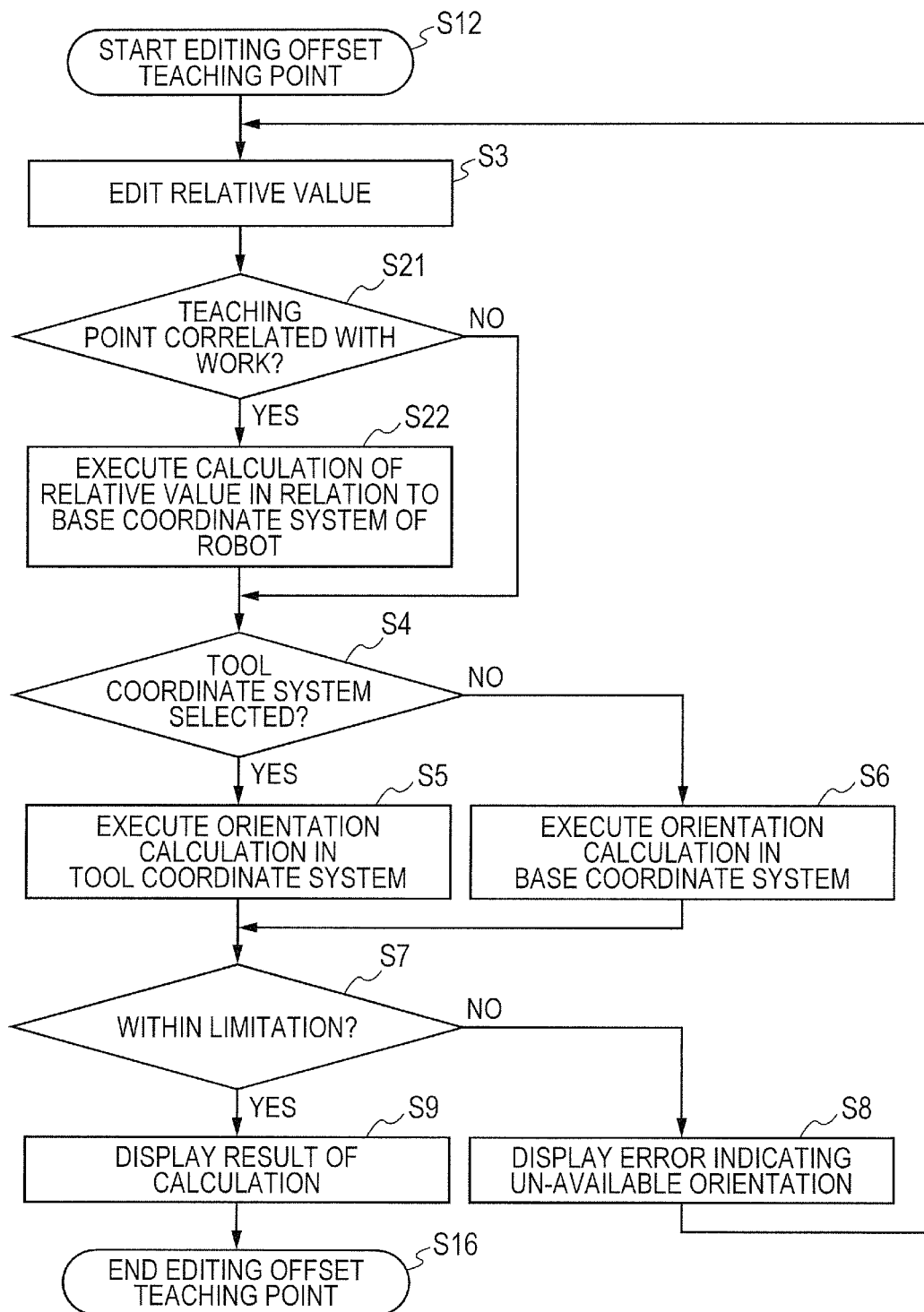
FIG. 12 is a flowchart illustrating an edit process of an offset teaching point according to Embodiment 2 of the present invention.

In step S12 in FIG. 12, the offset teaching point 110 (P110) on the management screen 40 is selected, and editing is started (S12). The teaching point selection can be performed by clicking the offset teaching point 110 (P110) on the management screen 40 using the mouse of the operating input unit D, as described above.

As illustrated in FIG. 1, the parameter setting screen 20 is prepared together with the management screen 40, on the display screen E of the displaying apparatus C. When the offset teaching point 110 (P110) is selected on the management screen 40, the CPU 33 switches the display on the teaching point name setting unit 212 to "P110" corresponding to the teaching point 110, as described above.

Next, the relative value that is the offset of the offset teaching point 110 can be edited using the relative value setting unit 202 on the parameter setting screen 20. (Parameter Setting Unit; step S3). When the user inputs or edits the relative value that is the offset of the offset teaching point 110 using the relative value setting unit 202, position and orientation calculation accompanied by coordinate system transformation is performed according to the function of the calculating unit 34 of the CPU 33.

First, in step S21, the CPU 33 determines whether the teaching point is associated with the work 103 or not (model determination process; step S21). This determination corresponds to the process of searching for the teaching point data in the hierarchic node structure as in FIGS. 11A and 11B and identifying which hierarchic layer (tree) (e.g., the tree of the robot 101 and the work 103) the processing target node (teaching point 110) belongs to. According to a specific method, for example, the information on the parent model of the teaching point 110 itself is searched for to the absolute coordinate system 100 that is the model information on the root. If the robot 101 is not in the parent model information, the teaching point is determined to be the point associated with the work 103.

In this example, it is determined that the teaching point 110 is a teaching point associated with the work 103 in step S21, and then step S22 is executed. In step S22, the relative value from the base coordinate system 104 of the robot 101 to the teaching point 109 serving as the reference is calculated (base relative value calculating process).

Here, as represented in the following equation (11), based on the product of the orientation matrix $T_4$ of absolute values from the absolute coordinate system to the work 103 and the orientation matrix $T_5$ of relative values from the work 103 to the teaching point 109 serving as the reference, an orientation matrix $T_{tmp7}$ of absolute values of the teaching point 109 serving as the reference from the absolute coordinate system is calculated.

$$T_{tmp7}=T_4 \cdot T_5 \tag{11}$$

Next, as represented in the following equation (12), based on the product of calculation result of the equation (11) and the inverse matrix of the orientation matrix $T_6$ of absolute values from the absolute coordinate system to the base of the robot 101, the orientation matrix $T_1$ of relative values from the base coordinate system 104 of the robot 101 to the teaching point 109 serving as the reference is calculated.

$$T_1 = T_{tmp7} \cdot T_6^{-1} \tag{12}$$

Following step S22, alternatively, when the processing target teaching point is the teaching point associated with the base coordinate system 104 of the robot 101 in step S21, the process of step S4 is executed. In step S4, the CPU 33 determines whether the coordinate system selected on the coordinate system selecting unit 204 on the parameter setting screen 20 (e.g., FIG. 5B) is the tool coordinate system 105 or not (step S4).

When the coordinate system selected in step S4 is the tool coordinate system 105, the processing proceeds to step S5, and the position and orientation calculation process for each articulation of the robot 101 in the tool coordinate system 105 is executed, as with the case of Embodiment 1 (articulation value calculating process; step S5).

On the other hand, when the coordinate system selected in step S4 is the base coordinate system 104, the processing proceeds to step S6, and the position and orientation calculation process for each articulation of the robot 101 in the base coordinate system 104 is executed, as with the case of Embodiment 1 (articulation value calculating process; step S6).

Next, after step S7, the display on the display screen E is updated according to the result of the position and orientation calculation in step S5 or S6 (displaying unit).

First, in step S7, the CPU 33 determines whether each articulation value of the robot 101 required for the case of moving the reference part to the offset teaching point 110 is within the limitation defined by the hardware, specifications and regulations or not (limitation determining process; step S7), as with Embodiment 1.

If each articulation value of the robot 101 is within the limitation in step S7, the processing proceeds to step S9 and the CPU 33 updates the display screen E of the displaying apparatus C according to the result of the position and orientation calculation (normality displaying process). At the same time, the display of the robot 101 on the virtual environment screen 10 can immediately be changed to have the position and orientation corresponding to the teaching point 110.

Figure 8:
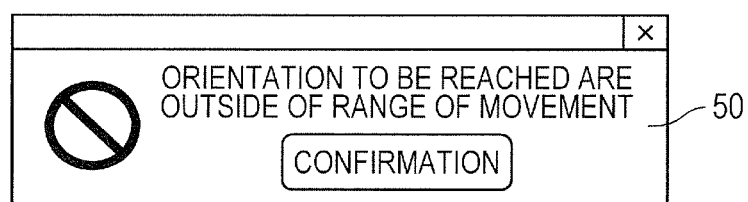
FIG. 8 is a diagram illustrating an error screen according to Embodiment 1 of the present invention.

On the other hand, if each articulation value of the robot 101 exceeds the limitation in step S7, the processing proceeds to step S8, the error screen 50 in FIG. 8, described above, is displayed (abnormality displaying process) to display the fact that the robot 101 has unavailable orientation, and the state returns to the state before editing.

Subsequently, the user having viewed the display of the robot 101 on the virtual environment screen 10 and the display on the parameter setting screen 20 can determine the details of editing at the teaching point 110 serving as the reference, by clicking the determination button 209 (FIGS. 5A to 5D and FIGS. 6A to 6D) using the mouse (step S16). To cancel editing pertaining to the teaching point 110, the cancel button 210 (FIGS. 5A to 5D and FIGS. 6A to 6D) is clicked. When this cancel operation is performed, the CPU 33 discards the changed content and restores the display on the displaying apparatus C to the state before editing.

As described above, upon performing the operation of editing the offset teaching point 110 associated with the work 103, the user can immediately confirm the position and orientation of the robot 101 and the parameter of the teaching point. Consequently, human errors and the operation man-hour can be reduced.

(Change in Placement of Work 103)

Next, the second case, which is the edit process of changing the placement of the work 103, and a control example by the CPU 33 associated therewith, are described with reference to FIGS. 13 to 16C.

Figure 11B:
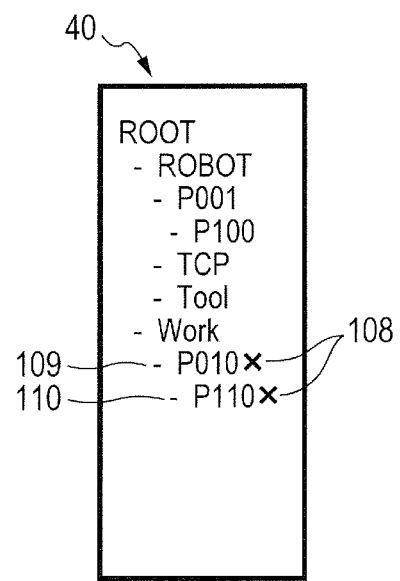

The display illustrated in FIGS. 11A and 11B, described above, is used for the management screen 40. At the same time, it is assumed that as to the work 103 subjected to placement change, the nodes of the teaching point 109 serving as the reference and the offset teaching point 110 of the child have already been defined, as with the examples in FIGS. 11A, 11B and 12.

The nodes of the teaching point 109 serving as the reference and the offset teaching point 110 of the child store the position and orientation data corresponding to the position and orientation of the reference part of the robot 101, e.g., in the case of handling, such as grasping, of the work 103. In this example, the nodes of the teaching points 109 and 110 are stored in the hierarchic layer of the work 103. Consequently, when the position of the work 103 is changed, the CPU 33 can automatically edit (change) the nodes of the teaching points 109 and 110 which are affected as described below.

The position and orientation data for controlling the robot apparatus in this specification is stored in the storing apparatus 35 according to the hierarchic node structure. For example, the associated teaching point (e.g., the teaching point as the reference, and the offset teaching point) is hierarchically correlated, and stored as nodes. Consequently, when editing for a specific node is performed, another node in the range affected by the editing can immediately be identified. The new value of the node can be calculated according to the edited node.

A target other than the robot 101, for example, (the position and orientation data of) the work 103, can also be stored as one node in the storing apparatus 35 according to the hierarchic data structure. Consequently, when (the position and orientation data of) the node of the work 103 dealt with by the robot 101 is edited, the relationship with the limitation due to the hardware, specifications and regulations can be checked by calculating the position and orientation of the robot 101 as described above. If no error occurs, the display of the parameter setting screen 20 and the virtual environment screen 10 on the display screen E can be updated.

Figure 13:
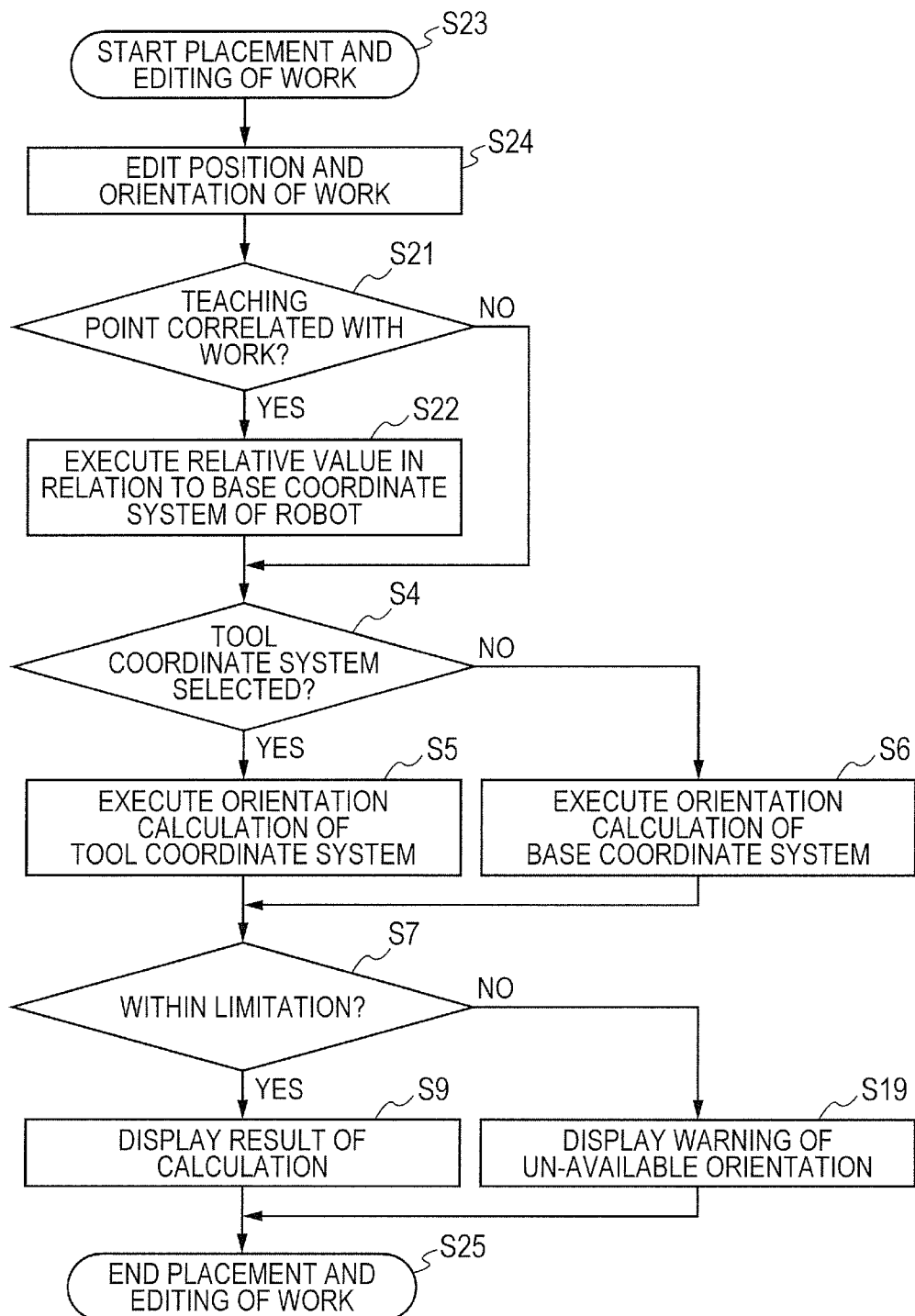
FIG. 13 is a flowchart illustrating a process of changing work placement according to Embodiment 2 of the present invention.

FIG. 13 illustrates control procedures in the case of editing the position and orientation of the work 103. Control for the offset teaching point 110 in the case of editing the position and orientation of the work 103 is hereinafter described.

Figure 14A:
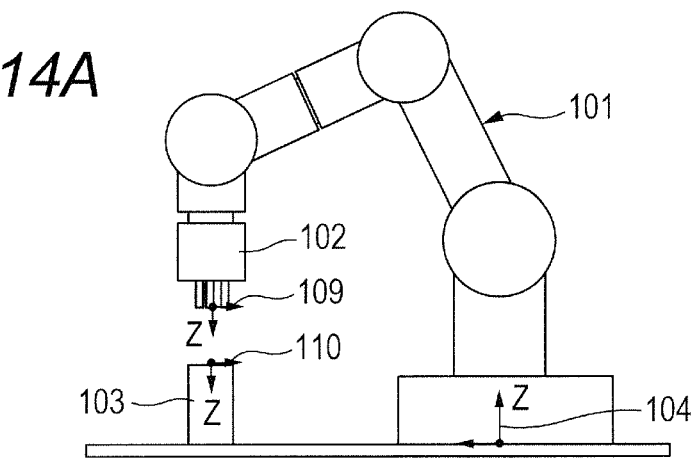
FIGS. 14A, 14B and 14C are diagrams illustrating virtual environment screens according to Embodiment 2 of the present invention.
Figure 14B:
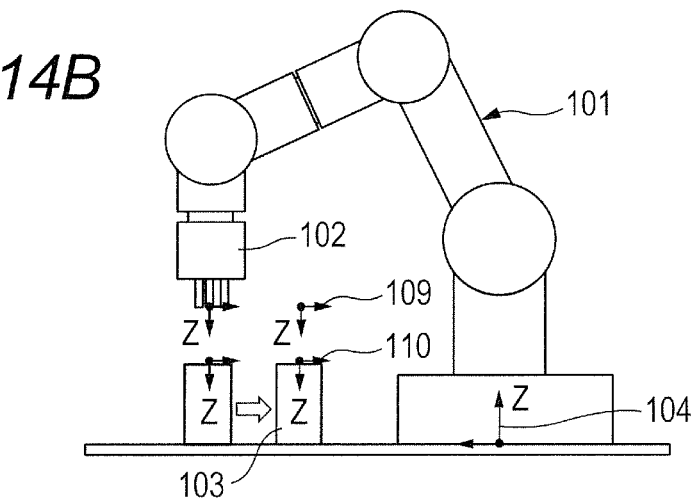
Figure 14C:
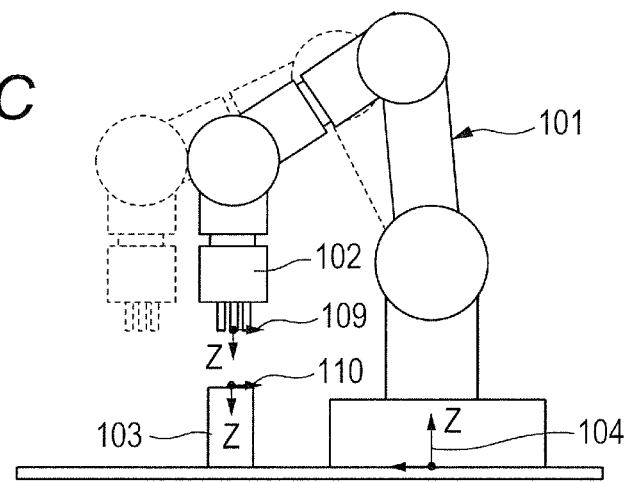

FIGS. 14A to 14C illustrate the situations of updating the display of the virtual environment screen 10 in the case of editing the position and orientation of the work 103. FIG. 14A illustrates the relationship between the position and orientation of the robot 101 at the teaching point 109 serving as the reference associated with the work 103 and the placement of the work 103.

As to hierarchic data storage on the storing apparatus 35 pertaining to the work 103, a state is considered where the teaching point 109 serving as the reference and the offset teaching point 110 are associated with each other (e.g., FIG. 11A).

In step S23 in FIG. 13, the work 103 to be edited is selected on the management screen 40, and start of editing placement of the work 103 is designated. The GUI is configured so as to allow this operation to be performed by the user by clicking the node of the work 103 on the management screen 40 illustrated in FIG. 11A using the mouse.

Figure 16A:
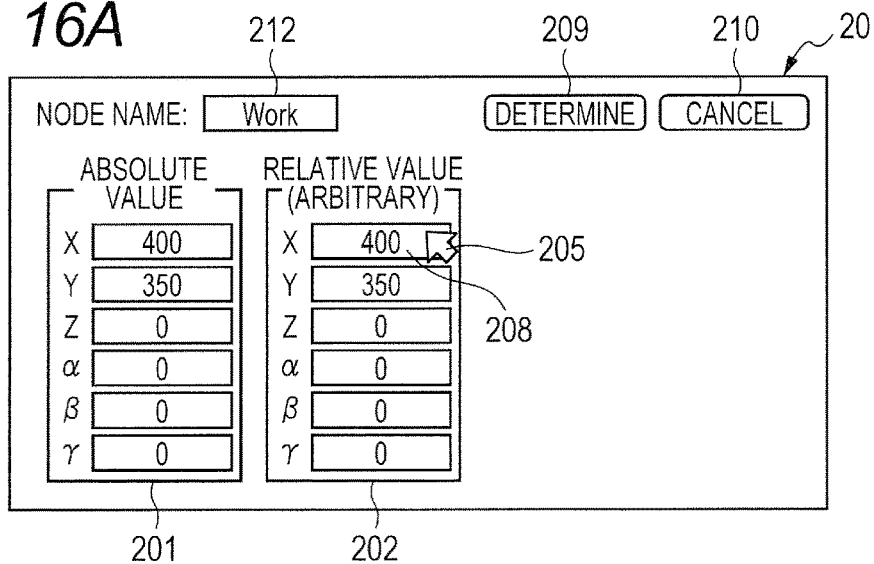
FIGS. 16A, 16B and 16C are diagrams illustrating parameter setting screens according to Embodiment 2 of the present invention.
Figure 16B:
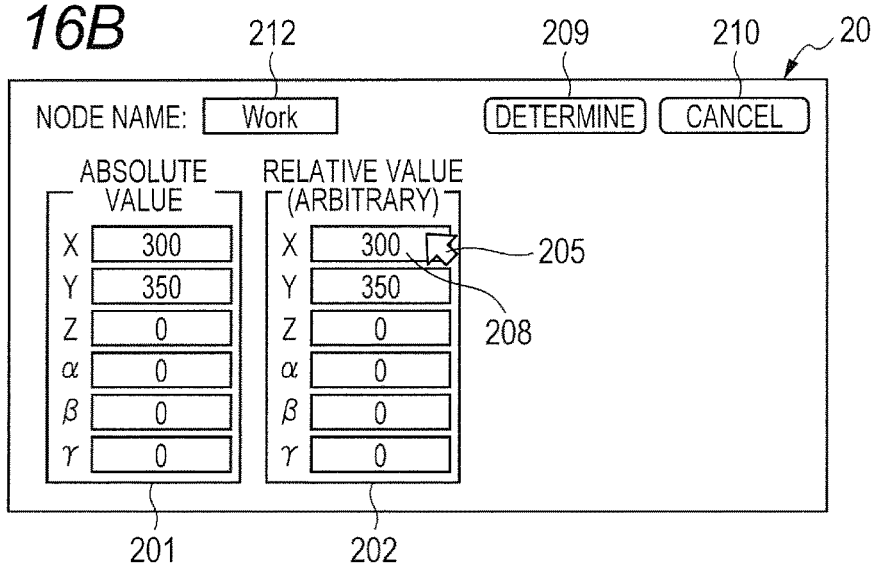
Figure 16C:
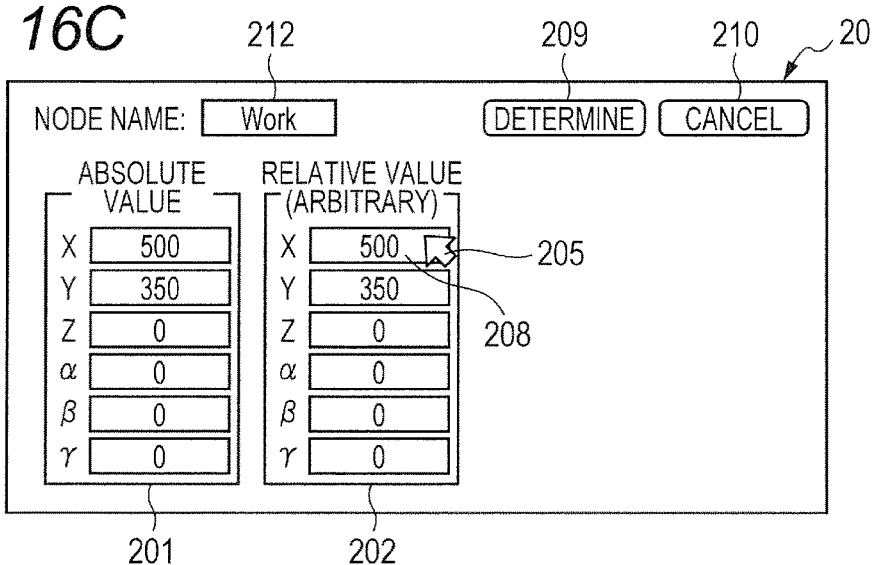

FIGS. 16A to 16C illustrate display states of the parameter setting screen 20 used to edit the node of the work 103 in this example. In the example of FIGS. 16A to 16C, the node of the work 103 has already been selected. No input field (box) is displayed on the right side of the parameter setting screen 20.

When the node of the work 103 is clicked on the management screen 40 to select the node in step S23, the CPU 33 switches the parameter setting screen 20 to, for example, the state illustrated in FIG. 16A. The parameter setting screen 20 of FIG. 16A represents the state before the placement of the work 103 is changed.

If the work 103 has already been placed at this stage, X, Y and Z coordinate values where the work 103 is placed on the absolute value setting unit 201 are displayed as illustrated in FIG. 16A. According to this GUI configuration, the same X, Y and Z coordinate values are displayed on the relative value setting unit 202. The base coordinate system is used as the coordinate system for the work 103.

Subsequently, in step S24 in FIG. 13, the user can change the placement of the work 103 using the parameter setting screen 20.

In the example of GUI in FIGS. 16A to 16C, the placement is changed using the relative value setting unit 202. For example, as illustrated in FIG. 16A, the user clicks the X-coordinate setting field 208 of the relative value setting unit 202 using the cursor 205 (pointer) of the mouse of the operating input unit D to select this input field.

A numeric value of "300" (mm) is input into the X-axis setting field 208 of the relative value setting unit 202 through the keyboard of the operating input unit D, and the [Enter] key of the keyboard is pressed (the numeric value before the input is "400"). The [Enter] key of the keyboard is pressed here in the case of editing the node of the work 103, the CPU 33 copies the input made into the relative value setting unit 202 to the absolute value setting unit 201 to display the input, as illustrated in FIG. 16B.

It is assumed here that the change in placement of the work 103 through the designation of the numeric value is made by an operation of moving the work 103, for example, from the position in FIG. 14A to a right position on the virtual environment screen 10 in FIG. 14B.

When the input is made into one of the input fields for the nodes and the [Enter] key is pressed as described above, the CPU 33 changes the position and orientation data on the node according to the details of editing, and calculates the new position and orientation of the teaching point of the node affected by this editing.

In the case where the work 103 and the teaching points 109 (P010) and 110 (P110) are stored according to the node structure as illustrated in FIG. 11A, the positions and orientations of these teaching points 109 and 110 are calculated.

First, in step S21 in FIG. 13, it is determined whether the performed editing is editing the teaching point associated with the tree of Work or not (model determination process). In the case where step S21 is positive, step S22 is executed before transition to step S4. In the negative case, the processing transitions directly to step S4.

For example, in the case of the teaching point 109 serving as the reference and the offset teaching point 110, the points are stored in the nodes at the descendents of the work 103. Consequently, step S22 is executed. In step S22, the relative value from the robot 101 in the base coordinate system (104) to the teaching point 109 serving as the reference is calculated (base relative value calculating process; S22).

The subsequent steps S4 to S6 are determination processes for the coordinate system pertaining to the data representation of the processing target teaching point as have been illustrated in FIGS. 3, 10 and 12.

First, in step S4, it is determined whether the coordinate system indicated by the coordinate system data stored together with the position and orientation data on the teaching point is the tool coordinate system 105 or not.

If the determination result of step S4 indicates the tool coordinate system 105, the processing proceeds to step S5, and orientation calculation for the tool coordinate system 105 is executed in a manner analogous to the description with reference to FIG. 3 (or FIG. 12) (articulation value calculating process).

If the determination result of step S4 indicates the base coordinate system 104, the processing proceeds to step S6, and orientation calculation for the base coordinate system 104 is executed in a manner analogous to the description with reference to FIG. 3 (or FIG. 12) (articulation value calculating process).

Subsequently, based on the result of the position and orientation calculation, the display on the display screen E of the displaying apparatus C is updated (displaying unit). In step S7, it is determined whether each articulation value required to move the reference part of the robot 101 to the teaching point 109 serving as the reference and the offset teaching point 110 is within the limitation defined by the hardware, specifications and regulations or not (limitation determining process).

If the determination in step S7 indicates that the position and orientation of the robot 101 (the state of each articulation value) are within the limitation, the processing proceeds to step S9 and the CPU 33 updates the display screen E of the displaying apparatus C according to the result of the position and orientation calculation (normality displaying process).

FIG. 14B illustrates display states of the work 103 after determination of placement editing of the work 103, the teaching point 109 serving as the reference, and the offset teaching point 110 on the virtual environment screen 10. If the determination in step S7 indicates that the position and orientation (the state of each articulation value) of the robot 101 are within the limitation, the CPU 33 updates the display on the virtual environment screen 10 from the state in FIG. 14B to the state in FIG. 14C.

After the user views and confirms the display screen E of the displaying apparatus C having been switched as described above, the user clicks the determination button 209 on the parameter setting screen 20 using the mouse of the operating input unit D. According to this operation, the CPU 33 finishes editing the teaching points 109 and 110 in step S25. When the cancel button 210 on the parameter setting screen 20 is clicked by the mouse of the operating input unit D, the CPU 33 discards the details of editing and returns the virtual environment screen 10 to the screen in the state of FIG. 14A.

Furthermore, it is configured that after editing on changing the placement of the work 103 is completed, the teaching point 109 serving as the reference and associated with the work 103 on the management screen 40 is allowed to be selected by clicking through the mouse. According to the operation of selecting the teaching point 109, the CPU 33 can display, on the virtual environment screen 10, the position and orientation of the robot 101 in the state of having been moved to the teaching point 109 serving as the reference.

As described above, according to this embodiment, the robot teaching data is stored according to the tree structure that hierarchically stores the nodes. Accordingly, the teaching points 109 and 110 can be stored at the descendants of the node of the work 103. Consequently, when the position and orientation of the node of the work 103 are changed, the CPU 33 can automatically calculate the position and orientation data on the teaching points 109 and 110 that are associated descendant nodes, and automatically calculate the position and orientation (and each articulation value achieving the position and orientation) of the robot 101. Furthermore, the CPU 33 can determine whether the position and orientation (and each articulation value achieving the position and orientation) of the robot 101 are within the limitation defined by the hardware, specifications and regulations or not.

The case of unavailable position and orientation of the robot 101 at the teaching points 109 and 110 after the placement of the work 103 is changed is described.

For example, FIG. 16C illustrates another operation pertaining to the change in the placement of the work 103 onto the parameter setting screen 20. In FIG. 16C, a numeric value of "500" is input into the X-axis setting field 208 of the relative value setting unit 202 through the keyboard of the operating input unit D, and the [Enter] key is pressed. This operation is processed in step S24 in FIG. 13.

The change in the position of the work 103 in the X-axis direction by "500" (mm) is a larger movement than the movement in the case of "300" (mm) in FIG. 16B, described above. It is herein assumed that if the position and orientation calculation is performed according to the change in the position of the work 103 in the X-axis direction by "500" (mm), any of the articulation values exceeds the limitation range defined by the hardware, specifications and regulations of the robot 101.

Consequently, if the position of the work 103 is changed in the X-axis direction by "500" (mm), the processing transitions from step S7 (limitation determining process) to step S19 (abnormality displaying process) in FIG. 13. In step S9 (abnormality displaying process), the CPU 33 performs an error display using the display screen E of the displaying apparatus C. As an example of this error display, marks 108 (e.g., x marks as illustrated in the diagram) are displayed at the teaching points 109 and 110 to indicate that the points are unmovable teaching points using the management screen 40 as exemplified in FIG. 11B. The subsequent process of finishing editing (step S25) is performed as described above.

Figure 15A:
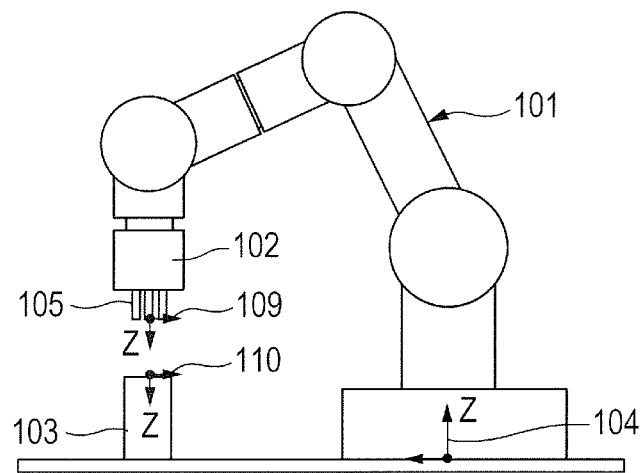
FIGS. 15A and 15B are diagrams illustrating virtual environment screens according to Embodiment 2 of the present invention.
Figure 15B:
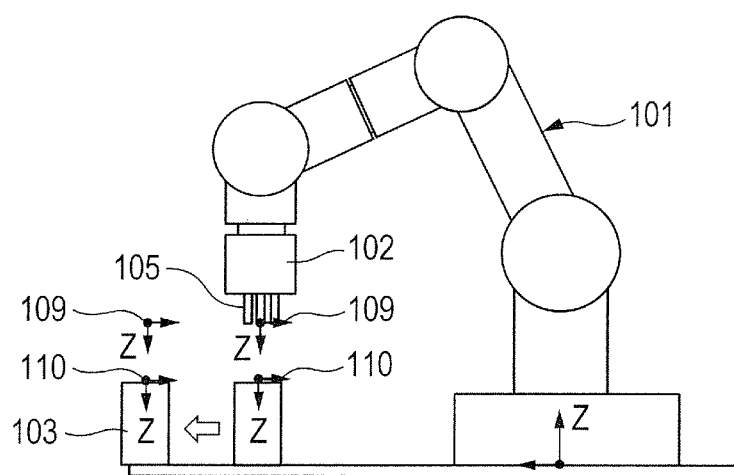

It can be considered that the virtual environment screen 10 in the case where the placement change of the work 103 with unavailable position and orientation of the robot 101 is performed may be updated as illustrated in FIGS. 15A and 15B. FIG. 15A, which is equivalent to FIG. 14A, illustrates the virtual environment screen 10 before the edit process pertaining to the placement change of the work 103 is performed.

When the edit process pertaining to the placement change of the work 103 is performed in the state in FIG. 15A, for example, during execution of the position and orientation calculation, the CPU 33 updates the virtual environment screen 10 to a state where the work 103 is moved by a designated amount of movement as illustrated in FIG. 15B. In FIG. 15B, for convenience of understanding, the movement direction of the work 103 is defined in the direction opposite to the direction in FIGS. 14B and 14C.

At a stage where the position and orientation calculation pertaining to the edit operation is finished and the processing enters the determination for the limitation range, the processing transitions from step S7 (limitation determining process) to step S19 (abnormality displaying process) in FIG. 13. In this case, the CPU 33 updates the management screen 40 to the screen illustrated in FIG. 11B as described above, while returning the display state of the virtual environment screen 10 from the state in FIG. 15B to the state in FIG. 15A. During this process, a warning representation that causes the entire or a part of the virtual environment screen 10 to flash may be concurrently used.

As described above, the data structure for storing the nodes of the position and orientation data that is the robot control data (teaching data) of this embodiment in the storing apparatus 35 according to the hierarchic tree structure is adopted. According to this structure, not only the position and orientation data pertaining to the robot apparatus but also the position and orientation data pertaining to the work 103 can be stored in the same tree structure as described above. Consequently, when the editing pertaining to the work 103 is performed in the case where the tree-structured teaching data items include other associated teaching data items (e.g., the teaching point 109 and the offset teaching point 110 of the work 103), these associated teaching data items can immediately, automatically be recalculated. The position and orientation calculation of the robot 101 is performed according to the editing pertaining to the work 103. This calculation can automatically execute checking of the validity on the limitation defined by the hardware, specifications and regulations.

If no problem occurs as a result of the recalculation of the teaching data and the position and orientation of the robot 101, the display screen that includes the virtual environment screen 10, the parameter setting screen 20, and the management screen 40 of the displaying apparatus C can automatically be updated to the details according to the edit operation, immediately after editing. Consequently, the user (operator) can confirm the details of editing associated with the work 103 and the result in real time, which can reduce human errors and the man-hour.

The teaching point 106 serving as the reference, and the offset teaching point 107 are stored at the descendant of the node of the robot 101 (ROBOT) in FIG. 11A. A way of operation can be considered where the teaching point 106 (P001) corresponds to the teaching point 109 (P010) equivalent to the specific position of the work 103, and the offset teaching point 107 (P100) corresponds to the offset teaching point 110 (P110). According to a desired way of operation, the pair of the teaching point serving as the reference and the offset teaching point can be stored in both the tree of ROBOT and the tree of Work, as the same actual storage. It is thus considered that the user can easily grasp the structure of the entire robot control data.

In this case, a configuration is convenient where the teaching points 106 and 109 and the teaching points 107 and 110 corresponding to each other have a relationship where editing one teaching point causes the details of the other corresponding teaching point to be automatically edited in the same manner. According to a method of allowing such a process, for example, the entities of the corresponding teaching points 106 and 109 (or the teaching points 107 and 110) are stored on the same memory cell in the storing apparatus 35. The address pointer of this one memory cell is stored as nodes P001 and P100 (or P010 and P110) in the trees of ROBOT and Work. According to such a structure, any designation of editing can edit the actual data stored in the same memory cell via any of the pointers of the nodes P001 and P100 (or P010 and P110).

Through use of the structure of accessing the entity of the same memory data via different multiple pointers (and names), alias nodes can be prepared as necessary at different positions in the tree structure where the teaching data is stored. Consequently, the user can easily grasp the structure of the entire robot control data, reach one identical data from different multiple positions in the tree structure, and securely edit the content of the data.

The configuration of accessing the entity of the identical data via different multiple names is not limited to the address pointer. For example, any of the mechanisms of "links", such as a junction, a symbolic link and a hard link, which are used in various file systems may be utilized. In this case, a specific node is stored as one file in the file system arranged in the storing apparatus 35, and the link is arranged as another node on another position on the tree of the data structure.

Embodiment 3

An information processing apparatus and an information processing method according to Embodiment 3 of the present invention are hereinafter described with reference to FIGS. 17 to 20C. In the following description, basic parts of the hardware configuration and the display screen configuration are the same as the parts in Embodiment 1. Description on the details is omitted. In the following embodiment, the same reference signs are used for the same or corresponding members. The detailed description of these members is omitted.

In the above Embodiments 1 and 2, the process of editing the relative value that is the model information from the parent to the child on a node-managed working space has been described. However, editing is not necessarily set according to the relative value.

For example, when a complicated operation is taught during formation of the offset teaching point 107 through selection of the tool coordinate system, setting should sometimes be made according to an absolute value in an absolute coordinate system (e.g., the base coordinate system), such as on the working space, in some situations.

A process is described that operates the offset teaching point 107 and the offset teaching point 110 through an absolute value using an absolute coordinate system on the working space by operating the absolute value setting unit 201 of the parameter setting screen 20.

As to the edit process through the operation of the absolute value setting unit 201, different processes and display are required to be performed according to the types of target teaching points. Consequently, three cases are hereinafter described that are "the case of the offset teaching point 107 in the tool coordinate system 105 being selected", "the case of the offset teaching point 107 in the base coordinate system being selected", and "the case of the offset teaching point 110".

(Absolute Value Editing on Offset Teaching Point 107 in Tool Coordinate System 105 being Selected)

First, the first case, that is, procedures and control of editing the absolute value of the offset teaching point 107 in the tool coordinate system 105 being selected are described with reference to FIGS. 11A and 11B and FIGS. 17 to 19C.

Figure 17:
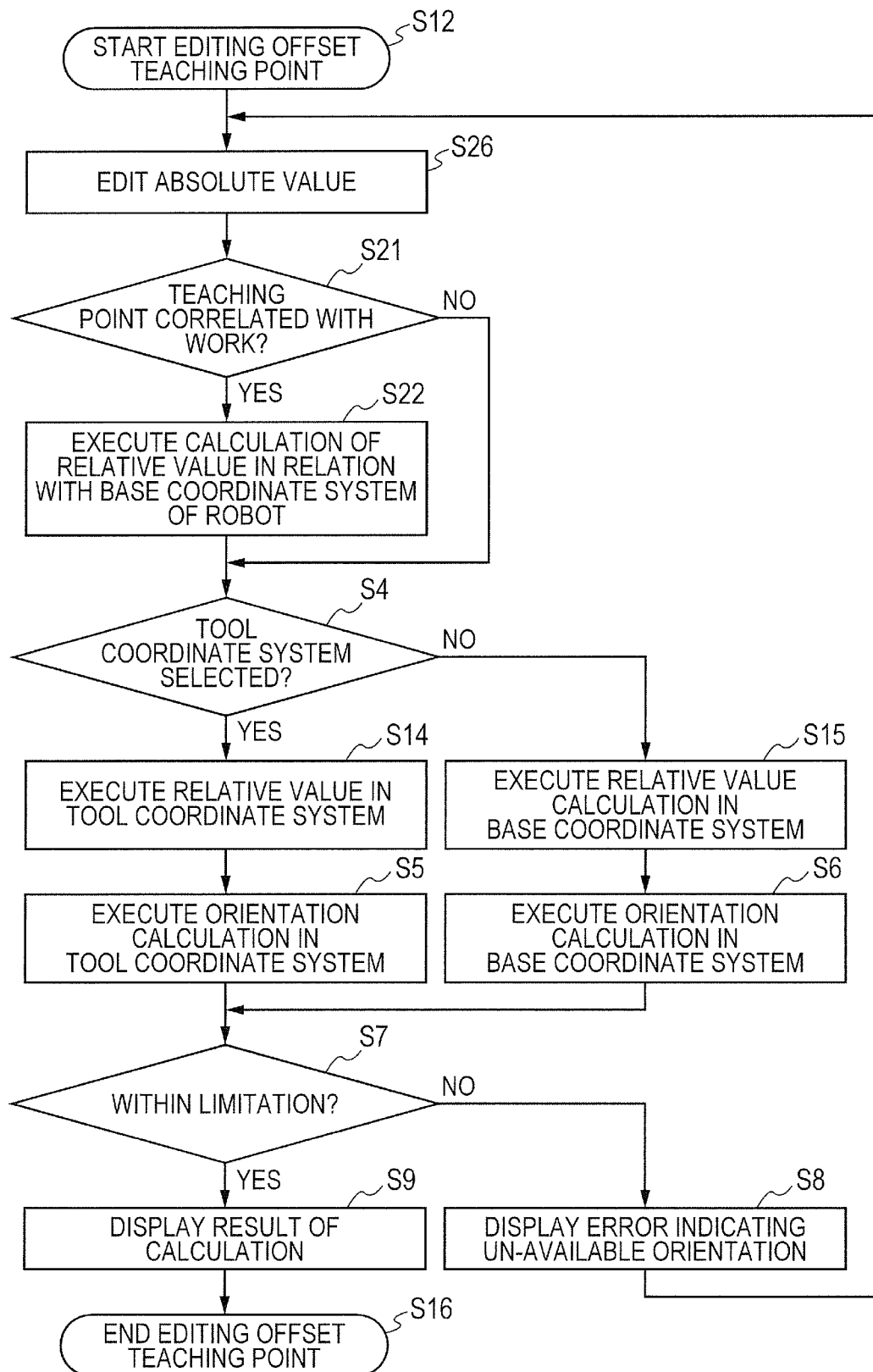
FIG. 17 is a flowchart illustrating an edit process of an offset teaching point according to Embodiment 3 of the present invention.

FIG. 17 illustrates control procedures in the case of absolute value editing on the offset teaching point 107.

In step S12 in FIG. 17, the offset teaching point 107 on the management screen 40 (FIG. 11A) is selected, and editing is started. As with the above description, the selecting method is performed by clicking the node of the teaching point 107 (P100) on the management screen 40 using the mouse of the operating input unit D.

Figure 18A:
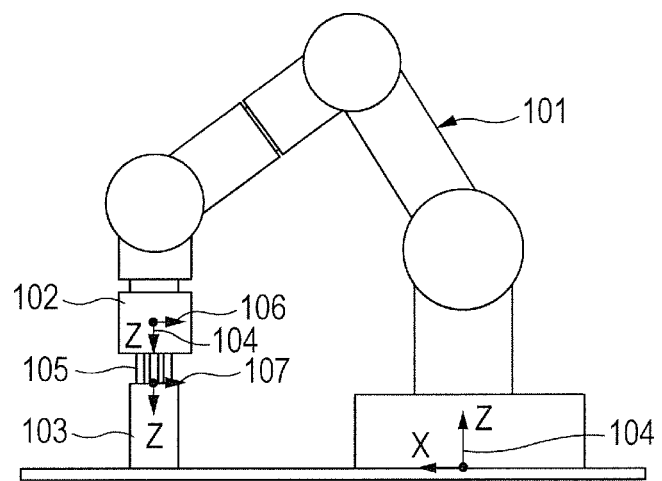
FIGS. 18A and 18B are diagrams illustrating virtual environment screens according to Embodiment 3 of the present invention.
Figure 18B:
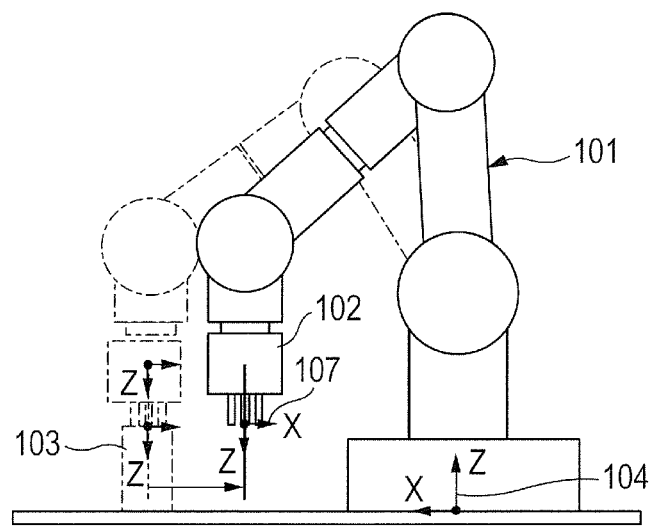

FIGS. 18A and 18B illustrate the position and orientation of the robot 101 displayed on the virtual environment screen 10 in the case where the absolute value editing on the offset teaching point 107 is performed in this embodiment. At the start of editing, the offset teaching point 107 is defined with respect to the teaching point 106 serving as the reference as illustrated in, for example, FIG. 18A. The offset (relative distance) at this time is, for example, defined to have a distance where the tool 102 reaches the work 103 as illustrated in the diagram. Consequently, the robot 101 is displayed on the virtual environment screen 10 with the position and orientation so as to cause the tool 102 to reach the work 103 as illustrated in the diagram.

In setting of the numeric value of the parameter, the parameter setting screen 20 as illustrated in FIGS. 19A to 19C is displayed on the display screen E of the displaying apparatus C and used.

In step S26 in FIG. 17, the user edits the absolute value of the offset teaching point 107 (parameter setting unit). FIG. 19A illustrates an operation of accessing the setting field 208 of the absolute value setting unit 201 on the parameter setting screen 20. That is, as illustrated in the diagram, the X-axis setting field 208 of the absolute value setting unit 201 is clicked by the cursor 205 of the mouse of the operating input unit D.

At the stage of FIG. 19A, the display of the teaching point name setting unit 212 has been switched to "P100" corresponding to the teaching point 107. The value of the teaching point setting unit 203 has been switched to "P001" corresponding to the teaching point 106 serving as the reference. As displayed in the coordinate system selecting unit 204, the tool coordinate system is selected as the coordinate system.

Subsequently, the user changes the content of the X-axis setting field 208 of the absolute value setting unit 201 from "400" to "300" as illustrated in FIG. 19B. Here, a numeric value of "300" is input into the X-axis setting field 208 of the absolute value setting unit 201 through the keyboard of the operating input unit D, and the [Enter] key is pressed. The range of the value "400" having already been input is selected by the mouse before input of "300". Alternatively, this value is deleted by the delete key of the keyboard. When the [Enter] key of the keyboard is pressed and the input is determined, the position and orientation calculation is executed according to the function of the calculating unit 34 of the CPU 33 (orientation calculation unit).

First, in step S21 in FIG. 17, it is determined whether the operation target node is the teaching point associated with the work 103 or not (model determination process). The node operated in this example is the teaching point 107, which is the teaching point associated with the robot 101. Consequently, the processing bypasses step S22, and proceeds to step S4.

In step S4, it is determined whether the coordinate system selected for the teaching point (107) is the tool coordinate system 105 or not (S4). When the coordinate system selected here is the tool coordinate system 105 as illustrated in FIG. 19A, the processing proceeds to step S14, and the relative value calculation in the tool coordinate system 105 described in Embodiment 1 is executed (relative value calculating process). As to the result of the relative value calculation, Euler-angle transformation is performed, and the relative values (X, Y, Z, α, β and γ) that are the offset in the tool coordinate system 105 are calculated.

Subsequently, in step S5, in a manner analogous to the description of Embodiment 1 with reference to FIG. 3, the position and orientation calculation in the tool coordinate system 105 is performed (articulation value calculating process). Subsequently, according to the result of calculation, the display on the display screen E of the displaying apparatus C is updated (displaying unit).

First, in step S7, it is herein determined whether each articulation value on the offset teaching point 107 is within the limitation defined by the hardware, specifications and regulations or not (limitation determining process). If the value is within the limitation in step S7, the processing proceeds to step S9 and the CPU 33 updates the display screen E of the displaying apparatus C according to the result of the position and orientation calculation (normality displaying process).

According to the details of updating, the display updating is performed so that the relative values (X, Y, Z, α, β and γ) that are offsets in the direction in the tool coordinate system 105 are reflected in the relative value setting unit 202, and the result of calculation of the articulation value on each axis of the robot 101 obtained by the inverse kinematic calculation is reflected on the virtual environment screen 10.

If the value is out of the limitation in step S7, the processing proceeds to step S8, the error screen 50 in FIG. 8, described above, is displayed (abnormality displaying process) to display the fact that the robot 101 has unavailable orientation, and the state returns to the state before editing.

FIG. 18B illustrates the state of update of the position and orientation of the robot 101 on the offset teaching point 107 displayed on the virtual environment screen 10 by the CPU 33 after the editing described above.

FIG. 19C illustrates the parameter on the offset teaching point 107 after the editing. The operation in FIGS. 19A and 19B causes the absolute value setting unit 201 to change the X-coordinate value from "400" to "300". The display on the relative value setting unit 202, whose value is an offset in the direction of the tool coordinate system 105 is changed to have the X-coordinate value from "0" to "100" based on the relative value calculation described above.

The method of using the determination button 209 and the cancel button 210 on the parameter setting screen 20 at the time when the editing in step S16 in FIG. 17 is finished is analogous to the method in the embodiment described above.

As described above, even when the parameter of the absolute value at the offset teaching point 107 in the base coordinate system being selected is changed, the operator can immediately confirm the position and orientation and the parameter of the relative value concurrently with the absolute value editing operation, thereby allowing the man-hour required for confirmation to be reduced. That is, according to discussion also in consideration of the Embodiment 1, in editing the offset teaching point 107, this system can appropriately execute editing of the offset teaching point 107, and updating of the display screen E based on the editing, in any of the cases of using the relative value and using the absolute value.

(Absolute Value Editing on Offset Teaching Point 107 in Base Coordinate System 104 being Selected)

Next, the second case, that is, editing on the absolute value of the offset teaching point 107 in the base coordinate system 104 being selected is described with reference to FIGS. 11A, 11B, 17, 18A, 18B, 20A, 20B and 20C. Hereinafter, the control procedures are described with reference to FIG. 17 as described above. The display screens in FIGS. 20A to 20C are used as the parameter setting screen 20.

The offset teaching point 107 on the management screen 40 (FIG. 11A) is selected, and editing is started (S12). As with the above description, the selecting method is performed by clicking the node of the teaching point 107 (P100) on the management screen 40 using the mouse of the operating input unit D.

The absolute value editing operation performed in this example is equivalent to the absolute value editing on the offset teaching point 107 in the tool coordinate system being selected. Consequently, the display in FIGS. 18A and 18B can also be used for the virtual environment screen 10 in this example.

In this example, in setting of the numeric value of the parameter, the parameter setting screen 20 as illustrated in FIGS. 20A to 20C is displayed on the display screen E of the displaying apparatus C and used.

In step S26 in FIG. 17, the user edits the absolute value of the offset teaching point 107 (parameter setting unit). FIG. 20A illustrates an operation of accessing the setting field 208 of the absolute value setting unit 201 on the parameter setting screen 20. That is, as illustrated in the diagram, the X-axis setting field 208 of the absolute value setting unit 201 is clicked by the cursor 205 of the mouse of the operating input unit D.

At the stage of FIG. 20A, the display of the teaching point name setting unit 212 has been switched to "P100" corresponding to the teaching point 107. The value of the teaching point setting unit 203 has been switched to "P001" corresponding to the teaching point 106 serving as the reference. As displayed in the coordinate system selecting unit 204, the base coordinate system is selected as the coordinate system.

Subsequently, the user changes the content of the X-coordinate value setting field 208 of the absolute value setting unit 201 from "400" to "300" as illustrated in FIG. 20B. Here, a numeric value of "300" is input into the X-axis setting field 208 of the absolute value setting unit 201 through the keyboard of the operating input unit D, and the [Enter] key is pressed. The range of the value "400" having already been input is selected by the mouse before input of "300". Alternatively, this value is deleted by the delete key of the keyboard. When the [Enter] key of the keyboard is pressed and the input is determined, the position and orientation calculation is executed according to the function of the calculating unit 34 of the CPU 33 (orientation calculation unit).

First, in step S21 in FIG. 17, it is determined whether the operation target node is the teaching point associated with the work 103 or not (model determination process). The node operated in this example is the teaching point 107, which is the teaching point associated with the robot 101. Consequently, the processing bypasses step S22, and proceeds to step S4.

In step S4, it is determined whether the coordinate system selected for the teaching point (107) is the tool coordinate system 105 or not (S4). When the coordinate system selected here is the base coordinate system 104 as illustrated in FIG. 20A, the processing proceeds to step S15, and the relative value calculation in the base coordinate system 104 described in Embodiment 1 is executed (relative value calculating process). As to the result of the relative value calculation, Euler-angle transformation is performed, and the relative values (X, Y, Z, α, β and γ) that are the offset in the base coordinate system 104 are calculated.

Subsequently, in step S6, in a manner analogous to the description of Embodiment 1 with reference to FIG. 3, the position and orientation calculation in the base coordinate system 104 is performed (articulation value calculating process). Subsequently, according to the result of calculation, the display on the display screen E of the displaying apparatus C is updated (displaying unit). In the case where the tool coordinate system is selected in step S4, the relative value calculation for the tool coordinate system is performed in step S14 as described above, and the orientation calculation in the tool coordinate system is performed in step S5 based on the relative value calculation.

Subsequently, in step S7, it is determined whether each articulation value on the offset teaching point 107 is within the limitation defined by the hardware, specifications and regulations or not (limitation determining process). If the value is within the limitation in step S7, the processing proceeds to step S9 and the CPU 33 updates the display screen E of the displaying apparatus C according to the result of the position and orientation calculation (normality displaying process).

According to the details of updating, the display updating is performed so that (X, Y, Z, α, β and γ) which are offsets in the direction in the base coordinate system 104 are reflected in the relative value setting unit 202, and the result of calculation of the articulation value on each axis of the robot 101 obtained by the inverse kinematic calculation is reflected on the virtual environment screen 10.

If the value is out of the limitation in step S7, the processing proceeds to step S8, the error screen 50 in FIG. 8, described above, is displayed (abnormality displaying process) to display the fact that the robot 101 has unavailable orientation, and the state returns to the state before editing.

FIG. 18B illustrates the state of update of the position and orientation of the robot 101 on the offset teaching point 107 displayed on the virtual environment screen 10 by the CPU 33 after the editing described above.

FIG. 20C illustrates the parameter on the offset teaching point 107 after the editing. The operation in FIGS. 20A and 20B causes the absolute value setting unit 201 to change the X-coordinate value from "400" to "300". The display on the relative value setting unit 202, whose value is an offset in the direction of the base coordinate system 104 is changed to have the X-coordinate value from "0" to "−100" based on the relative value calculation described above. Here, unlike the previous case of absolute value editing on the offset teaching point 107 with the tool coordinate system being selected, the X-coordinate value in the relative value setting unit 202 has a negative value. This is because, for example, the orientation of the robot 101 as illustrated in FIGS. 18A and 18B is the orientation where the positive directions in Z-axes of the base coordinate system 104 and the tool coordinate system 105 face each other.

The method of using the determination button 209 and the cancel button 210 on the parameter setting screen 20 at the time when the editing in step S16 in FIG. 17 is finished is analogous to the method in the embodiment described above.

As described above, even when the parameter of the absolute value at the offset teaching point 107 in the base coordinate system being selected is changed, the operator can immediately confirm the position and orientation and the parameter of the relative value concurrently with the absolute value editing operation, thereby allowing the man-hour required for confirmation to be reduced. In consideration together with the above example, in editing the offset teaching point 107, this system can significantly easily edit the teaching data through equivalent operations of the offset teaching point 107 in the representation both in the tool coordinate system and the base coordinate system. Based on the edit operation, update of the display screen E can appropriately be executed immediately according to the details of editing.

(Absolute Value Editing on Offset Teaching Point 110 Associated with Work 103)

Next, the last case pertaining to the absolute value editing, that is, the editing on the absolute value on the offset teaching point 110 associated with the work 103 is described. The editing on the absolute value on the offset teaching point 110 is basically equivalent to the case of editing the absolute value on the offset teaching point 107 described above. Consequently, points different from the points of the two types of absolute value editing, described above, are mainly described.

Control of the editing of the absolute value on the offset teaching point 110 associated with the work 103 may be according to the control procedures in FIG. 17. The management screen 40 may be, for example, the display in FIG. 11A. The value in the base coordinate system is typically used as the offset teaching point 110 associated with the work 103. Consequently, for numeric input of the parameter, the display of the setting screen 20 equivalent to the screen illustrated in FIGS. 20A to 20C to which reference is made during the absolute value editing in the base coordinate system, may be used.

First, the procedures where the offset teaching point 110 on the management screen 40 (FIG. 11A) is selected and editing is started (step S12 in FIG. 17) are analogous to the procedures described above. The display on the teaching point name setting unit 212 on the parameter setting screen 20 (e.g., FIG. 20A) has been switched to "P110" corresponding to the teaching point 110. The value of the teaching point setting unit 203 is switched to "P010" corresponding to the teaching point 109 serving as the reference. For the nodes on and after the work 103, the base coordinate system is selected as the coordinate system.

Here, for example, the teaching point 109 serving as the reference and the offset teaching point 110 are equivalent to the teaching point 106 and the offset teaching point 107 on the robot side serving as the reference in the above embodiment, respectively. In this case, the arrangement of the numeric values in the absolute value setting unit 201 in FIG. 20A (to FIG. 20C) can be used as they are.

In step S26 in FIG. 17, the user edits the absolute value on the offset teaching point 110 on the parameter setting screen 20 through an operation analogous to the operation described in the absolute value editing on the offset teaching point 107 (parameter setting unit). Here, the operation of the user is assumed to be analogous to the operation described above, in which the content in the X-coordinate value setting field 208 on the absolute value setting unit 201 is changed from the "400" to "300". When the operation of changing the X-coordinate value of the absolute value setting unit 201 is performed through the keyboard of the operating input unit D, and the [Enter] key of the keyboard is pressed, the position and orientation calculation is performed according to the function of the calculating unit 34 of the CPU 33 (orientation calculation unit).

Subsequently, in step S21 in FIG. 17, it is determined whether the offset teaching point 110 is the teaching point associated with the work 103 or not (model determination process). In this example, the teaching point 109 serving as the reference and ascendant of the offset teaching point 110 is the teaching point associated with the work 103. Consequently, the processing proceeds to step S22. In step S22, the relative value from the base coordinate system 104 of the robot 101 is calculated (relative value calculation in the base coordinate system).

Control of transition to the relative value calculation in the base coordinate system in step S22 advances in a manner analogous to the control of the example of editing the absolute value associated with the offset teaching point 107.

As described above, according to this system, the changing of the parameter of the absolute value on the offset teaching point 110 associated with the work 103 can be performed in a manner analogous to the case of the offset teaching point 107 in the node tree of the robot 101. Also in this case, the operator can immediately confirm the position and orientation and the parameter of the relative value concurrently with the absolute value editing operation. Consequently, the man-hour required for the confirmation can be reduced.

In consideration together with the above example, this system can significantly easily edit the teaching data through equivalent operations both in the cases of the offset teaching point 110 that is in the node tree of the work 103 and the offset teaching point 107 that is in the node tree of the robot 101. Based on the edit operation, update of the display screen E can appropriately be executed immediately according to the details of editing.

Embodiment 4

An information processing apparatus and an information processing method according to Embodiment 4 of the present invention are hereinafter described with reference to FIGS. 21, 22A and 22B.

Embodiments 1 to 3 describe the operation method of editing the position and orientation data on the teaching point as the robot control data (teaching data) through numeric input of the relative value or the absolute value using the parameter setting screen 20.

As another operation method related to input and editing of the position and orientation data, a GUI operation unit can be considered to be provided. The GUI operation unit changes the position and orientation of the robot 101 displayed on the virtual environment screen 10 in relation to the operating input unit D (or the virtual environment screen 10). In this case, according to change in the position and orientation of the robot apparatus through an operating unit of the operating input unit D, the virtual display of the robot 101 on the virtual environment screen 10 can be updated, and the content of the numeric value display on the parameter setting screen 20 can be updated.

Figure 22A:
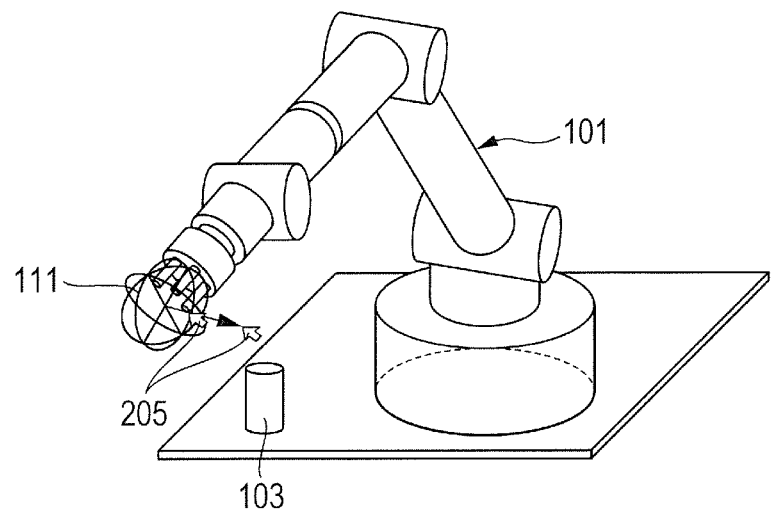
FIGS. 22A and 22B are diagrams illustrating virtual environment screens according to Embodiment 4 of the present invention.
Figure 22B:
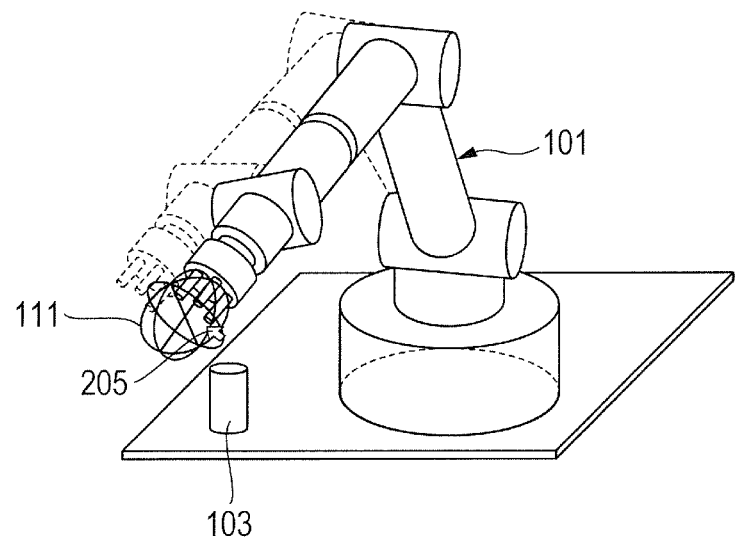

As illustrated in FIGS. 22A and 22B, such an operating unit can be considered to have a GUI configuration where an operation handle 111 operable by the cursor 205 of the pointing device (e.g., mouse) of the operating input unit D, is allowed to be displayed on the virtual environment screen 10.

A configuration and control for input and editing of the position and orientation data using the operation handle 111, described above, in the information processing apparatus A are hereinafter described with reference to FIGS. 21, 22A and 22B, and FIGS. 25A to 25C, and FIGS. 11A and 11B in Embodiment 2. The case of editing the offset teaching point 107 by the operation handle 111 operating the virtual display of the robot 101 is hereinafter described. However, the case of another teaching point, for example, the offset teaching point 110, can be edited according to an analogous process.

Figure 21:
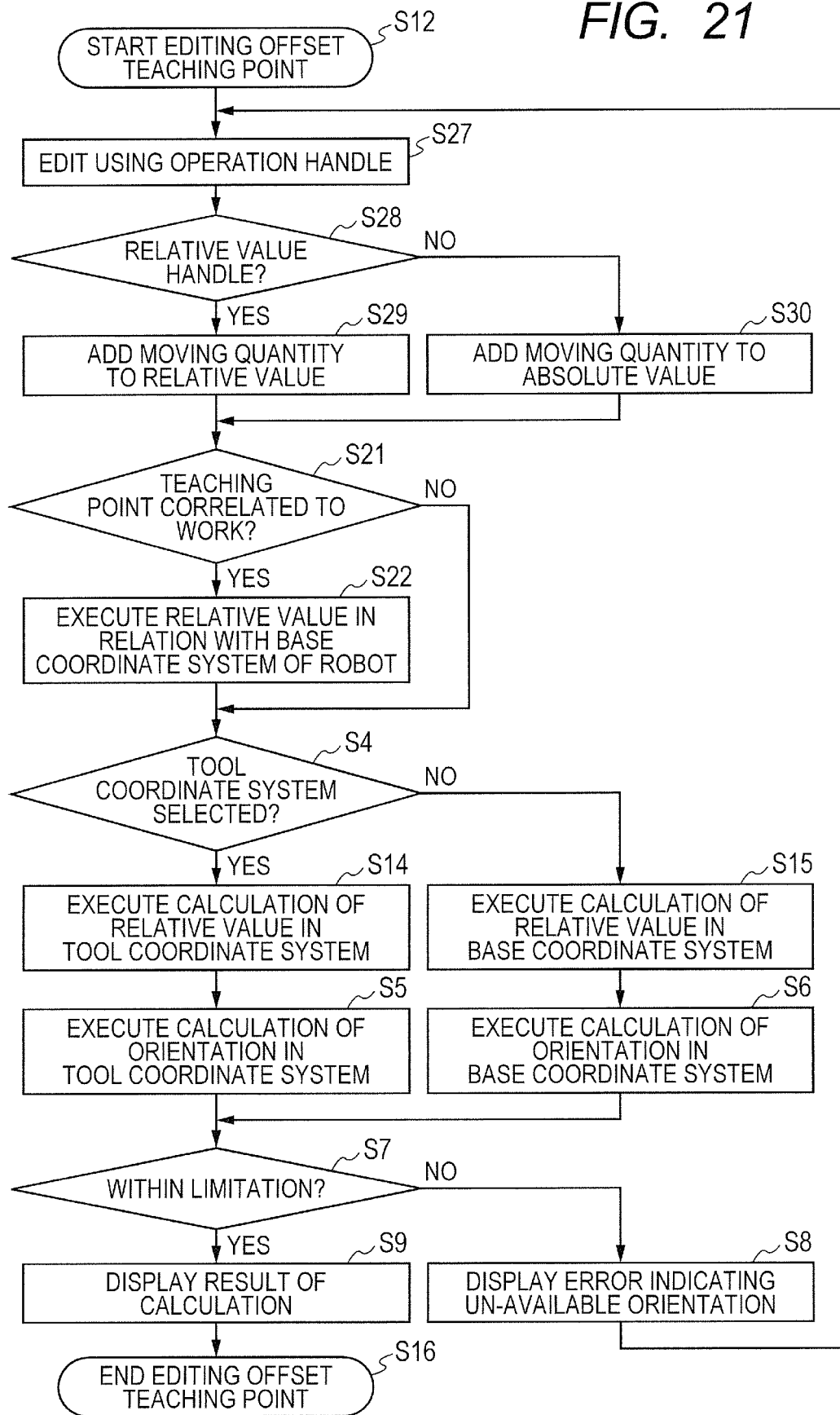
FIG. 21 is a flowchart illustrating an edit process of an offset teaching point according to Embodiment 4 of the present invention.

FIG. 21 illustrates control procedures through the operation handle 111 in the case of inputting and editing the teaching point using the operation handle 111.

In this embodiment, the offset teaching point 107 is edited by the operation handle 111 operating the virtual display of the robot 101. For such editing, first, the user selects the offset teaching point 107 on the management screen 40 (FIG. 11A) in step S12 in FIG. 21, and designates start of editing. The operation method in this case may be a method of clicking the offset teaching point 107 on the management screen 40 (FIG. 11A) using the cursor (pointer) of the mouse of the operating input unit D as described above.

Subsequently, in step S27, the user operates the operation handle 111 using the cursor (pointer) of the mouse of the operating input unit D, and changes the position and orientation of the robot 101. The operation handle 111 is displayed in a manner overlaid on a distal part of the robot 101, for example, as illustrated in FIG. 22A. The operation handle 111 may be a display object displayed in wireframe representation on the tool 102 at the distal end of the robot 101, for example, as illustrated in the diagram.

As to the display object of the operation handle 111, for example, the operation handle 111 may be a ring-shaped object graphically configured so as to display the coordinate system direction of the offset teaching point 107 being currently set.

The operation handle 111 may be configured so that this handle can substantially linearly be clicked and dragged on the screen using the cursor (pointer) of the mouse of the operating input unit D. In this case of clicking and dragging operations, for example, a reference part set at the center of the flange surface where the tool 102 at the distal end of the robot 101 is arranged is moved to any position in the three-dimensional space represented on the virtual environment screen 10.

In the case of operating the offset teaching point 107 through the moving operation by the operation handle 111, as in this embodiment, for example, the reference part of the robot 101 is associated with the offset teaching point 107. In this case, control by the CPU 33 is performed so that when the offset teaching point 107 is operated, the reference part of the robot 101 associated with the offset teaching point 107 is moved, and the position and orientation of the robot 101 is changed in synchronization with the movement.

To operate the offset teaching point (107) through the operation handle 111 as in this embodiment, it is useful that the (amount of) movement designated by the operation handle 111 is associated with one of an absolute value and a relative value. Here, the "relative value" is the coordinate value (position and orientation data) in the relative coordinate system, such as the tool coordinate system 105. The "absolute value" is the coordinate value (position and orientation data) in the absolute coordinate system, such as the base coordinate system 104.

For example, if the relative value (or an absolute value) has already been assigned with the teaching point selected at the time of start of the procedures in FIG. 21, the amount of movement designated by the operation handle 111 is processed according to the relative value (or an absolute value). It may be configured to designate whether the amount of movement input through the operation of the operation handle 111 is a relative value (or an absolute value), by an identifying operation through the operating input unit D.

Hereinafter, for the sake of convenience, as described above, the operation handle 111 controlled in a state where a relative value is input is called "relative value handle", and the operation handle 111 controlled in a state where an absolute value is input is called "absolute value handle".

When the moving operation through the operation handle 111 described above, is performed, the CPU 33 executes the position and orientation calculation that changes the angle of each articulation of the robot 101 according to the position of the movement destination of the offset teaching point 107 (reference part). The CPU 33 changes the position and orientation of the robot 101 displayed on the virtual environment screen 10 according to the result of the position and orientation calculation. The details of GUI through use of the operation handle 111, described above, are of a known-technique. Consequently, more detailed description than the above description is omitted.

In FIGS. 22A and 22B, the operation handle 111 is clicked and dragged to the right. According to the illustration, situations are indicated where the position and orientation of the robot 101 is changed from the position and orientation indicated by solid lines in FIG. 22A and broken lines in FIG. 22B to the position and orientation indicated by solid lines in FIG. 22B. During a mouse dragging operation, continuous movement is designated. Finishing the movement is designated by releasing the button of the mouse.

The operation handle 111 may always be displayed on the virtual environment screen 10. Alternatively, this handle may be displayed only at a necessary timing according to the setting operation through the operating input unit D (e.g., designating an operation mode, such as a virtual environment operation mode or a three-dimensional operation mode).

In step S27, the user can change the position and orientation of the robot 101 displayed on the virtual environment screen 10, using the operation handle 111, as described above. At this time, according to the moving operation through use of the operation handle 111, the CPU executes the position and orientation calculation according to the moving operation, and changes the position and orientation of the robot 101 according to the calculation result.

A screen updating method may be considered that is executed for every minute operation of the operation handle 111, for example, to change the position and orientation of the robot 101 according to the position and orientation calculation result. Alternatively, a method may be adopted that only moves parts, such as the cursor (pointer) of the mouse and the operation handle 111, displayable in a small screen range during the moving operation, and draws the position and orientation of the entire robot 101 in response to a mouse releasing operation.

In step S27, the CPU 33 executes the moving operation, the position and orientation calculation (orientation calculation unit), and the updating of drawing of the virtual environment screen 10, at least for the parts according to the minute operation of the operation handle 111 described above.

The control procedures in FIG. 21 are described in a manner equivalent to the manner illustrated in FIG. 17, for convenience of understanding. Thus, FIG. 21 illustrates step allocation corresponding to the method of drawing the position and orientation of the entire robot 101 according to the mouse releasing operation described above. However, for example, in the case where the control system around the CPU 33 has a sufficient processing capacity, software may be configured so as to repeatedly execute the processes from step S28 to step S9, which is the last in the diagram, for every minute operation of the operation handle 111 in step S27.

In step S28, the CPU 33 determines whether the current operation handle 111 is the relative value handle (or absolute value handle). If the operation handle 111 indicates a vector in the direction of the tool coordinate system 105 in step S28, that is, in the case of the relative value handle, the processing proceeds to step S29. In step S29, the CPU 33 executes calculation by adding the amount of movement in the vector direction selected by the mouse to the relative value from the teaching point 106 serving as the reference to the offset teaching point 107, and obtains the calculated value as the relative value after movement.

On the other hand, if the operation handle 111 is displayed as the absolute value handle in the direction of the absolute coordinate system (e.g., base coordinate system 104) in step S28, the processing proceeds to step S30. In step S30, the CPU 33 executes calculation by adding the amount of movement in the vector direction selected by the mouse to the absolute value from the absolute coordinate system to the offset teaching point 107, and obtains the calculated value as the absolute value after movement.

As described above, the value (relative value or absolute value) on the offset teaching point 107 after movement is input. Subsequent to step S29 or S30, it is determined whether this teaching point is a teaching point associated with the work or not in step S21. If the step S21 is positive, calculation of relative value transformation for the base coordinate system of the robot is executed in step S22. The subsequent steps on and after step S4 in FIG. 21 are the same as the steps on and after step S4 in FIG. 17 described above. In step S4 and thereafter, the position and orientation calculation of the robot 101 is executed according to whether the representation of this teaching point is the tool coordinate system (base coordinate system) or not (steps S14 and S5, steps S15 and S6). Subsequently, it is determined whether the operation is within the limitation defined by hardware, specifications and regulations or not, and error processing is executed as necessary (steps S7 and S8).

If no limitation error occurs, (final) updating of the display screen E of the displaying apparatus C is executed according to the result of calculation. That is, according to change in the position and orientation of the robot 101 through the operation handle 111, the virtual display of the robot 101 on the virtual environment screen 10 is subjected to (finally) updating, and the content of the numeric value display on the parameter setting screen 20 is updated. The position and orientation of the robot 101 indicated by solid lines in FIG. 22B correspond to the position and orientation of the robot 101 after the edit having moved the offset teaching point 107 through the operation handle 111 displayed at the distal end of the robot 101. It is a matter of course that the content of the numeric value display on the parameter setting screen is updated according to the edit operation for the offset teaching point 107 (through the operation handle 111) as described above (e.g., FIGS. 5A to 5D and FIGS. 6A to 6D) (step S9). The edit process for the offset teaching point in FIG. 21 is thus finished (step S16).

As described above, according to this embodiment, as another operation method related to input and editing of the position and orientation data, a GUI operation unit is provided. The GUI operation unit changes the position and orientation of the robot 101 virtually displayed in relation to the operating input unit D (or the virtual environment screen 10). The user can perform the input and edit operation that changes the position (orientation) of the robot 101 (and the teaching point associated with the robot) through a significantly intuitive operation on the virtual environment screen 10 using the operation handle 111. The result of the input and edit operation on the virtual environment screen 10 is synchronously reflected in the virtual display of the robot 101 on the virtual environment screen 10 and also in the content of the numeric value display on the parameter setting screen 20. Consequently, the user (operator) can immediately confirm the position and orientation and the parameter concurrently with operating the operation handle 111, for example. The man-hour required for the confirmation can thus be reduced.

Embodiment 5

In Embodiments 1 to 4 described above, in the case where the position and orientation data is represented in the three-dimensional coordinates (and further in angles about axes) in a specific coordinate system corresponding to, for example, a working space, the input and edit process that changes the content represented in the relative value or absolute value has been described.

However, in some cases, the edit of the position and orientation data is desired to be performed through an interface that directly changes the articulation values in the articulation space of the robot 101, instead of the relative value and absolute value of the position and orientation data (three-dimensional coordinates and angles about axes) as described above.

For example, based on the state where the robot 101 has a specific orientation, the user (operator) can sometimes, intuitively, easily understand the operation of rotating specific one (or more) articulation(s) from the orientation for the purpose of, for example, avoiding an obstruction.

In this case, as described below, as illustrated in, for example, FIGS. 25A to 25C, an articulation value setting unit 211 is arranged as a numeric value setting unit that can change the articulation value (e.g., rotation angle), on the parameter setting screen 20, to allow the articulation value of a desired articulation to be changed. Even in the case of executing numeric value setting to the articulation value using such an articulation value setting unit 211, the position and orientation calculation for the robot 101 can be performed according to the edit result of the articulation value as described above, and presence or absence of the limitation error as described above with respect to the result can be determined. According to the edit result of the articulation value, another display on the parameter setting screen 20 can be updated, and the virtual display of the robot 101 on the virtual environment screen 10 can be updated.

Control in the case of inputting and editing the offset teaching point 107 using the articulation value setting unit 211 prepared on the parameter setting screen 20 is hereinafter described with reference to FIGS. 11A and 11B and FIGS. 23 to 25C. The case of editing the offset teaching point 107 is hereinafter described. However, another teaching point, for example, the offset teaching point 110, can be edited according to an analogous process.

Figure 23:
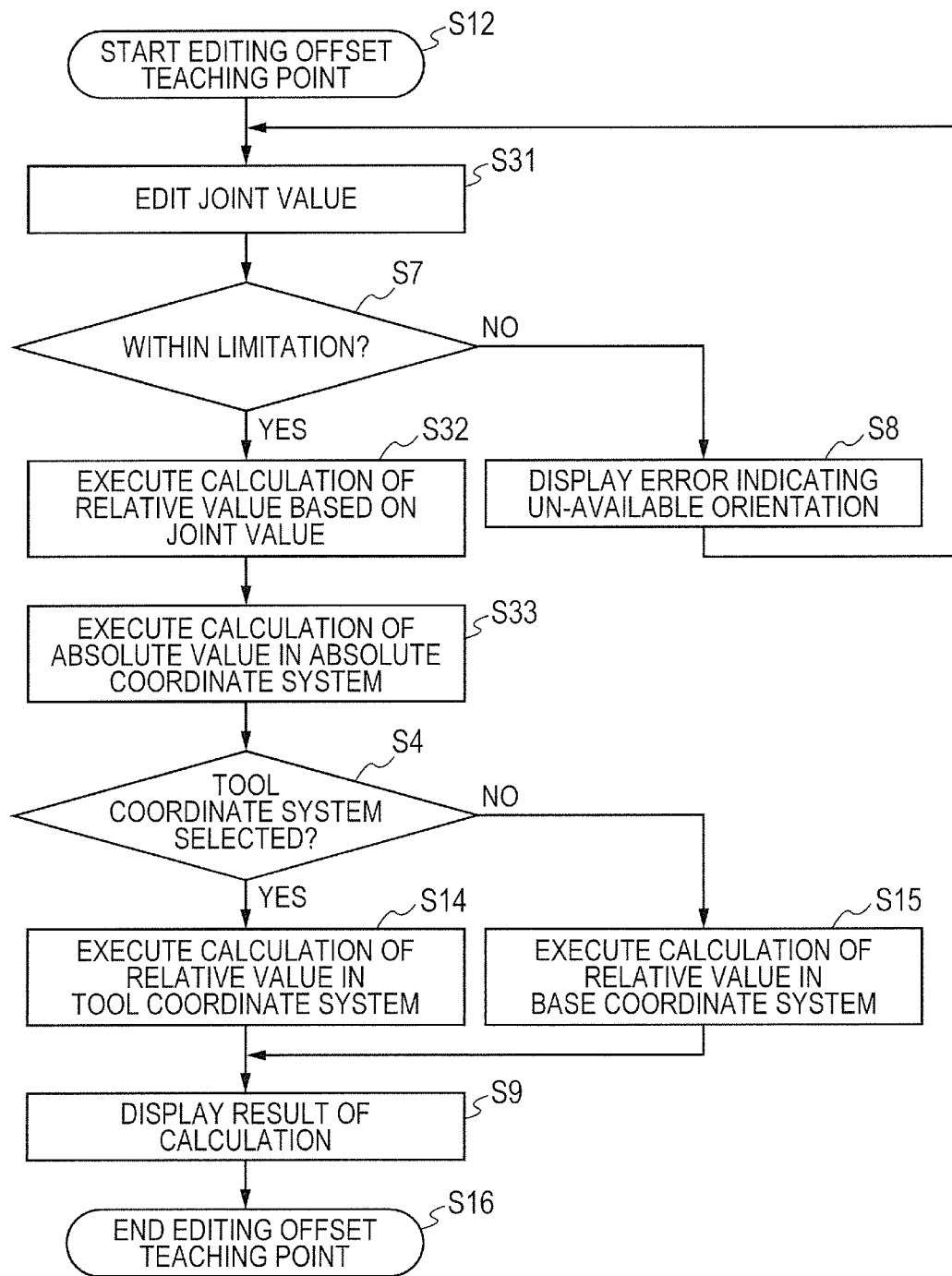
FIG. 23 is a flowchart illustrating an edit process of an offset teaching point according to Embodiment 5 of the present invention.

FIG. 23 illustrates control procedures in the case of inputting and editing the teaching point through the articulation value editing.

First, in step S12 in FIG. 23, the user selects the offset teaching point 107 on the management screen 40 (FIG. 11A), and designates start of editing. The operation method in this case may be a method of clicking the offset teaching point 107 on the management screen 40 (FIG. 11A) using the cursor (pointer) of the mouse of the operating input unit D as described above.

Figure 24A:
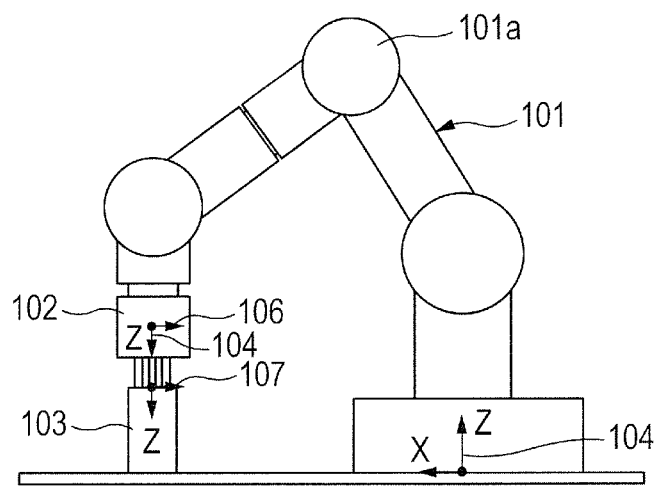
FIGS. 24A and 24B are diagrams illustrating virtual environment screens according to Embodiment 5 of the present invention.

FIG. 24A illustrates the position and orientation of the robot 101 where the offset teaching point 107 during editing virtually displayed on the virtual environment screen 10 at this time is defined. FIGS. 25A to 25C illustrate the parameter setting screen 20 having the articulation value setting unit 211. FIG. 25A corresponds to a state immediately after selection of the offset teaching point 107 in step S12.

Figure 25A:
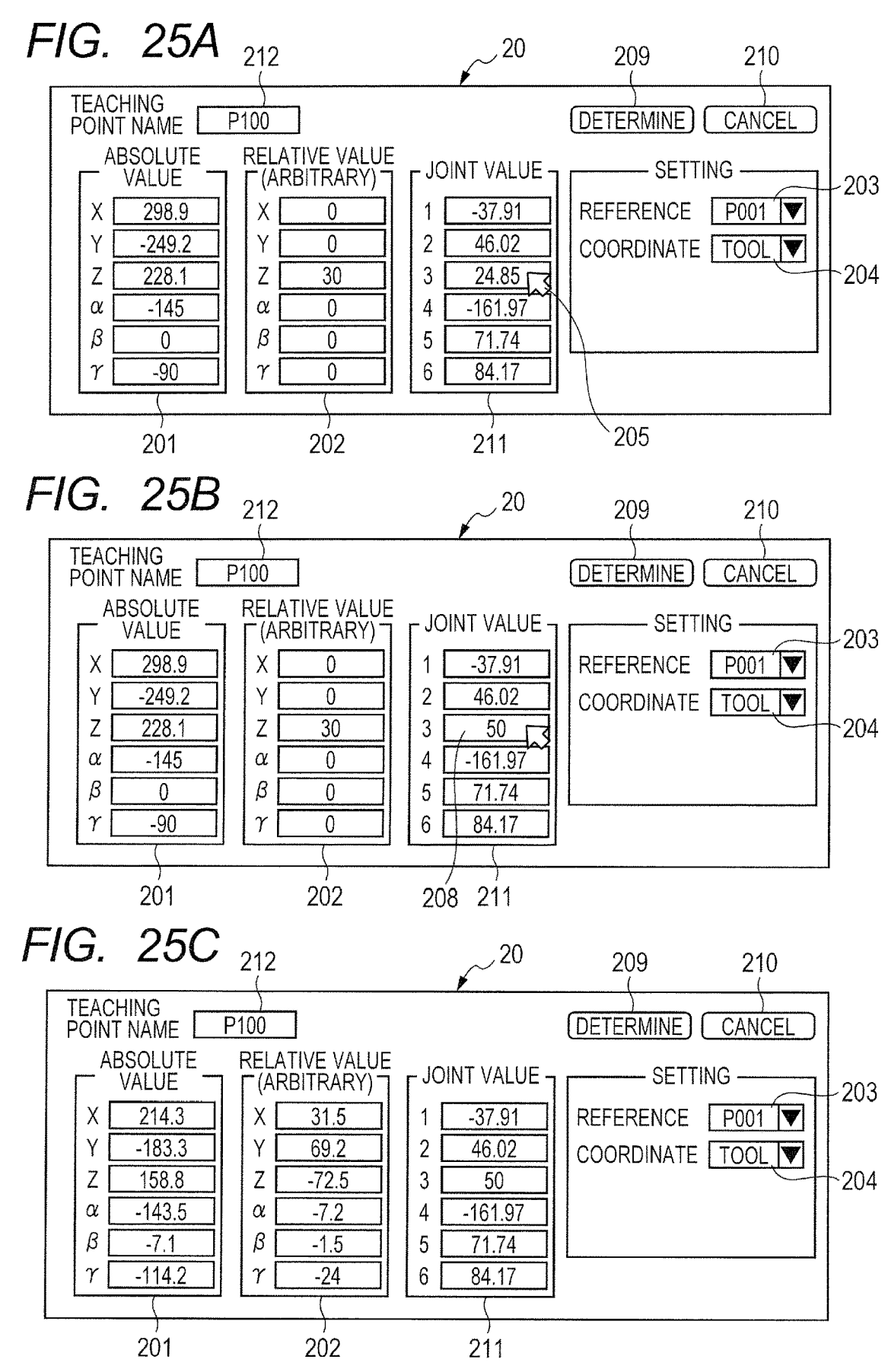

The parameter setting screen 20 in FIGS. 25A to 25C is, for example, the parameter setting screen 20 in FIGS. 5A to 5D (or FIGS. 6A to 6D) to which the articulation value setting unit 211 is added. The configuration other than the part of the articulation value setting unit 211 is analogous to the configuration in FIGS. 5A to 5D (FIGS. 6A to 6D).

In FIG. 25A, the display on the teaching point name setting unit 212 on the parameter setting screen 20 has been switched to "P100" corresponding to the teaching point 107. The value of the teaching point setting unit 203 has been switched to "P001" corresponding to the teaching point 106 serving as the reference. As displayed in the coordinate system selecting unit 204, the tool coordinate system is selected as the coordinate system.

The articulation value setting unit 211 on the parameter setting screen 20 is a numeric input field that, for example, receives and displays the articulation values (rotation angles) of six articulations. These articulation values have angles corresponding to the position and orientation on the offset teaching point 107 according to the articulation value calculation described above.

In step S31 in FIG. 23, the user can edit any of the articulation values associated with the offset teaching point 107 using the articulation value setting unit 211 (parameter setting unit). For example, as illustrated in FIG. 25A, the setting field 208 of the articulation value setting unit 211 on the parameter setting screen 20 is designated by clicking the field using the cursor 205 of the mouse of the operating input unit D. In this diagram, the setting field 208 of the third articulation (the articulation 101a in FIGS. 24A and 24B) is selected. As illustrated in FIG. 25B, an numeric value is input into the setting field 208 of the articulation value setting unit 211 using, for example, the keyboard of the operating input unit D. Here, the value "24.85" (FIG. 25A) is changed to "50". For example, when the [Enter] key is pressed through the keyboard of the operating input unit D after the numeric input, the numeric value input into the setting field 208 is determined.

Subsequently, in step S7, the CPU 33 determines whether each of the set articulation values is within the limitation defined by the hardware, specifications and regulations or not (limitation determining process). If the value is determined to be out of the limitation here, the processing proceeds to step S8, the error screen 50 in FIG. 8, described above, is displayed (abnormality displaying process) to display the fact that the robot 101 has unavailable orientation, and the state returns to the state before editing.

If the value is within the limitation in step S7, the processing proceeds to step S32, and the position and orientation calculation is performed according to the function of the calculating unit 34 of the CPU 33 (orientation calculation unit). Here, the relative value from the base coordinate system 104 of the robot 101 to the offset teaching point 107 is calculated based on the articulation value of each axis of the robot 101 according to forward kinematic calculation.

Subsequently, in step S33, the absolute value from the absolute coordinate system (e.g., base coordinate system) to the offset teaching point 107 is calculated (absolute value calculation process). For example, as represented in the following equation (13), an orientation matrix $T_7$ of the absolute value from the absolute coordinate system to the offset teaching point 107 is obtained, based on the product of the orientation matrix $T_6$ of the absolute value from the absolute coordinate system to the base coordinate system 104 of the robot 101 and the orientation matrix $T_3$ that is the result of calculation in S31. According to the equation (13), Euler-angle transformation is performed, and the absolute values (X, Y, Z, $\alpha$, $\beta$ and $\gamma$) on the offset teaching point 107 are calculated.

$$T_7 = T_6 \cdot T_3 \qquad (13)$$

Next, in step S4, it is determined whether the selected coordinate system is the tool coordinate system 105 or not. When the selected coordinate system is the tool coordinate system 105, the processing proceeds to step S14, and the relative value calculation in the tool coordinate system 105 is executed (relative value calculating process). When the selected coordinate system is the base coordinate system 104, the processing proceeds to step S15, and the relative value calculation in the base coordinate system 104 is executed (relative value calculating process).

After the relative value calculation in step S14 or S15, the CPU 33 updates the display screen E of the displaying apparatus C according to the result of calculation (normality displaying process). In the updating of the display screen E, the calculated absolute values (X, Y, Z, $\alpha$, $\beta$ and $\gamma$) are displayed on the absolute value setting unit 201 on the parameter setting screen 20. The content of the relative value setting unit 202 on the parameter setting screen 20 is updated so as to display the relative value from the teaching point 106 serving as the reference to the offset teaching point 107. The virtual display of the robot 101 on the virtual environment screen 10 is updated so as to achieve the position and orientation defined by each articulation value in the setting field 208 of the articulation value setting unit 211.

Figure 24B:
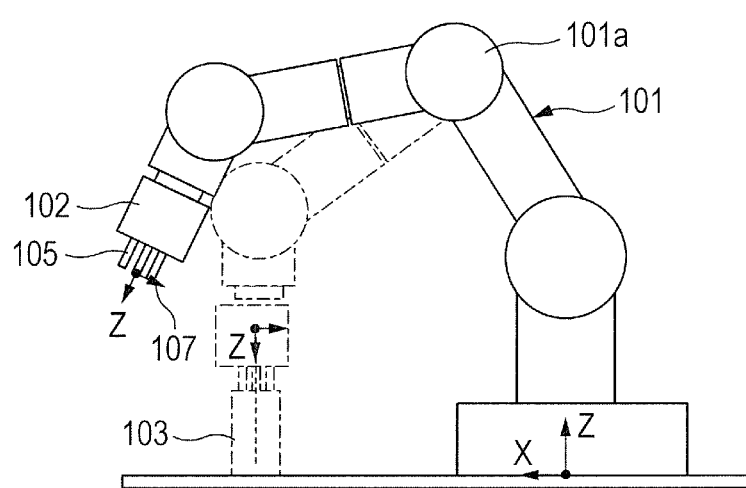

FIG. 24B illustrates the display state of the virtual environment screen 10 after the articulation value editing after the process. FIG. 25C illustrates the display state of the parameter setting screen 20 after the articulation value editing.

In this example, only the articulation value of the third articulation (articulation 101a) is changed by the articulation value setting unit 211. Consequently, a state is achieved where as to the orientation of the robot 101 on the virtual environment screen 10, only the angle of the articulation 101a is changed, and the position and orientation on the offset teaching point 107 are also changed. On the parameter setting screen 20, the absolute value setting unit 201 and the relative value setting unit 202 are changed to indicate values according to the change in the articulation values.

As described above, according to this embodiment, the position and orientation data on the robot 101 and the articulations can be input and edited through the representation of the articulation values. Also in the case where the articulation value is operated, the user (operator) can immediately confirm the position and orientation and the parameter of the relative value concurrently with the editing operation. Consequently, the man-hour required for the confirmation can be reduced.

It is a matter of course that the absolute value setting unit 201, the relative value setting unit 202, and the articulation value setting unit 211 on the parameter setting screen 20 can support mutual transformation through the position and orientation calculation by the CPU 33. The example of input into the articulation value setting unit 211 has been described above. Alternatively, it is a matter of course that when any of the absolute value setting unit 201, the relative value setting unit 202, and the articulation value setting unit 211 is edited, the other two can be updated to have corresponding values through the position and orientation calculation. For example, when the absolute value setting unit 201 is edited, the each articulation value can be displayed on the articulation value setting unit 211 according to the orientation calculation result. Also in the case of editing through the relative value setting unit 202 and the case of editing through the operation handle 111, each articulation value can be displayed on the articulation value setting unit 211 according to the orientation calculation result.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-097214, filed May 12, 2015, which is hereby incorporated by reference herein in its entirety.

What is claimed is:

1. An information processing apparatus for setting at least one of a position or an orientation of a predetermined part of a robot apparatus, comprising:
a displaying unit,
wherein the displaying unit is configured to display thereon:
a coordinate system designating unit configured to designate any coordinate system to be used in relation to the robot apparatus, from among a plurality of coordinate systems including an absolute coordinate system and a relative coordinate system for the absolute coordinate system;
an inputting unit configured to input parameters related to at least one of the position or the orientation of the predetermined part in the any coordinate system among the plurality of coordinate systems; and
an absolute coordinate system parameter displaying unit configured to display parameters related to at least one of the position or the orientation of the predetermined part in the absolute coordinate system, and the absolute coordinate system parameter displaying unit is configured to be able to display the parameters related to at least one of the position or the orientation of the predetermined part in the absolute coordinate system,
wherein the parameters related to at least one of the position or the orientation of the predetermined part in the absolute coordinate system:
correspond to the parameters that are input by the inputting unit after the any coordinate system was designated by the coordinate system designating unit; and
the parameters that are input by the inputting unit are related to at least one of the position or the orientation of the predetermined part in the designated coordinate system.

2. The information processing apparatus according to claim 1, wherein coordinate transformation is performed such that the parameters that are input by the inputting unit become the parameters in the absolute coordinate system, and
the parameters related to at least one of the position or the orientation of the predetermined part in the absolute coordinate system, corresponding to the input parameters that are input by the inputting unit, are calculated and displayed on the parameters in the absolute coordinate system parameter displaying unit.

3. The information processing apparatus according to claim 1, wherein a virtual displaying unit configured to perform virtual display of a state of the robot apparatus identified by the parameters that are input by the inputting unit is displayed on the displaying unit.

4. The information processing apparatus according to claim 1, wherein a parameter management displaying unit, configured to display the parameters related to at least one of the position or the orientation of the predetermined part in the any coordinate system and parameters related to at least one of a position or an orientation of a part being in a dependent relationship with the predetermined part, is displayed on the displaying unit.

5. The information processing apparatus according to claim 4, wherein the parameters related to at least one of the position or the orientation of the predetermined part in the any coordinate system and the parameters related to at least one of the position or the orientation of the part being in the dependent relationship with the predetermined part are displayed in a hierarchic structure.

6. The information processing apparatus according to claim 1, wherein the parameters related to at least one of the position or the orientation of the predetermined part in the absolute coordinate system, corresponding to the input parameters that are input by the inputting unit, are output to an external apparatus.

7. The information processing apparatus according to claim 1, wherein the predetermined part is a distal end of the robot apparatus, and the parameters in the any coordinate system and the parameters in the absolute coordinate system are coordinate values for identifying at least one of a position or an orientation of the distal end.

8. The information processing apparatus according to claim 1, wherein a relative value from a predetermined parameter is input to the inputting unit.

9. The information processing apparatus according to claim 1, wherein, in a case where a state of the robot apparatus identified by the input parameters that are input by the inputting unit exceeds a range of limitation of a mechanism of the robot apparatus, the displaying unit is configured to display an error.

10. A robot system comprising the robot apparatus with a teaching point set using the information processing apparatus according to claim 1.

11. An article manufacturing method for manufacturing an article using the robot system according to claim 10.

12. A method for controlling an information processing apparatus for setting at least one of a position or an orientation of a predetermined part of a robot apparatus comprising a displaying unit, the method comprising:
displaying on the displaying unit:
a coordinate system designating unit configured to designate any coordinate system to be used in relation to the robot apparatus, from among a plurality of coordinate systems including an absolute coordinate system and a relative coordinate system for the absolute coordinate system;
an inputting unit configured to input parameters related to at least one of the position or the orientation of the predetermined part in the any coordinate system among the plurality of coordinate systems; and
an absolute coordinate system parameter displaying unit configured to display parameters related to at least one of the position or the orientation of the predetermined part in the absolute coordinate system, and on the absolute coordinate system parameter displaying unit, there is displayed the parameters related to at least one of the position or the orientation of the predetermined part in the absolute coordinate system,
wherein the parameters related to at least one of the position or the orientation of the predetermined part in the absolute coordinate system:
correspond to the parameters that are input by the inputting unit after the any coordinate system was designated by the coordinate system designating unit; and
the parameters that are input by the inputting unit are related to at least one of the position or the orientation of the predetermined part in the designated coordinate system.

13. The method according to claim 12, wherein coordinate transformation is performed such that the parameters that are input by the inputting unit become the parameters in the absolute coordinate system, and the parameters related to at least one of the position or the orientation of the predetermined part in the absolute coordinate system, corresponding to the parameters that are input by the inputting unit, are calculated and displayed on the parameters in the absolute coordinate system parameter displaying unit.

14. The method according to claim 12, wherein the method further comprises displaying a virtual displaying unit configured to perform virtual display of a state of the robot apparatus identified by the input parameters that are input by the inputting unit, on the displaying unit.

15. The method according to claim 12, further comprising displaying on the displaying unit a parameter management displaying unit configured to display the parameters related to at least one of the position or the orientation of the predetermined part in the any coordinate system and parameters related to at least one of a position or an orientation of a part being in a dependent relationship with the predetermined part.

16. The method according to claim 12, wherein the predetermined part is a distal end of the robot apparatus, and the parameters in the any coordinate system and the parameters in the absolute coordinate system are coordinate values for identifying at least one of a position or an orientation of the distal end.

17. A method according to claim 12, further comprising, in a case where a state of the robot apparatus identified by the parameters that are input by the inputting unit exceeds a range of limitation of a mechanism of the robot apparatus, displaying an error on the displaying unit.

18. A non-transitory computer readable recording medium storing a computer-readable program for operating a computer to control an information processing apparatus for setting at least one of a position or an orientation of a predetermined part of a robot apparatus, the information processing apparatus comprising a displaying unit, the program comprising code to execute:
displaying on the displaying unit:
a coordinate system designating unit configured to designate any coordinate system to be used in relation to the robot apparatus, from among a plurality of coordinate systems including an absolute coordinate system and a relative coordinate system for the absolute coordinate system;
an inputting unit configured to input parameters related to at least one of the position or the orientation of the predetermined part in the any coordinate system among the plurality of coordinate systems; and
an absolute coordinate system parameter displaying unit configured to display parameters related to at least one of the position or the orientation of the predetermined part in the absolute coordinate system, and on the absolute coordinate system parameter displaying unit, there is displayed the parameters related to at least one of the position or the orientation of the predetermined part in the absolute coordinate system,
wherein the parameters related to at least one of the position or the orientation of the predetermined part in the absolute coordinate system:
correspond to the parameters that are input by the inputting unit after the any coordinate system was designated by the coordinate system designating unit; and the parameters that are input by the inputting unit are related to at least one of the position or the orientation of the predetermined part in the designated coordinate system.

* * * * *